US012367625B2

(12) United States Patent
Aggarwal et al.

(10) Patent No.: US 12,367,625 B2
(45) Date of Patent: Jul. 22, 2025

(54) TEXT BORDER TOOL AND ENHANCED CORNER OPTIONS FOR BACKGROUND SHADING

(71) Applicant: ADOBE INC., San Jose, CA (US)

(72) Inventors: Varun Aggarwal, Rohini (IN); Souvik Sinha Deb, Noida (IN); Sanyam Jain, Pitampura (IN); Monica Singh, Agra (IN); Mohammad Javed Ali, Delhi (IN); Gaurav Anand, Ghaziabad (IN); Deepanjana Chakravarti, Kingsway Camp (IN); Aman Arora, Lajpat Nagar (IN); Abhay Sibal, New Delhi (IN)

(73) Assignee: ADOBE INC., San Jose, CA (US)

( * ) Notice: Subject to any disclaimer, the term of this patent is extended or adjusted under 35 U.S.C. 154(b) by 7 days.

(21) Appl. No.: 17/935,426

(22) Filed: Sep. 26, 2022

(65) Prior Publication Data

US 2023/0045858 A1 Feb. 16, 2023

Related U.S. Application Data

(62) Division of application No. 15/841,387, filed on Dec. 14, 2017, now Pat. No. 11,455,762.

(51) Int. Cl.
*G06T 11/60* (2006.01)
*G06F 40/109* (2020.01)
(Continued)

(52) U.S. Cl.
CPC ............ *G06T 11/60* (2013.01); *G06F 40/109* (2020.01); *G06T 5/50* (2013.01); *G06T 7/13* (2017.01);
(Continued)

(58) Field of Classification Search
CPC ........ G06F 18/00; G06F 40/109; G06T 11/60; G06T 2200/24; G06T 2207/20221;
(Continued)

(56) References Cited

U.S. PATENT DOCUMENTS

| | | | |
|---|---|---|---|
| 4,558,461 | A | 12/1985 | Schlang |
| 5,245,676 | A | 9/1993 | Spitz |

(Continued)

FOREIGN PATENT DOCUMENTS

| | | | |
|---|---|---|---|
| CA | 2157646 | A1 | 3/1996 |
| CA | 2317585 | A1 | 7/1999 |
| JP | 4101491 | B2 | 6/2008 |

OTHER PUBLICATIONS

Strizh, "paragraph border", Aug. 11, 2017, https://forum.rudtp.ru/threads/paragraph-border.18178/ (Year: 2017).*

(Continued)

*Primary Examiner* — Zhiyu Lu
(74) *Attorney, Agent, or Firm* — Finch & Maloney PLLC

(57) ABSTRACT

Disclosed herein are various techniques for more precisely and reliably (a) positioning top and bottom border edges relative to textual content, (b) positioning left and right border edges relative to textual content, (c) positioning mixed edge borders relative to textual content, (d) positioning boundaries of a region of background shading that fall within borders of textual content, (e) positioning borders relative to textual content that spans columns, (f) positioning respective borders relative to discrete portions of textual content, (g) positioning collective borders relative to discrete, abutting portions of textual content, (h) applying stylized corner boundaries to a region of background shading, and (i) applying stylized corners to borders.

20 Claims, 45 Drawing Sheets
(32 of 45 Drawing Sheet(s) Filed in Color)

(51) Int. Cl.
*G06T 5/50* (2006.01)
*G06T 7/13* (2017.01)
*G06T 7/60* (2017.01)
*G06T 7/73* (2017.01)
*G06V 30/244* (2022.01)

(52) U.S. Cl.
CPC .................. *G06T 7/60* (2013.01); *G06T 7/74* (2017.01); *G06V 30/245* (2022.01); *G06T 2200/24* (2013.01); *G06T 2207/20221* (2013.01)

(58) Field of Classification Search
CPC .... G06T 5/50; G06T 7/13; G06T 7/60; G06T 7/74; G06V 30/245
See application file for complete search history.

(56) References Cited

U.S. PATENT DOCUMENTS

| | | | |
|---|---|---|---|
| 5,745,596 | A | 4/1998 | Jefferson |
| 5,803,629 | A | 9/1998 | Neville et al. |
| 5,815,595 | A | 9/1998 | Gugler |
| 5,825,919 | A | 10/1998 | Bloomberg et al. |
| 5,873,106 | A | 2/1999 | Joseph |
| 6,426,751 | B1 | 7/2002 | Patel et al. |
| 6,674,906 | B1 | 1/2004 | Han et al. |
| 7,046,848 | B1 | 5/2006 | Olcott |
| 7,631,260 | B1 | 12/2009 | Riggs et al. |
| 8,824,806 | B1 | 9/2014 | Gayles et al. |
| 9,792,702 | B2 | 10/2017 | Ranjan et al. |
| 10,262,442 | B2 | 4/2019 | Ranjan et al. |
| 2002/0076111 | A1 | 6/2002 | Dance et al. |
| 2004/0146199 | A1 | 7/2004 | Berkner et al. |
| 2005/0094207 | A1 | 5/2005 | Lo et al. |
| 2006/0112333 | A1 | 5/2006 | Wanaga |
| 2006/0294460 | A1 | 12/2006 | Chao et al. |
| 2007/0139412 | A1* | 6/2007 | Stamm .................. G06T 11/203 345/467 |
| 2008/0137954 | A1 | 6/2008 | Tang et al. |
| 2008/0256108 | A1 | 10/2008 | Heinze et al. |
| 2010/0011308 | A1* | 1/2010 | Shaw .................... G06F 40/166 715/765 |
| 2010/0107061 | A1 | 4/2010 | Ramakrishnan et al. |
| 2011/0202832 | A1* | 8/2011 | Lum ..................... G06F 40/166 715/249 |
| 2013/0176201 | A1* | 7/2013 | Winkle ............... G06F 3/04847 345/156 |
| 2014/0108897 | A1 | 4/2014 | Boutelle et al. |
| 2014/0245115 | A1 | 8/2014 | Zhang et al. |
| 2015/0039992 | A1 | 2/2015 | Pereira et al. |
| 2015/0206169 | A1 | 7/2015 | Ye et al. |
| 2016/0110082 | A1 | 4/2016 | Zhang et al. |
| 2016/0139783 | A1* | 5/2016 | Rakita ................... G06F 40/205 715/779 |
| 2016/0203625 | A1 | 7/2016 | Khan et al. |
| 2016/0210507 | A1 | 7/2016 | Abdollahian |
| 2017/0076169 | A1 | 3/2017 | Campbell |
| 2017/0140554 | A1 | 5/2017 | Ranjan et al. |
| 2018/0012381 | A1 | 1/2018 | Ranjan et al. |
| 2018/0121393 | A1 | 5/2018 | Masalovitch |
| 2019/0026550 | A1 | 1/2019 | Yang et al. |
| 2019/0122043 | A1 | 4/2019 | Bala et al. |

OTHER PUBLICATIONS

Mike Rankin, "Five Ways to Box a Paragraph in InDesign", Feb. 6, 2015, https://creativepro.com/five-ways-to-box-a-paragraph-indesign/ (Year: 2015).*

Adobe Support Community, "Tab Spacing", Aug. 2017, https://community.adobe.com/t5/indesign-discussions/tab-spacing/td-p/9263200 (Year: 2017).*

Pearson, "Working with Paragraph Shading in Adobe InDesign CC (2015 release)", Jun. 19, 2015 (Year: 2015).*

Ariel, "Equalize Border and Shading Options", Oct. 19, 2017, https://www.id-extras.com/equalize-border-shading-options/ (Year: 2017).*

Jennifer Pade, "Paragraph Borders in InDesign CC2018", Oct. 27, 2017, https://www.fluxconsulting.com/paragraph-borders-indesign-cc2018/ (Year: 2017).*

Suzanne S. Barnhill, "Using Borders in Word", 2017, http://wordfaqs.ssbarnhill.com/BordersToolbar.htm (Year: 2017).*

Wyatt, Setting the Distance between Text and Borders, Nov. 10, 2012, Allen Wyatt's Wordtips, https://web.archive.org/web/20161214183051/http://word.tips.net/T000148_Setting_the_Distance_between_Text_and_Borders.html (Year: 2012).*

* cited by examiner

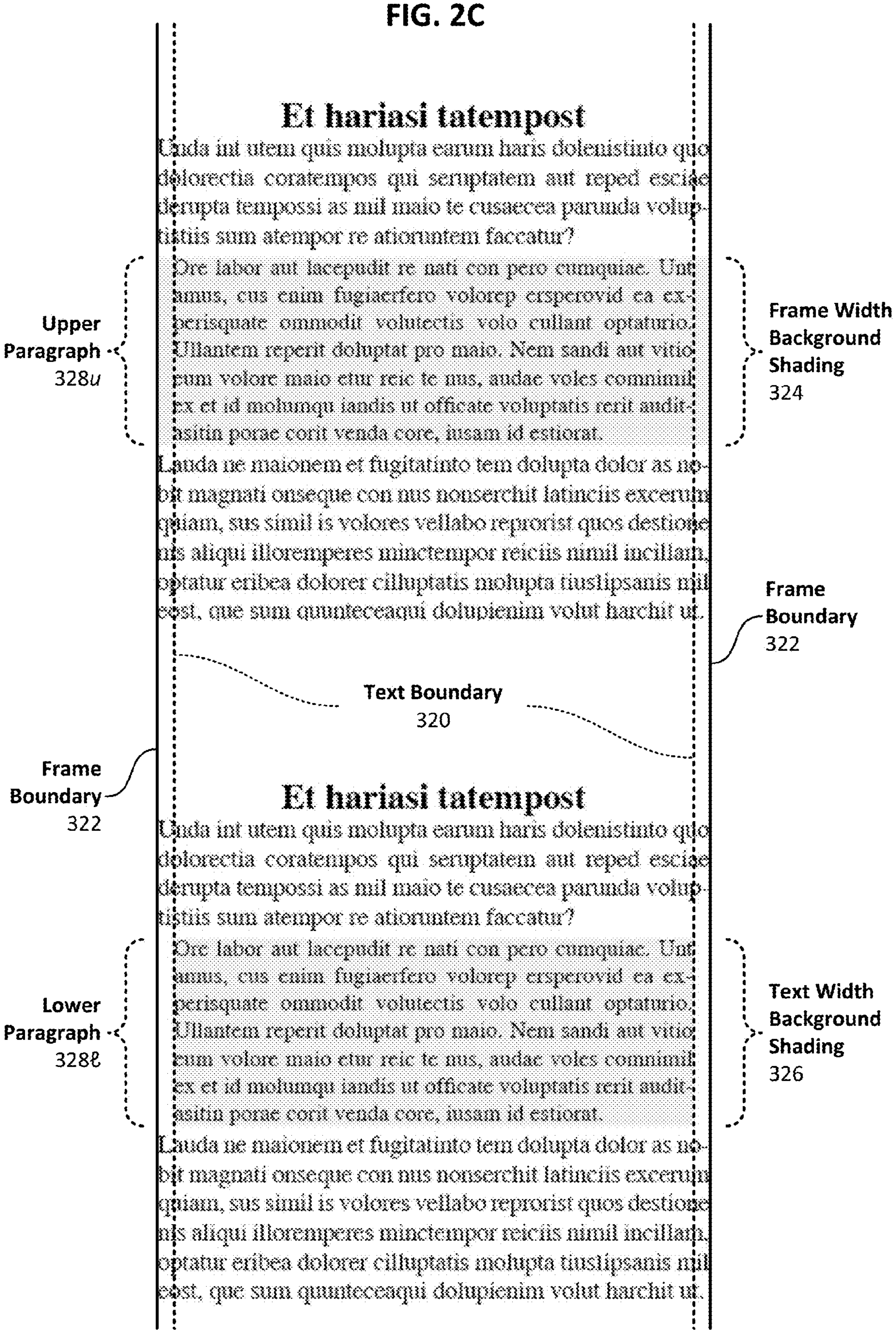

FIG. 2C

Et hariasi tatempost

Unda int utem quis molupta earum haris dolenistinto quo dolorectia coratempos qui semptatem aut reped escias derupta tempossi as mil maio te cusaecea parunda voluptatiis sum atempor re ationuntem faccatur?

Upper Paragraph 328u — Dre labor aut lacepudit re nati con pero cumquiae. Unt amus, cus enim fugiaerfero volorep ersperovid ea experisquate ommodit volutectis volo cullant optaturio. Ullantem reperit doluptat pro maio. Nem sandi aut vitio eum volore maio etur reic te nus, audae voles comminil ex et id molunqu iandis ut officate voluptatis rerit auditasitin porae corit venda core, iusam id estiorat.

Lauda ne maionem et fugitatinto tem dolupta dolor as nobit magnati onseque con nus nonserchit latinciis excerum quiam, sus simil is volores vellabo reprorist quos destione is aliqui illoremperes minctempor reiciis nimil incillam, optatur eribea dolorer cilluptatis molupta tiuslipsanis nil est, que sum quunteceaqui dolupienim volut harchit ut.

Frame Width Background Shading 324

Frame Boundary 322

Text Boundary 320

Frame Boundary 322

Et hariasi tatempost

Unda int utem quis molupta earum haris dolenistinto quo dolorectia coratempos qui semptatem aut reped escias derupta tempossi as mil maio te cusaecea parunda voluptatiis sum atempor re ationuntem faccatur?

Lower Paragraph 328ℓ — Dre labor aut lacepudit re nati con pero cumquiae. Unt amus, cus enim fugiaerfero volorep ersperovid ea experisquate ommodit volutectis volo cullant optaturio. Ullantem reperit doluptat pro maio. Nem sandi aut vitio eum volore maio etur reic te nus, audae voles comminil ex et id molunqu iandis ut officate voluptatis rerit auditasitin porae corit venda core, iusam id estiorat.

Lauda ne maionem et fugitatinto tem dolupta dolor as nobit magnati onseque con nus nonserchit latinciis excerum quiam, sus simil is volores vellabo reprorist quos destione is aliqui illoremperes minctempor reiciis nimil incillam, optatur eribea dolorer cilluptatis molupta tiuslipsanis nil est, que sum quunteceaqui dolupienim volut harchit ut.

Text Width Background Shading 326

FIG. 3

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerd tation ullamcorper suscipit Lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto.

dolor sit amet, consectetuer adipiscing elit, sed diam nonummy nibh euismod tincidunt ut laoreet dolore magna aliquam erat volutpat. Ut wisi lobortis nisl ut aliquip ex ea commodo consequat.

Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait We are interpreters — not merely translators between sender and receiver. What we say and how we say it makes a difference. If we want to speak to people, we need to know their language. In order to design for understanding, we need to understand design.

Mixed Edge Border
30

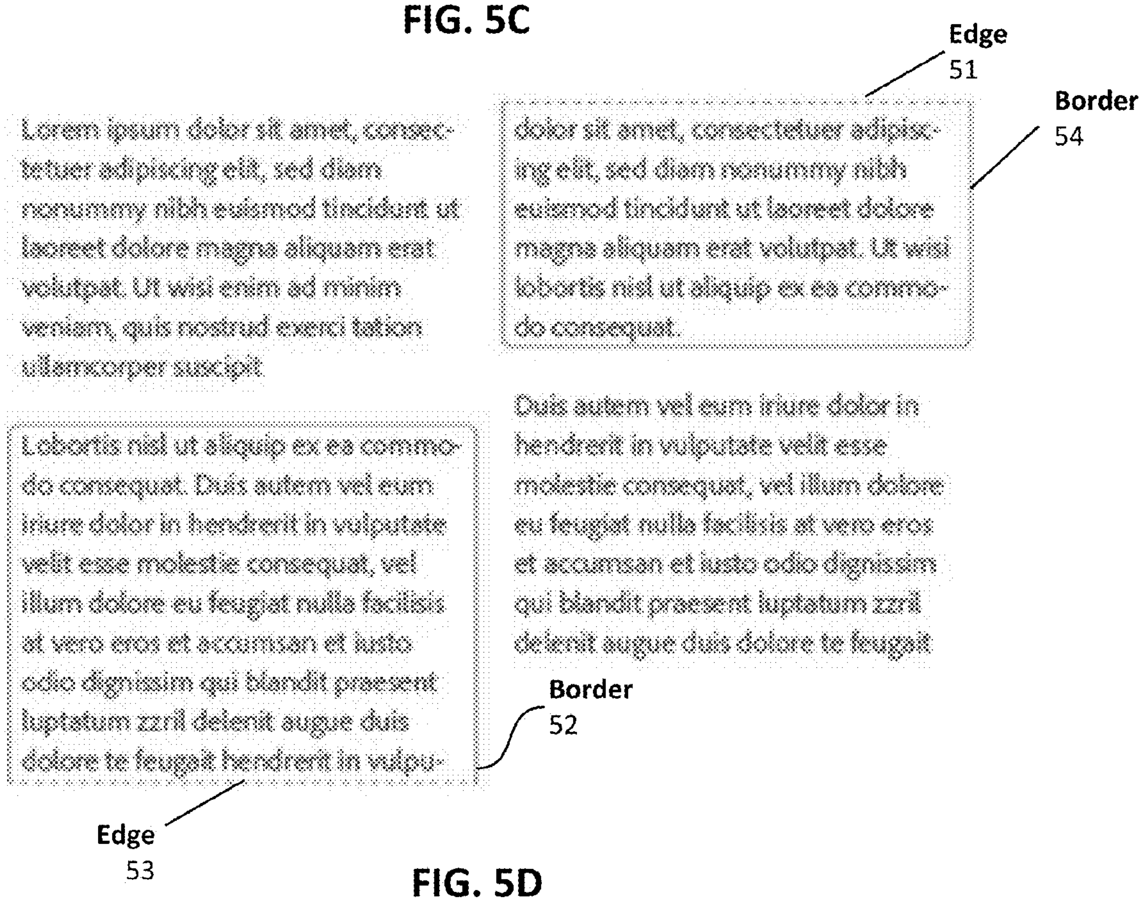

FIG. 5C

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit dolor sit amet, consectetuer adipiscing elit, sed diam nonummy nibh euismod tincidunt ut laoreet dolore magna aliquam erat volutpat. Ut wisi lobortis nisl ut aliquip ex ea commodo consequat.

— Edge 51
— Border 54

Lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait hendrerit in vulpu- Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait Border 52
Edge 53

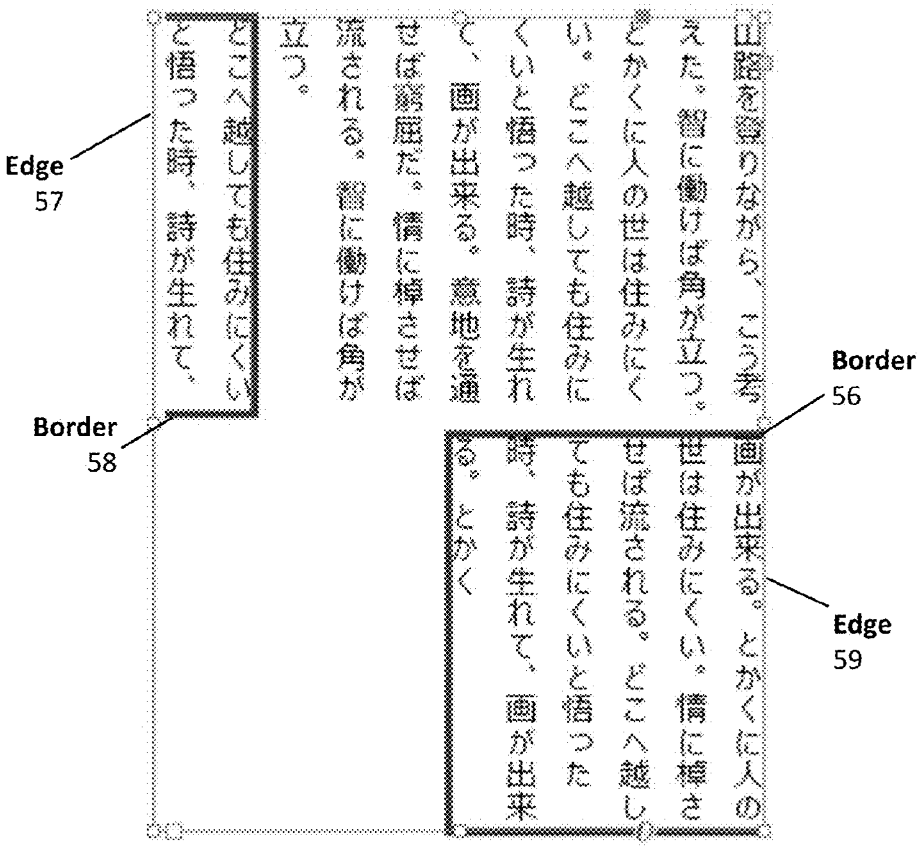

FIG. 5D

Edge 57
Border 58
Border 56
Edge 59

山路を登りながら、こう考えた。智に働けば角が立つ。情に棹させば流される。意地を通せば窮屈だ。兎角に人の世は住みにくい。どこへ越しても住みにくいと悟った時、詩が生れて、画が出来る。

[Japanese vertical text across multiple columns]

Border
68

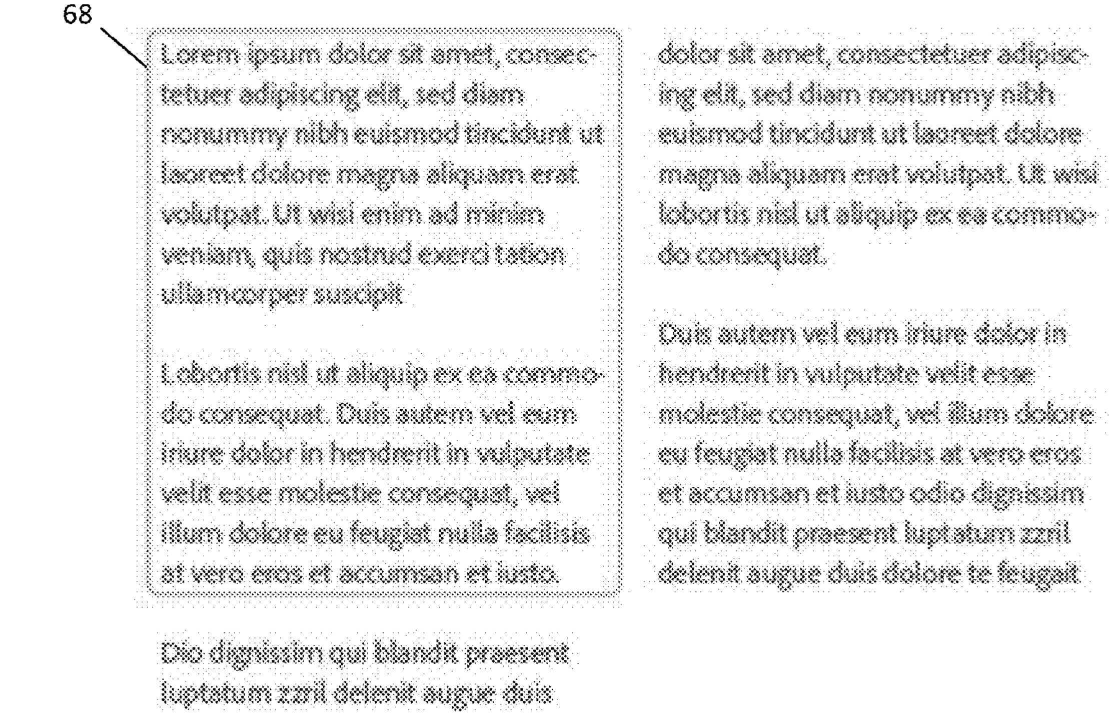

FIG. 6C

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit Lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto.

dolor sit amet, consectetuer adipiscing elit, sed diam nonummy nibh euismod tincidunt ut laoreet dolore magna aliquam erat volutpat. Ut wisi lobortis nisl ut aliquip ex ea commodo consequat.

Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait Dio dignissim qui blandit praesent luptatum zzril delenit augue duis

Border
69

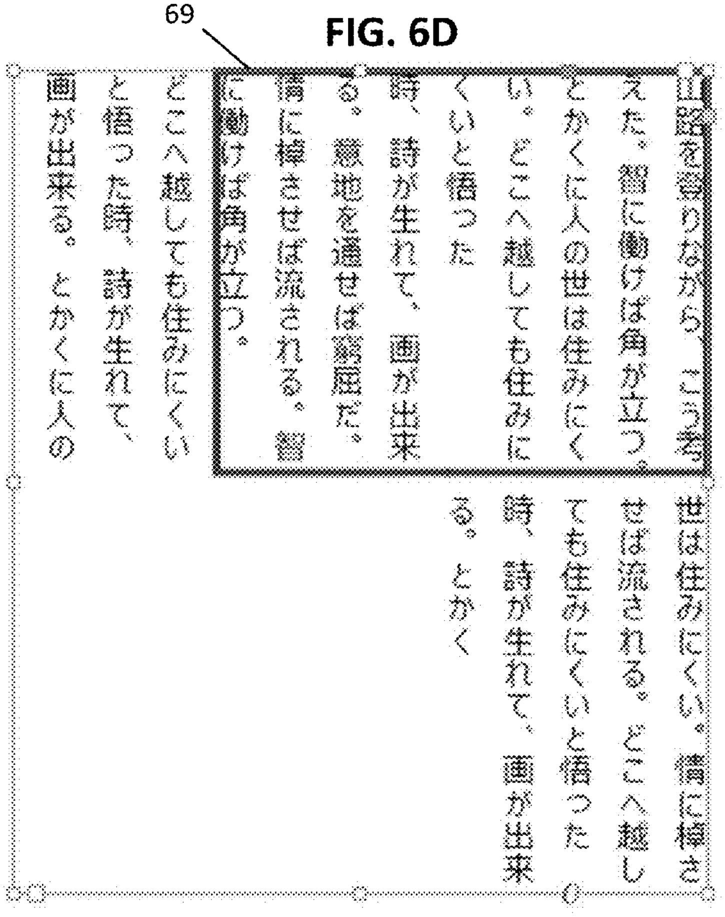

FIG. 6D

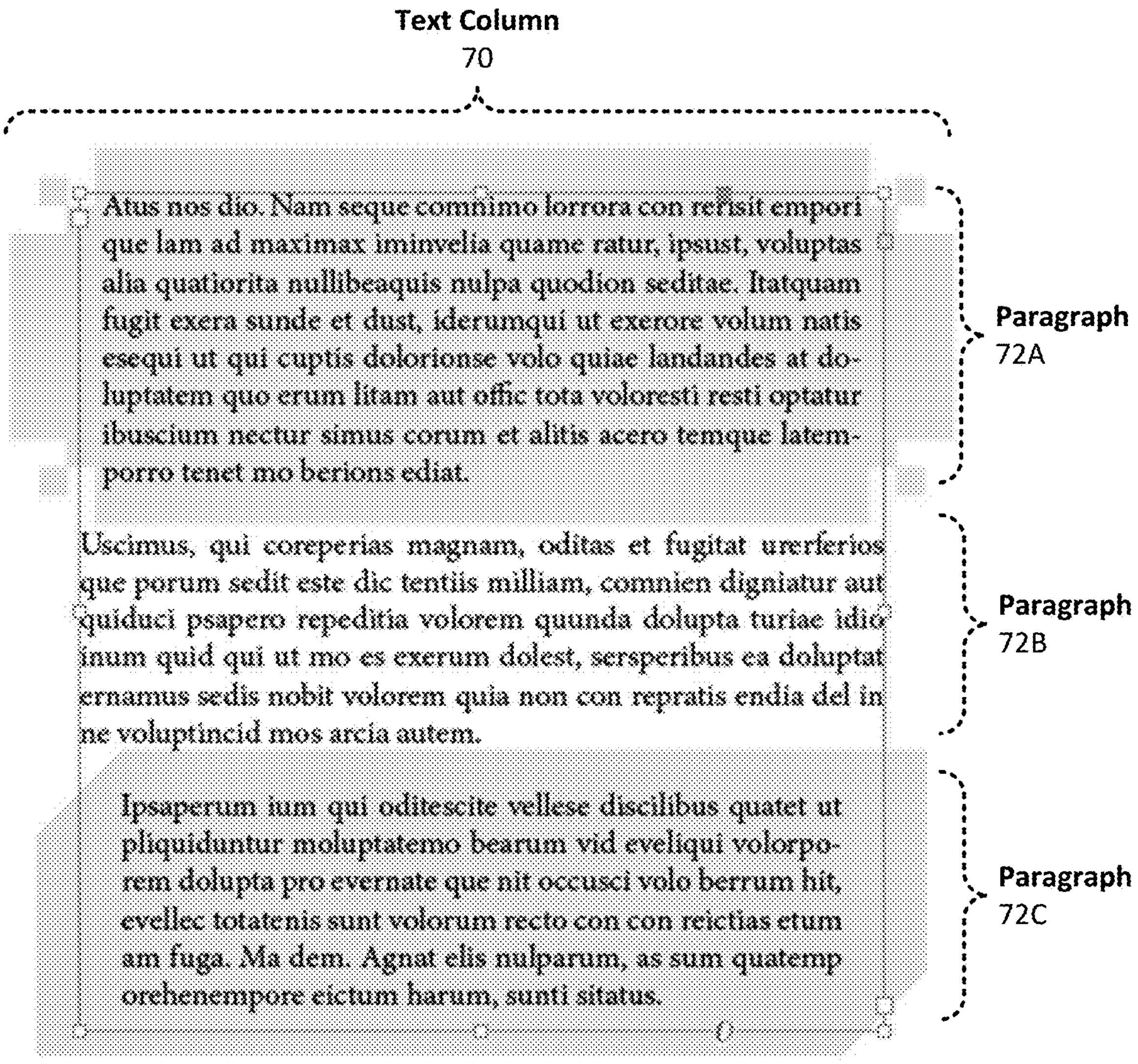

FIG. 7C

Text Column
70

Atus nos dio. Nam seque comnimo lorrora con refisit empori que lam ad maximax iminvelia quame ratur, ipsust, voluptas alia quatiorita nullibeaquis nulpa quodion seditae. Itatquam fugit exera sunde et dust, iderumqui ut exerore volum natis esequi ut qui cuptis dolorionse volo quiae landandes at doluptatem quo erum litam aut offic tota voloresti resti optatur ibuscium nectur simus corum et alitis acero temque latemporro tenet mo berions ediat.

Paragraph 72A

Uscimus, qui coreperias magnam, oditas et fugitat urerferios que porum sedit este dic tentiis milliam, comnien digniatur aut quiduci psapero repeditia volorem quunda dolupta turiae idic inum quid qui ut mo es exerum dolest, sersperibus ea doluptat ernamus sedis nobit volorem quia non con repratis endia del in ne voluptincid mos arcia autem.

Paragraph 72B

Ipsaperum ium qui oditescite vellese discilibus quatet ut pliquiduntur moluptatemo bearum vid eveliqui volorporem dolupta pro evernate que nit occusci volo berrum hit, evellec totatenis sunt volorum recto con con reictias etum am fuga. Ma dem. Agnat elis nulparum, as sum quatemp orehenempore eictum harum, sunti sitatus.

Paragraph 72C

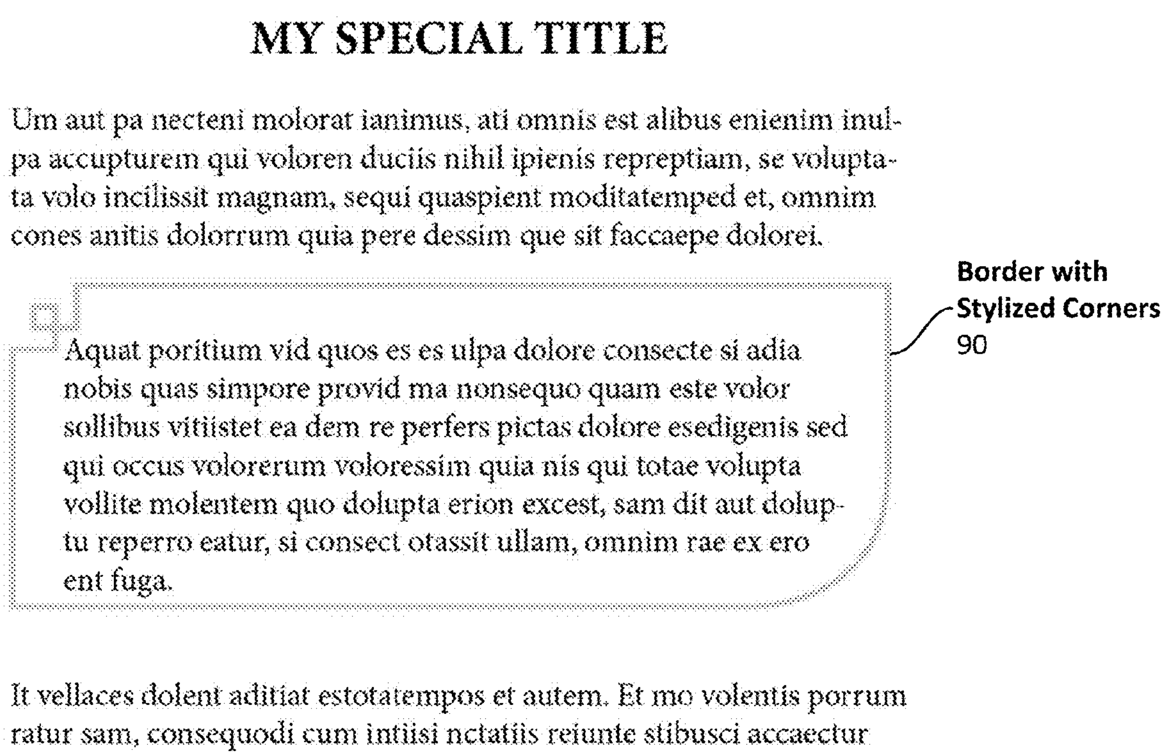

FIG. 9A

MY SPECIAL TITLE

Um aut pa necteni molorat ianimus, ati omnis est alibus enienim inulpa accupturem qui voloren duciis nihil ipienis repreptiam, se voluptata volo incilissit magnam, sequi quaspient moditatemped et, omnim cones anitis dolorrum quia pere dessim que sit faccaepe dolorei.

Aquat poritium vid quos es es ulpa dolore consecte si adia nobis quas simpore provid ma nonsequo quam este volor sollibus vitiistet ea dem re perfers pictas dolore esedigenis sed qui occus volorerum voloressim quia nis qui totae volupta vollite molentem quo dolupta erion excest, sam dit aut doluptu reperro eatur, si consect otassit ullam, omnim rae ex ero ent fuga.

Border with Stylized Corners 90

It vellaces dolent aditiat estotatempos et autem. Et mo volentis porrum ratur sam, consequodi cum intiisi nctatiis reiunte stibusci accaectur

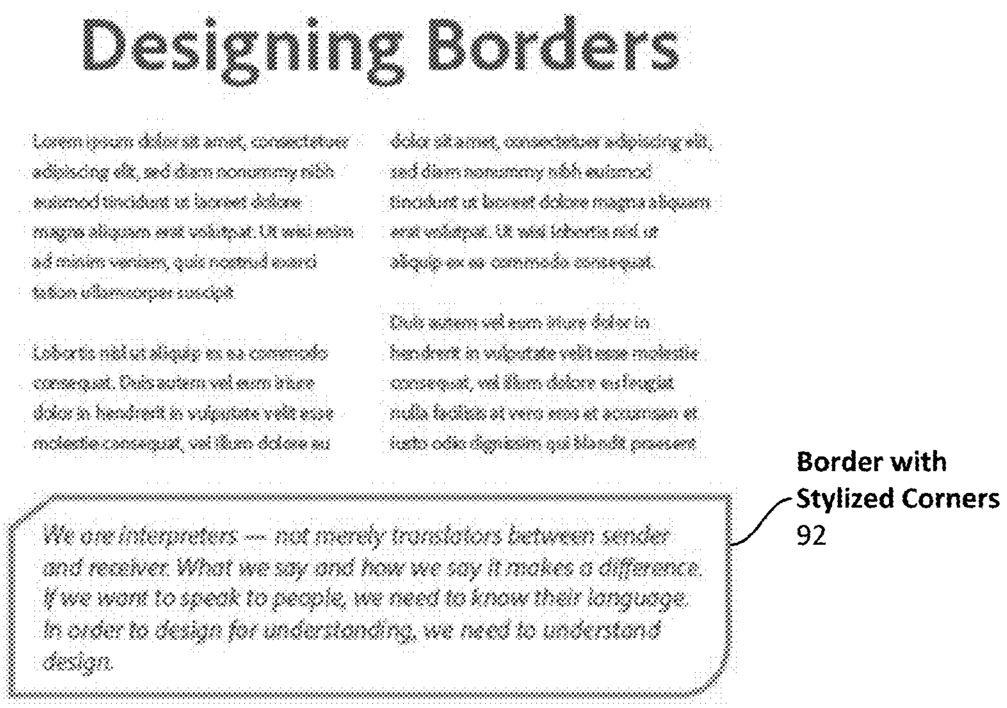

FIG. 9B

Designing Borders

Border with Stylized Corners 92

User Interface 1560

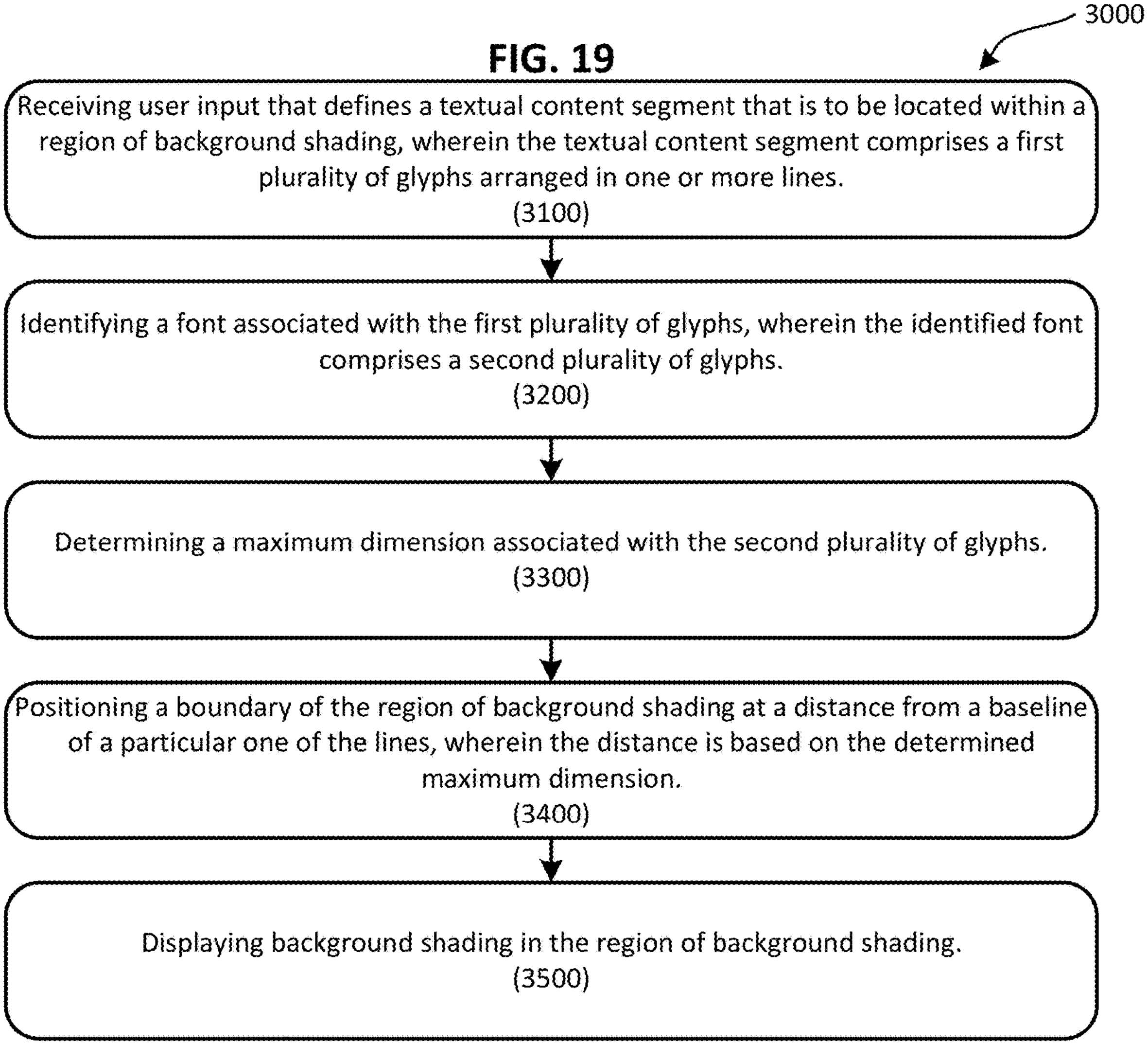

FIG. 19

```
Receiving user input that defines a textual content segment that is to be located within a
region of background shading, wherein the textual content segment comprises a first
plurality of glyphs arranged in one or more lines.
(3100)
          ↓
Identifying a font associated with the first plurality of glyphs, wherein the identified font
comprises a second plurality of glyphs.
(3200)
          ↓
Determining a maximum dimension associated with the second plurality of glyphs.
(3300)
          ↓
Positioning a boundary of the region of background shading at a distance from a baseline
of a particular one of the lines, wherein the distance is based on the determined
maximum dimension.
(3400)
          ↓
Displaying background shading in the region of background shading.
(3500)
```

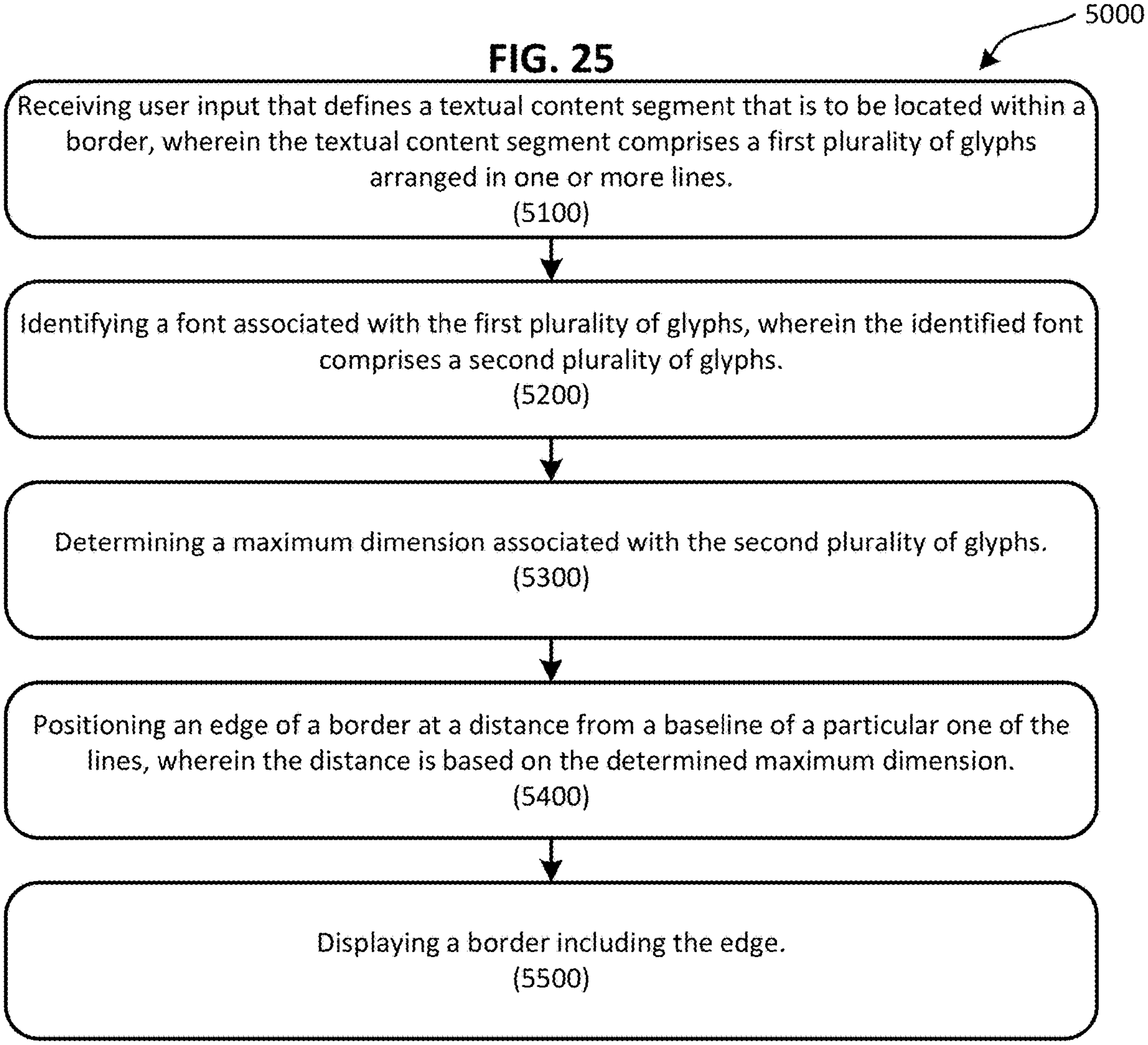

FIG. 25 — 5000

(5100) Receiving user input that defines a textual content segment that is to be located within a border, wherein the textual content segment comprises a first plurality of glyphs arranged in one or more lines.

(5200) Identifying a font associated with the first plurality of glyphs, wherein the identified font comprises a second plurality of glyphs.

(5300) Determining a maximum dimension associated with the second plurality of glyphs.

(5400) Positioning an edge of a border at a distance from a baseline of a particular one of the lines, wherein the distance is based on the determined maximum dimension.

(5500) Displaying a border including the edge.

TEXT BORDER TOOL AND ENHANCED CORNER OPTIONS FOR BACKGROUND SHADING

CROSS REFERENCE TO RELATED APPLICATION

This application is a divisional of U.S. patent application Ser. No. 15/841,387 (filed 14 Dec. 2017), the entire disclosure of which is hereby incorporated by reference herein.

FIELD OF THE DISCLOSURE

This disclosure relates generally to digital and print publishing, and more specifically to techniques for precisely and reliably modifying borders and shading of paragraphs within digitally published text.

BACKGROUND

The software industry has developed numerous programs that allow users to create or edit various types of content. These programs include desktop publishing applications that enable digital publishers to precisely control the appearance of the textual and graphical objects that make up a digital publication. In particular, compared to textual composition applications such as word processors and text editors, desktop publishing applications afford digital publishers a greater degree of control over visual aspects of digital content such as typography and graphical layout. Desktop publishing applications therefore enable digital publishers and other content designers to create digital content that has a visually attractive appearance in terms of composition, color, transparency, borders, typography, graphical layout, and so forth. Examples of commercially available desktop publishing applications include Adobe® InDesign® (Adobe Systems Incorporated, San Jose, CA) and Microsoft® Publisher (Microsoft Corporation, Redmond, WA).

Particularly with respect to typography, desktop publishing applications provide typesetting tools that allow digital publishers to create textual content that is uniformly legible, readable, and visually pleasing when rendered. For example, the typesetting tools provided by desktop publishing applications allow digital publishers to manipulate typographical attributes such as font, point size, line length, line spacing, margins, letter spacing, kerning, and the like. Two content attributes that are particularly important to the creation of visually attractive textual content is textual borders and background shading. Both borders and shading can be used to draw attention to textual content, impart a degree of organization to textual content, or simply enhance the visual appearance of textual content. As a result, many existing desktop publishing applications also allow borders and shading to be applied to textual content, and to this end, are capable of positioning boundaries that define a region of textual content.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2C illustrates a text column having an upper paragraph to which frame-width background shading has been applied, and a lower paragraph to which text-width background shading has been applied.

FIG. 3 illustrates a column of textual content that includes a paragraph to which a mixed edge border has been applied.

FIG. 5C illustrates the textual content of FIG. 5A, wherein the two borders include a continuity indicator.

FIG. 5D illustrates the textual content of FIG. 5B, wherein the two borders include a continuity indicator.

FIG. 6C illustrates the textual content of FIG. 6A, wherein respective borders have been merged into a collective border.

FIG. 6D illustrates the textual content of FIG. 6B, wherein respective borders have been merged into a collective border.

FIG. 7C illustrates a column of textual content with two paragraphs having background shading with stylized corners generated by a boundary positioning process.

FIG. 9A illustrates a column of textual content with a paragraph having a border with stylized corners generated by a workaround.

FIG. 9B illustrates a column of textual content with a paragraph having a border with stylized corners generated by a border positioning process.

FIG. 19 is a flowchart illustrating a computer-implemented method for applying background shading to textual content.

FIG. 25 is a flowchart illustrating a computer-implemented method for applying a border to textual content.

DETAILED DESCRIPTION

Figure 1A:
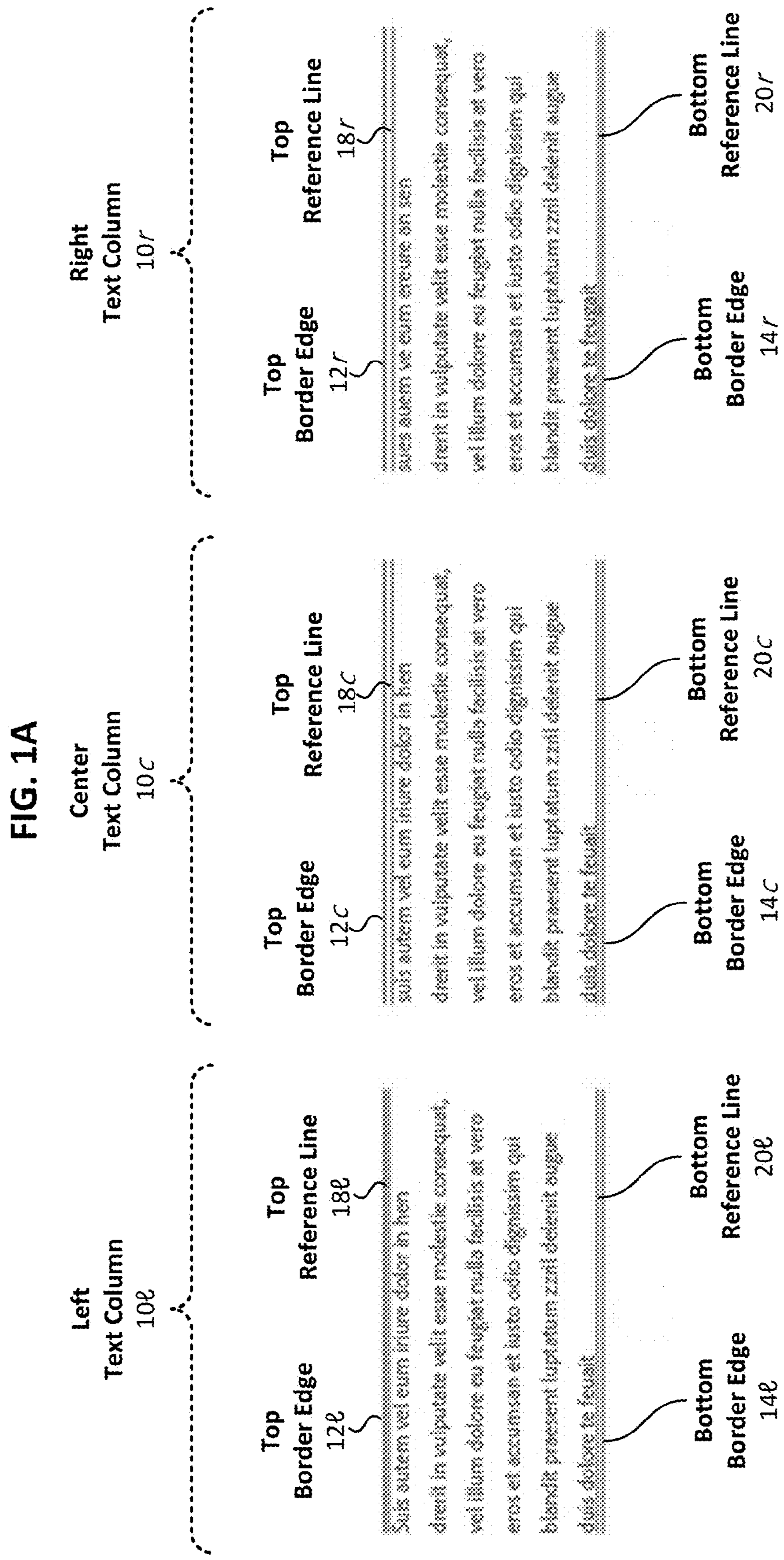
FIG. 1A illustrates three columns of textual content, each of which includes top and bottom border edges that are positioned based on the shape of the glyphs present in the first and last lines of textual content within the top and bottom border edges.

Because textual content is often arranged in rectangular blocks, positioning boundaries of a region of background shading usually involves positioning top, bottom, left, and right boundaries. Edges of visual borders may be positioned at these boundaries or elsewhere, with or without background shading being applied. While many existing desktop publishing applications allow borders and background shading to be applied to textual content, such applications cannot precisely and reliably position the borders or the boundaries of the shaded region, thus making it difficult for a digital publisher to achieve a desired background shading or border effect. In addition, existing desktop publishing applications cannot accurately apply stylized corners to borders or shaded regions, instead forcing users to accept simple, default corners for the borders and shaded regions. In view of these shortcomings, disclosed herein are various techniques for more precisely and reliably (a) positioning top and bottom border edges relative to textual content, (b) positioning left and right border edges relative to textual content, (c) positioning mixed edge borders relative to textual content, (d) positioning boundaries of a region of background shading that fall within borders of textual content, (e) positioning borders relative to textual content that spans columns, (f) positioning respective borders relative to discrete portions of textual content, (g) positioning collective borders relative to discrete, abutting portions of textual content, (h) applying stylized corner boundaries to a region of background shading, and (i) applying stylized corners to borders. The various techniques disclosed herein allow borders and background shading to be applied to textual content precisely and reliably, and also reduce the likelihood that unwanted visual artifacts are introduced into a digital publication.

Thus, in accordance with certain of the embodiments disclosed herein, improved background shading and border techniques enable a user to apply background shading and/or borders to textual content more precisely and reliably. To accomplish this, first user input is received that identifies the textual content to which background shading and/or a border is to be applied. And second user input is received that defines how a boundary of the background shading and/or the border should be positioned with respect to the identified textual content. Because the second user input is distinct from the first user input, it provides an additional degree of precision beyond simply selecting a character, line, paragraph, or other segment of textual content. In some embodiments, third user input is received that specifies one or more stylized corner boundaries to apply to the region and/or one or more stylized corners to apply to the border. Once the textual content has been identified, the edges of the border and/or the boundary of the region which is to be shaded have been positioned, and the stylized corner boundaries and/or the stylized corners have been positioned, the border and/or the background shading can be applied accordingly. Numerous configurations and modifications will be apparent in light of this disclosure.

General Overview: Top and Bottom Border Edges and Shading Boundaries

Existing desktop publishing applications position top and bottom border edges based on the shape of the glyphs present in the first and last lines of textual content in the shaded region. For example, a first line of textual content having a glyph with a relatively large ascent (that is, tall glyphs such as "b", "d", and "f") will cause a border edge to be positioned higher than a first line of textual content having only glyphs with relatively small ascent (that is, short glyphs such as "a", "c", and "e"). Likewise, a last line of textual content having glyphs with a descent (that is, glyphs such as "g", "j", and "p") will cause a border edge to be positioned higher than a last line of textual content having only glyphs with no descent (that is, glyphs such as "m", "n", and "o"). Defining positions of border edges in this way means that changing a single glyph in the first or last line of textual content within the borders may cause the position of the border edges to change. This may produce unexpected changes in the geometry of the textual content and borders, which are particularly undesirable in applications where a digital publisher wishes to define the geometry of the textual content and borders precisely and reliably.

This effect is shown in FIG. 1A, which illustrates a left text column 10ℓ, a center text column **10*c*, and a right text column 10*r*. The left text column 10ℓ has a top border edge 12ℓ, a bottom border edge 14ℓ, a top reference line 18ℓ, and a bottom reference line 20ℓ. The center text column 10*c* has a top border edge 12*c*, a bottom border edge 14*c*, a top reference line 18*c*, and a bottom reference line 20*c*. The right text column 10*r* has a top border edge 12*r*, a bottom border edge 14*r*, a top reference line 18*r*, and a bottom reference line 20*r*. In conventional systems, the positions of the top border edges 12ℓ, 12*c*, and 12*r* and the bottom border edges 14ℓ, 14*c*, and 14*r* are determined based on the shape of the glyphs present in a union of the first and last lines of the textual content to which the bordering is applied. Because the first and last lines of text in each text column 10ℓ, 10*c*, 10*r*** contain different glyphs, the top and bottom border edges are positioned slightly differently in each.

The reference lines shown in FIG. 1A highlight the positional variance of border edges where the first and last lines of the textual contextual content include varying glyphs. For example, the first line of the left text column 10ℓ contains an upper-case glyph (e.g., "S") with a relatively large ascent, and the last line includes no glyphs with a decent. Using this set of glyphs, conventional bordering techniques position the top border edge 12ℓ closer to the first line than the bottom border edge 14ℓ to the last line. This positioning is illustrated by the top and bottom reference lines 18ℓ, and 20ℓ. The first line of the center text column **10*c* contains glyphs with ascents (e.g., "t," "l," and "h"), but contains no upper-case glyphs, and the last line contains no glyphs with a decent. Using this set of glyphs, conventional bordering techniques position the bottom border edge 14*c* closer to the last line than the top border edge 12*c* closer to the first line. This positioning is illustrated by the top and bottom reference lines 18*c* and 20*c*. The first line of the right text column 10*r* contains no glyphs with ascents, and the last line contains a glyph with a decent (e.g., "g"). Using this set of glyphs, conventional bordering techniques position the bottom border edge 14*r* closer to the last line than the top border edge 12*r* closer to the first line. This positioning is illustrated by the top and bottom reference lines 18*r* and 20*r***. Because the position of the borders depends on the glyphs included in the textual content, the position of the border edges may change where the glyphs change. This variability in border edge position is generally considered to be an unwanted visual distraction by many digital publishers.

Figure 1B:
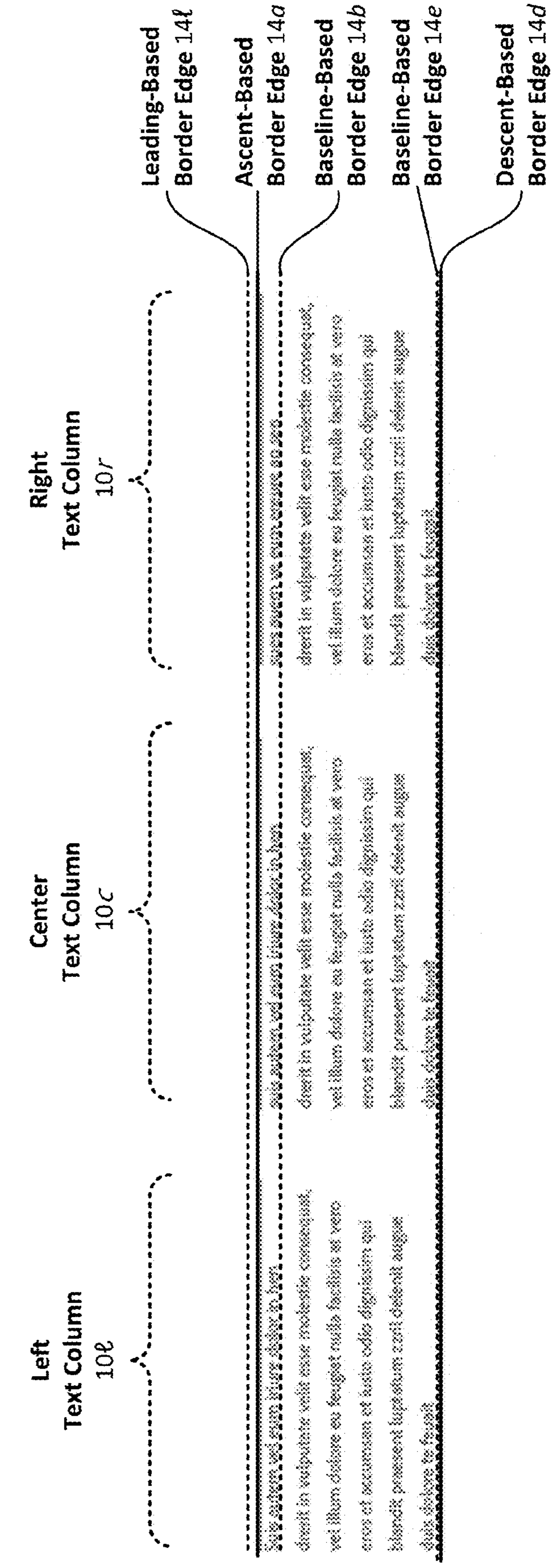
FIG. 1B illustrates three columns of textual content, each of which includes top and bottom border edges that are positioned based on the shape of the glyphs that comprise the fonts used to render textual content within the top and bottom border edges.

Disclosed herein are various techniques for precisely and reliably positioning top and bottom border edges relative to textual content. For example, in certain embodiments the positional variance of the border edges described above is eliminated by positioning the top and bottom border edges based on the shape of the glyphs that comprise the fonts present in textual content. One implementation of this solution is illustrated in FIG. 1B. The top border edges 12ℓ, **12*c*, 12*r* are aligned with an ascent-based border edge 14*a* which is positioned based on the shapes of all of the glyphs that comprise the fonts present in text columns 10ℓ, 10*c*, 10*r*. More particularly, ascent-based border edge 14*a* is positioned based on the glyph with the largest ascent from amongst all the glyphs that comprise all the fonts within text columns 10ℓ, 10*c*, 10*r*. The bottom border edges 14ℓ, 14*c*, 14*r* are aligned with a baseline-based border edge 14*b*, which is positioned at the baseline of the last line of text in each text column 10ℓ, 10*c*, 10*r*, or with a descent-based border edge 14*d*, which is positioned based on the glyph with the largest descent from amongst all the glyphs that comprise all the fonts within the text columns 10ℓ, 10*c*, 10*r*. This causes the border in each text column 10ℓ, 10*c*, 10*r* to have identical top and bottom border edges, thus eliminating variance in border edge positioning among columns. Additionally, in these embodiments, top and bottom border edges are unaffected by changes in the glyphs present in the first or last lines of the text columns 10ℓ, 10*c*, 10*r***. This allows borders to be applied precisely and reliably, thus making it easier for digital publishers to achieve a desired bordering effect.

Figure 1C:
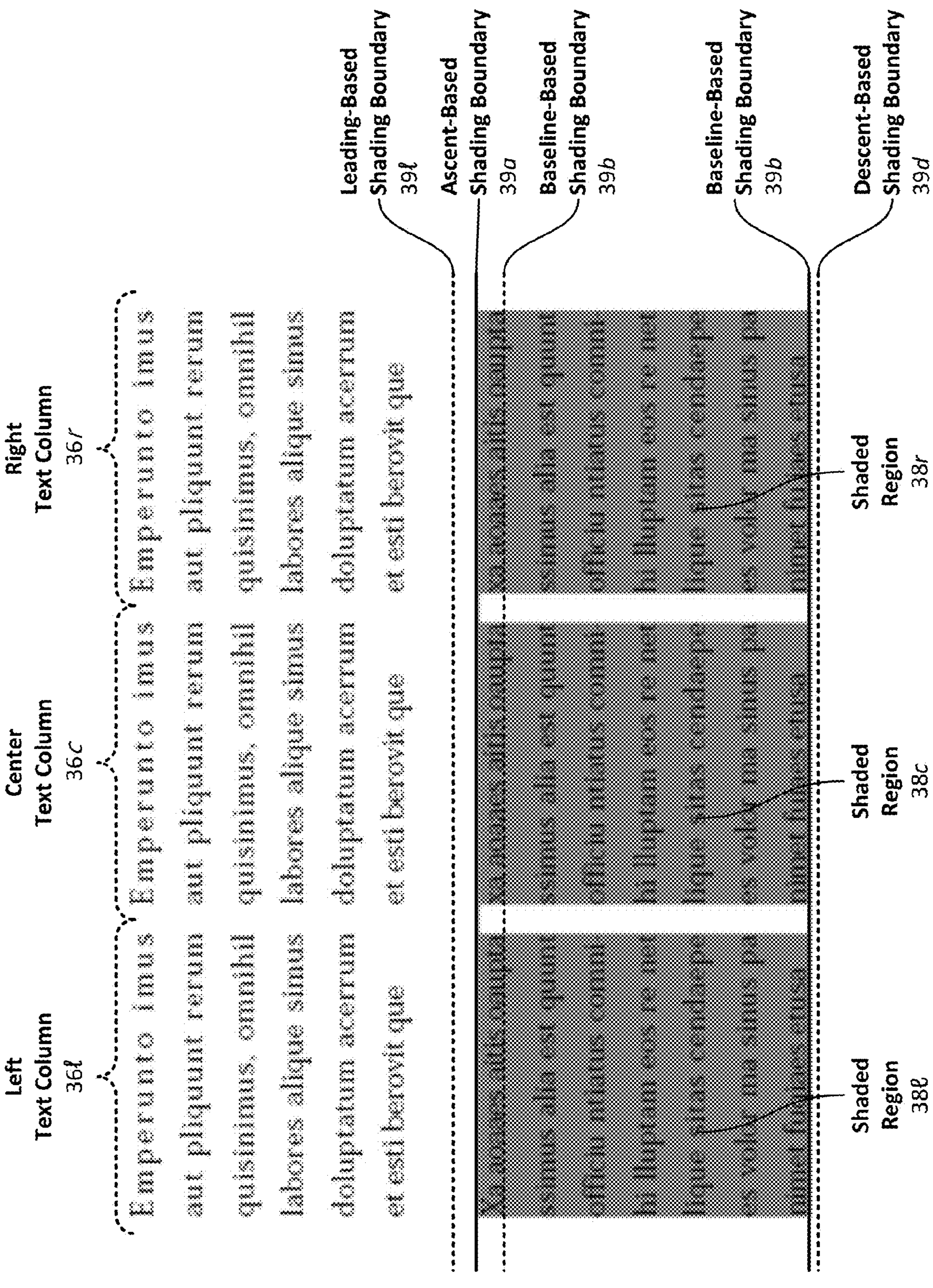
FIG. 1C illustrates three text columns, each of which includes a shaded region defined by top and bottom boundaries that are positioned based on the shape of the glyphs that comprise the fonts present in each shaded region.

Also disclosed herein are various techniques for precisely and reliably positioning top and bottom boundaries that define a region of background shading that is applied to textual content. One implementation of this solution is illustrated in FIG. 1C. The top boundaries of shaded regions 38ℓ, **38*c*, 38*r* are aligned with an ascent-based shading boundary 39*a* which is positioned based on the shapes of all of the glyphs that comprise the fonts present in each shaded region 38ℓ, 38***c*, 38*r*. More particularly, ascent-based shading boundary 39*a* is positioned based on the glyph with the largest ascent from amongst all the glyphs that comprise all the fonts within shaded regions 38ℓ, 38*c*, 38*r*. The bottom boundaries of shaded regions 38€, 38*c*, 38*r* are aligned with a baseline-based shading boundary 39*b*, which is positioned at the baseline of the last line of text in each shaded region 38ℓ, 38*c*, 38*r*. This causes the shading in each text column 36ℓ, 36*c*, 36*r* to have identical top and bottom boundaries, thus eliminating any unshaded gaps. It also means that the top and bottom boundaries are unaffected by changes in the glyphs present in the first or last lines of shaded regions 38ℓ, 38*c*, 38*r*. This allows the background shading to be applied precisely and reliably, thus making it easier for digital publishers to achieve a desired background shading effect.

General Overview: Left and Right Border Edges and Shading Boundaries

Figure 2A:
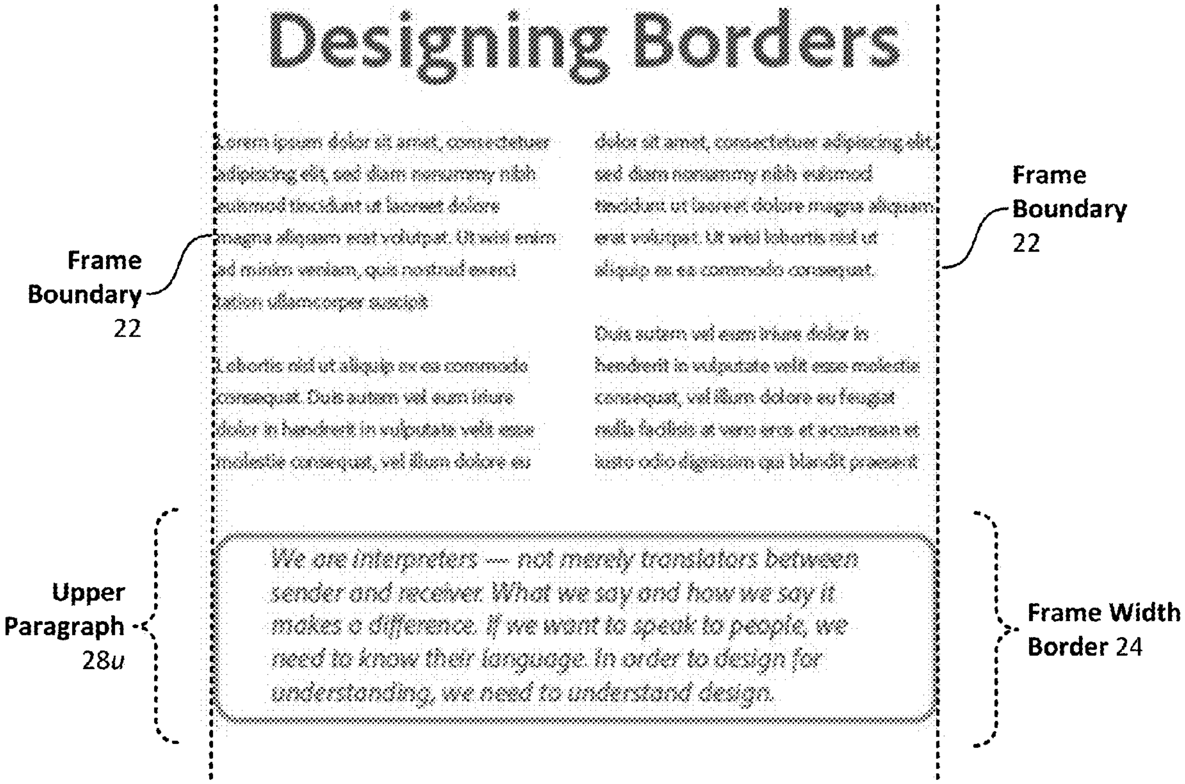
FIG. 2A illustrates a column of textual content having a paragraph to which frame-width border edges have been applied.

Desktop publishing applications can be understood as positioning textual content in a text frame having a size and position that can be manipulated according to user preference. When a border is applied to the textual content within the text frame, existing desktop publishing applications position left and right border edges such that they coincide with the left and right boundaries of the text frame. However, in many cases the left and right boundaries of the textual content do not actually coincide with the left and right boundaries of the text frame. For example, textual content can be aligned to the left, right, or center of the text frame, or at an arbitrary position within the text frame. The text frame may have an internal margin. Because of factors such as these, a gap may exist between the edge of the textual content and the edge of the text frame. If a border is applied to the text frame without regard to how textual content is positioned therein, this gap will be visible. This effect is shown in FIG. 2A, which illustrates a text column having an upper paragraph 28*u* to which column width bordering 24 has been applied. Column width bordering 24 extends to frame boundary 22, regardless of the fact that the textual content does not. For a digital publisher who wishes to produce a tighter fit between borders and textual content, the presence of this gap having no text will be undesirable. Existing desktop publishing applications therefore make it difficult for a digital publisher to precisely position left and right border edges for textual content.

Figure 2B:
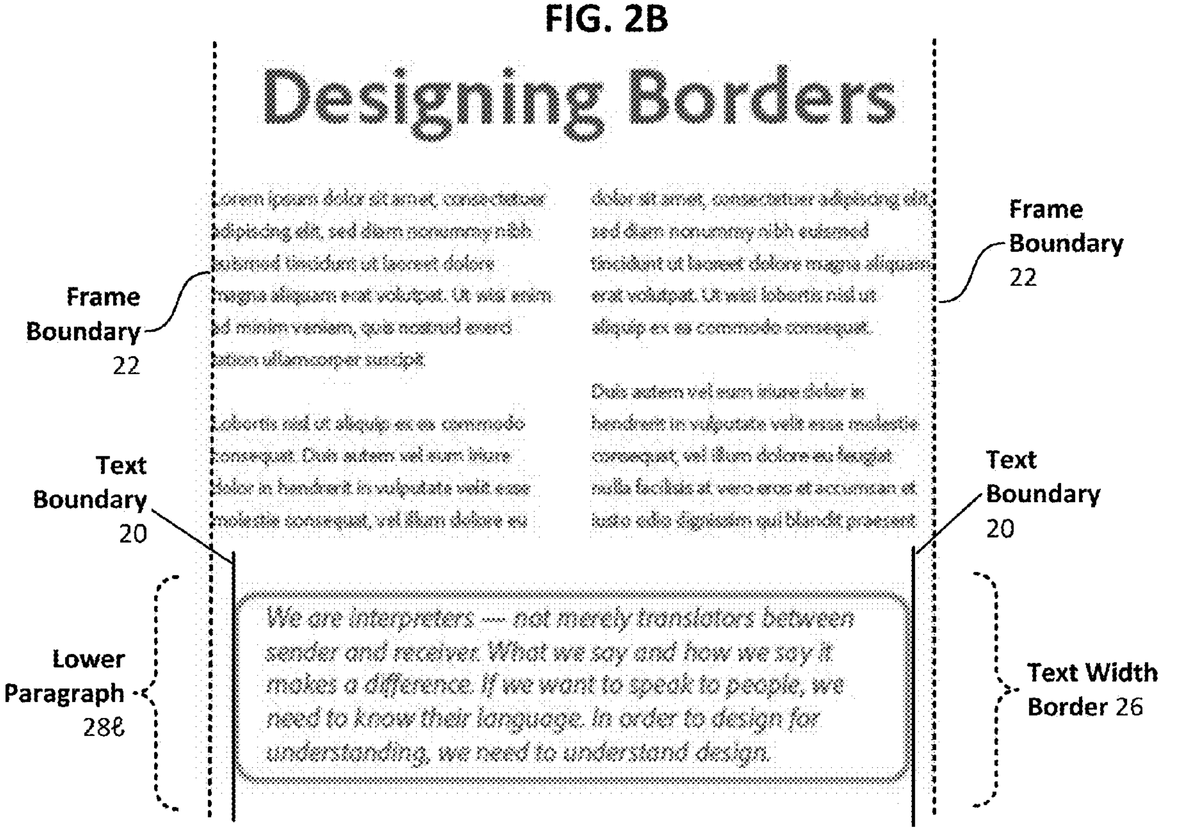
FIG. 2B illustrates a column of textual content having a paragraph to which text-width border edges have been applied.

Disclosed herein are various techniques for precisely and reliably positioning right and left border edges relative to textual content. For example, in certain embodiments the aforementioned gap having no text is lessened or eliminated by positioning the left and right border edges along a text boundary 20 that corresponds to how the textual content is actually positioned within the text frame. This solution is shown in FIG. 2B. In particular, the text column illustrated in FIG. 2B includes a lower paragraph 28ℓ to which text-width bordering has been applied. Text-width border 26 extends only to text boundary 20, thus eliminating any gap that may reside between the text boundary 20 and the frame boundary 22, and that contains no text. Certain embodiments allow a digital publisher to choose whether to apply frame-width bordering or text-width bordering to specified textual content. This allows a border to be applied precisely and reliably, thus making it easier for the digital publisher to achieve a desired border effect.

Also disclosed herein are various techniques for precisely and reliably positioning right and left boundaries that define a region of background shading that is applied to textual content. For example, in certain embodiments a shaded region having no text is eliminated by positioning the left and right boundaries of the shaded region along a text boundary 320 that corresponds to how the text is actually positioned within the text frame. This solution is also shown in FIG. 2C. In particular, the text column illustrated in FIG. 2C includes a lower paragraph 328ℓ to which text-width background shading 326 has been applied. Text-width background shading 326 extends only to text boundary 320, thus eliminating shading from the region that is between text boundary 320 and frame boundary 322, and that contains no text. Certain embodiments allow a digital publisher to choose whether to apply frame-width background shading 324 or text-width background shading 326 to specified textual content. This allows the background shading to be applied precisely and reliably, thus making it easier for the digital publisher to achieve a desired background shading effect.

General Overview: Mixed Edge Borders

Desktop publishing applications can be understood as generally rendering either top and bottom border edges, left and right border edges, or both top and bottom and left and right border edges. Border edges rendered in these positions are described above. However, existing desktop publishing applications are limited to providing border edges in these combinations. Thus, to create single edge borders or mixed edge borders that combine single vertical and horizontal edges, users have resorted to workarounds. These workarounds involve creating multiple lines, resizing the lines to match bounds to the textual content to be bordered, and superimposing the lines on a text frame including the textual content, thereby creating a single edge or other mixed edge border. Disadvantages suffered by this workaround include the need to resize and/or reposition the lines, if the textual content, or the text frame housing the textual content, change.

Disclosed herein are various techniques for precisely and reliably positioning single edge and mixed edge borders relative to textual content. For example, certain embodiments remove the need for the workaround described above by allowing a user to select one or more edges of a border to be applied to textual content. An example of this solution is illustrated in FIG. 3. In particular, the text column illustrated in FIG. 3 includes a mixed edge border 30 as applied to textual content. As illustrated, the mixed edge border 30 includes a horizontal edge and a vertical edge. Using the bordering techniques described herein, some embodiments position the mixed edge border 30 reliably and precisely regardless of the particular glyphs used in textual content and/or the size of the text frame housing the textual content. These features, in turn, make it easier for the digital publisher to achieve a desired border effect.

General Overview: Applying Borders and Background Shading to CJK Characters

The aforementioned challenges associated with precisely controlling how bordering is applied to textual content may be exacerbated when typesetting glyphs that are arranged in a frame grid as opposed to along a baseline. Arranging glyphs in a frame grid results in each glyph being placed in a dedicated grid box, also referred to as an "embox." Chinese, Japanese, and Korean (CJK) characters are often typeset in this way, although other character sets associated with other languages may be aligned in emboxes as well. Existing desktop publishing applications position border edges based on the shape of the glyphs that are present along the edges of the textual content to be bordered. When applied to glyphs arranged in a frame grid, the borders therefore will not necessarily extend to the embox edges. The result is that the borders may vary depending on which glyphs are present along the edges of the textual content. Changing a single glyph along an edge of the textual content may cause the border edges to shift. This may produce unexpected changes in the geometry of the borders, which are particularly undesirable where a digital publisher wishes to define the borders precisely and reliably.

Figure 4A:
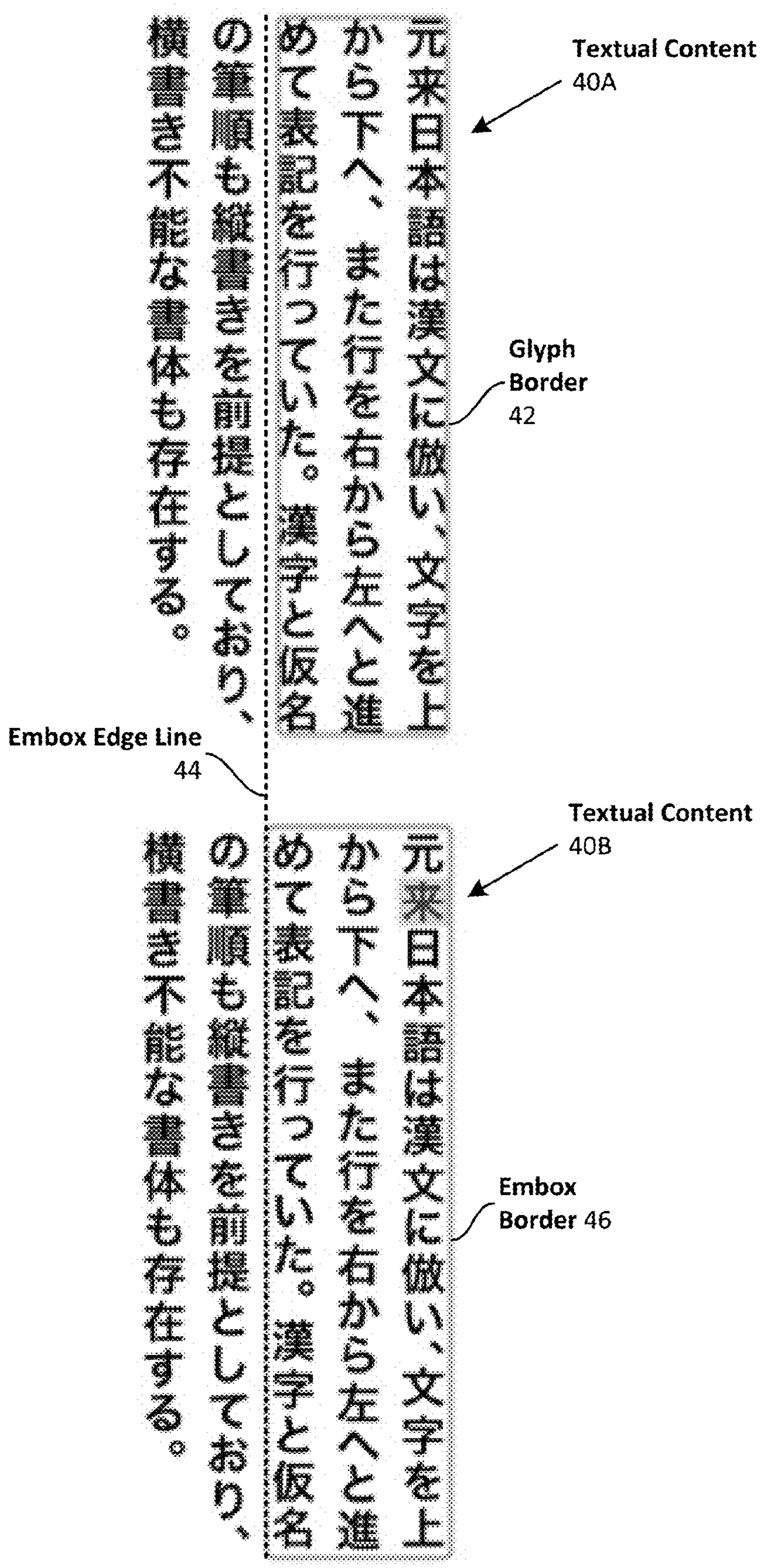
FIG. 4A illustrates textual content within a border that is positioned based on the shape of glyphs located along the edges of the border and a border that is positioned based on the boundaries of emboxes containing the glyphs.

This effect is illustrated in FIG. 4A, which illustrates two copies of Japanese textual content 40A and 40B. The textual content 40A includes a subset of the textual content within a glyph border 42 that is defined based on the shape of the glyphs located along the edges of the subset. In particular, the edge of the glyph border 42 is not aligned with an embox edge line 44 that corresponds to the furthest extent of the embox edges positioned along a given edge of the subset. Thus, the edges of the glyph border 42 are positioned within the emboxes of the subset. The positions of the borders are thus subject to change depending on the particular glyphs present along the edges of the subset. This positional variability is generally considered to be unwanted by many digital publishers.

Disclosed herein are various techniques for precisely and reliably positioning border edges that are applied to characters, such as CJK characters, which are housed in emboxes. For example, in certain embodiments positional variability of border edges is eliminated by aligning the border edges with edges of emboxes associated with glyphs to which a border is to be applied. The border edges will thus coincide with embox edges, as illustrated in FIG. 4A by the embox border 46 and the embox edge line 44. This allows borders to be applied precisely and reliably, thus making it easier for digital publishers to achieve a desired border effect.

Precisely controlling how background shading is applied to CJK textual content, or other textual content aligned in emboxes, is also difficult. Existing desktop publishing applications position the boundaries of a region of background shading based on the shape of the glyphs that are present along the edges of the shaded region. When applied to glyphs arranged in a frame grid, the background shading therefore will not necessarily extend to the embox edges. The result is that the boundaries of the shaded region may vary depending on which glyphs are present along the edges of the shaded region. Changing a single glyph along an edge of the shaded region may cause the boundaries of the shaded region to shift. This may produce unexpected changes in the geometry of the shaded region, which are particularly undesirable where a digital publisher wishes to define the shaded region precisely and reliably.

Figure 4B:
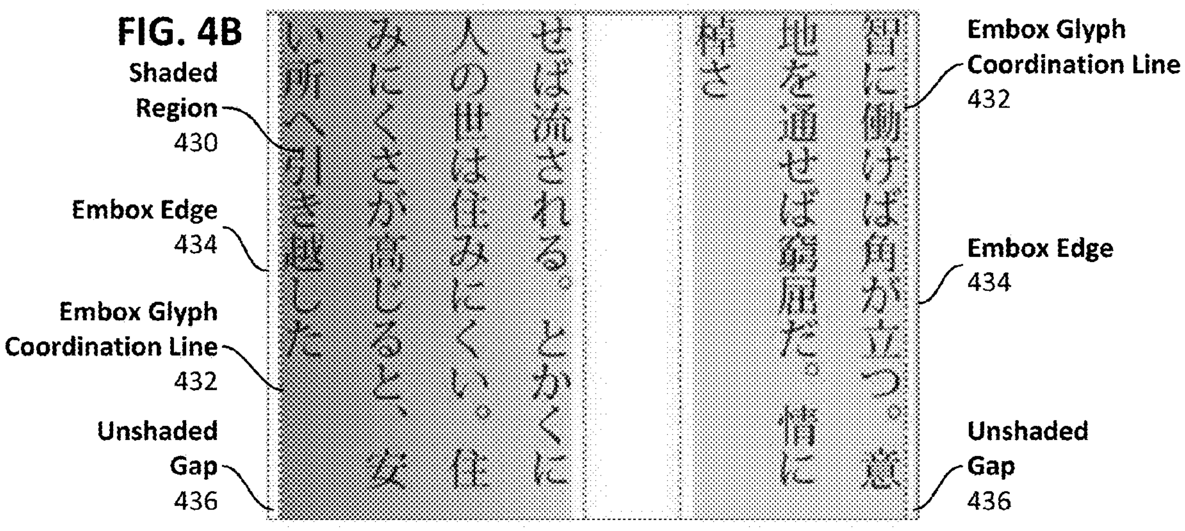
FIG. 4B illustrates Japanese characters within a shaded region defined by boundaries that are positioned based on the shape of the glyphs located along the edges of the shaded region.

This effect is shown in FIG. 4B, which illustrates Japanese text within a shaded region 430 that is defined by boundaries that are based on the shape of the glyphs located along the edges of shaded region 430. In particular, the background shading does not extend past an embox glyph coordination line 432 which corresponds to the furthest extent of the glyphs positioned along a given edge of the text. The result is an unshaded gap 436 located between the glyph edges and embox edges 434. Unshaded gap 436 may intermittently appear, disappear, or change size depending on the particular glyphs present along the edges of shaded region 430. Its presence is generally considered to be an unwanted visual distraction by many digital publishers.

Figure 4C:
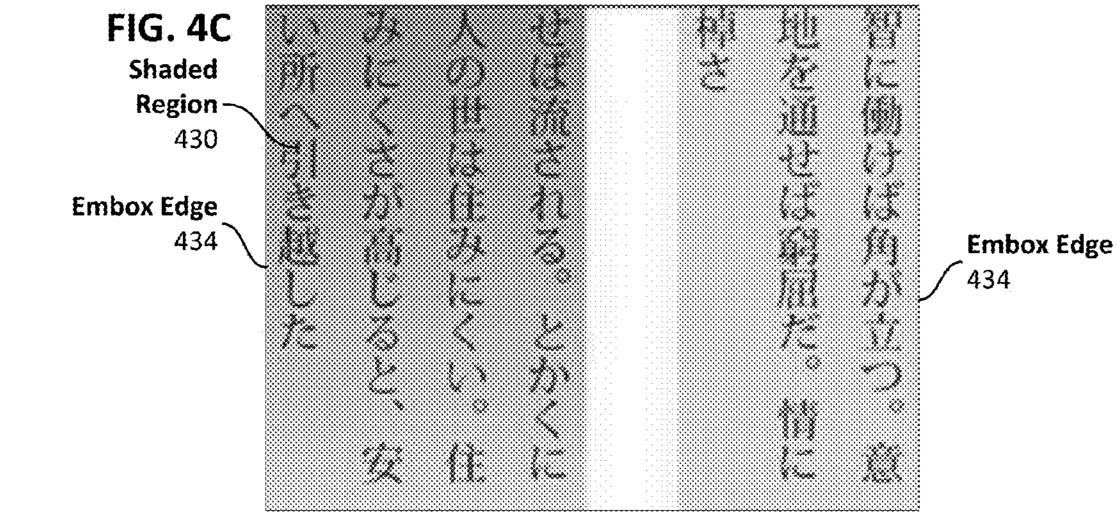
FIG. 4C illustrates Japanese characters within a shaded region that fills emboxes containing the Japanese characters.

Disclosed herein are various techniques for precisely and reliably positioning boundaries that define a region of background shading that is applied to characters, such as CJK characters, which are aligned in emboxes. For example, in certain embodiments unshaded gap 436 is eliminated by shading the entire embox associated with each glyph to which background shading is to be applied. The boundaries of shaded region 430 will thus coincide with embox edges 434, as illustrated in FIG. 4C. This allows the background shading to be applied precisely and reliably, thus making it easier for digital publishers to achieve a desired background shading effect.

General Overview: Border Segmentation and Continuity

Figure 5A:
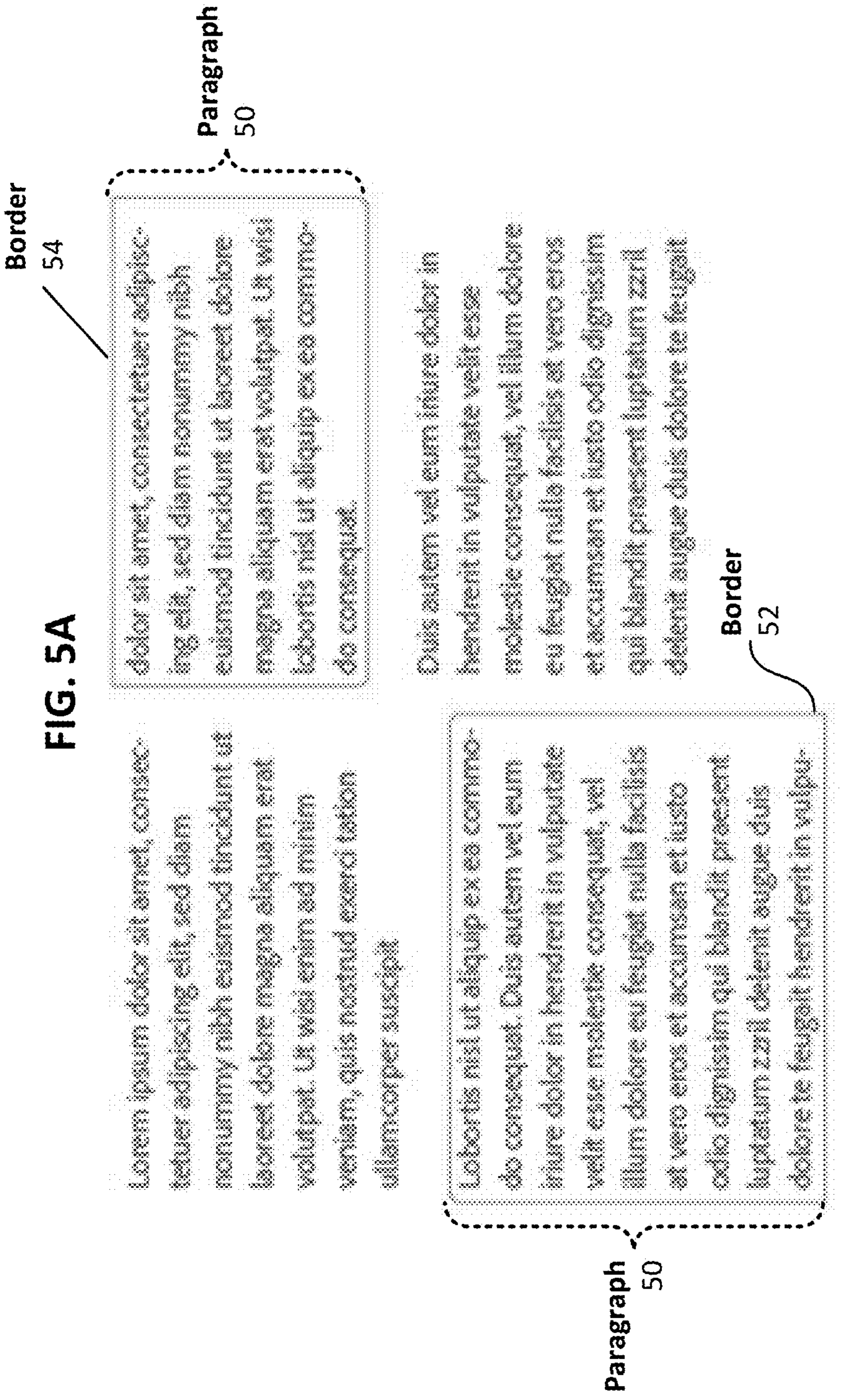
FIG. 5A illustrates textual content that spans multiple columns and two borders of the textual content.
Figure 5B:
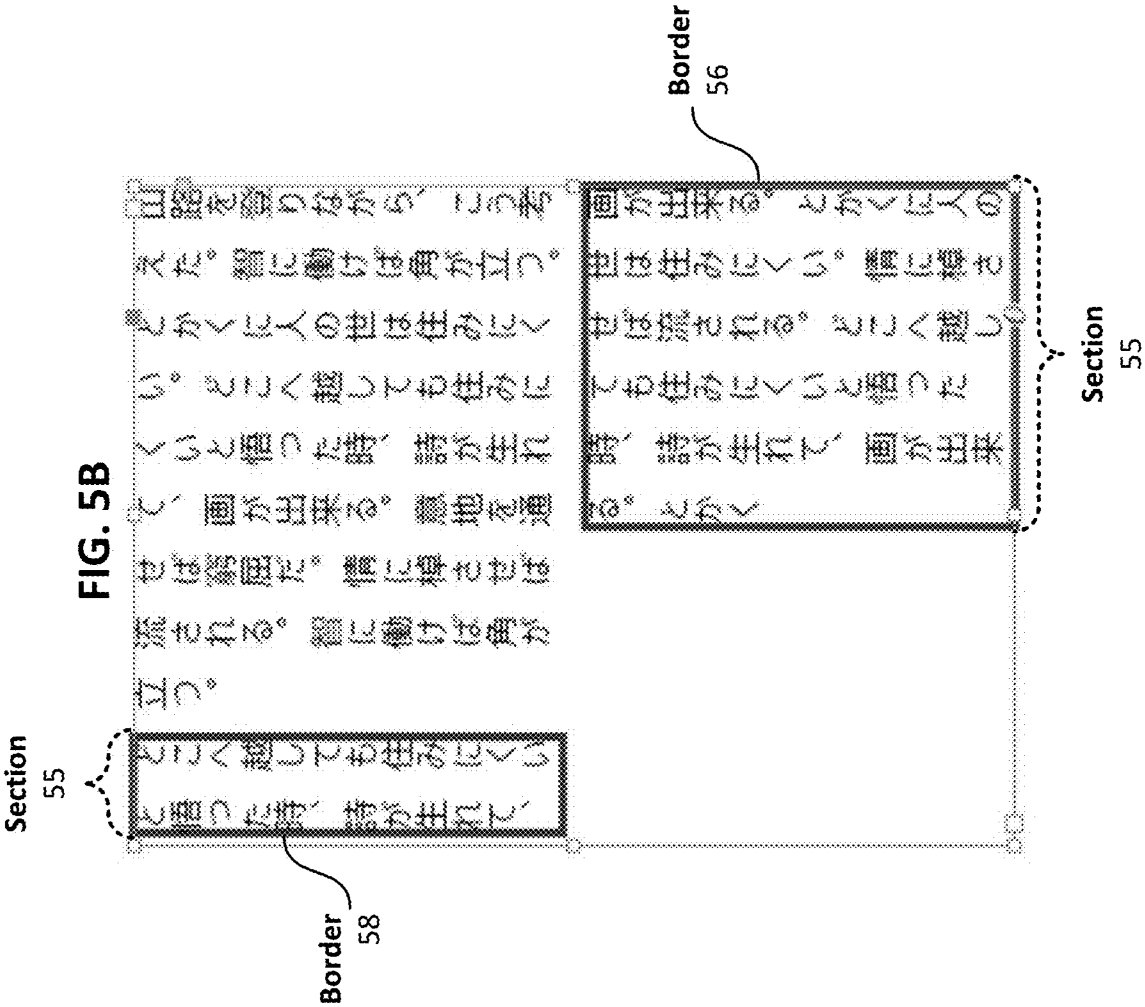
FIG. 5B illustrates textual content that spans multiple rows and two borders of the textual content.

Existing desktop publishing applications segment borders of textual content that spans text frames, even where a single border is intended to encompass all of the textual content. For example, existing desktop publishing applications render two distinct borders for a single paragraph that spans two columns or two rows. This effect is shown in FIGS. 5A and 5B. FIG. 5A illustrates a single paragraph 50 that spans two columns and that, as a result, is encompassed by two borders 52 and 54. FIG. 5B illustrates a single section of textual content 55 that spans two rows and that, as a result, is encompassed by two borders 56 and 58. As can be appreciated in view of FIGS. 5A and 5B, these visual representations lack the continuity that a single border is intended to convey.

Disclosed herein are various techniques for providing a visual indication that a border of textual content that spans text frames is a single, unitary border. For example, in certain embodiments the visual appearance of the border of the textual content is altered to indicate border continuity. One solution that employs the techniques disclosed herein is shown in FIG. 5C. In particular, the borders 52 and 54 have been altered to include continuity indicators (e.g., edges 51 and 53), which are rendered as dashed lines to indicate the borders 52 and 54 are portions of a single, unitary border. FIG. 5D illustrates the same approach, wherein the borders 56 and 58 have been altered to include edges 57 and 59 as continuity indicators. However, in this case, the edges are removed to indicate the borders 56 and 58 are portions of a single, unitary border. Whether vertical or horizontal edges are dashed or removed depends on the glyphs included in the textual content. For example, where the textual content includes Roman and Middle Eastern glyphs, horizontal edges are dashed. However, where the textual content includes CJK glyphs, vertical edges are dashed. This approach allows the borders to maintain a sense of continuity, thus making it easier for the digital publisher to achieve a desired bordering effect.

General Overview: Border Merging

Figure 6A:
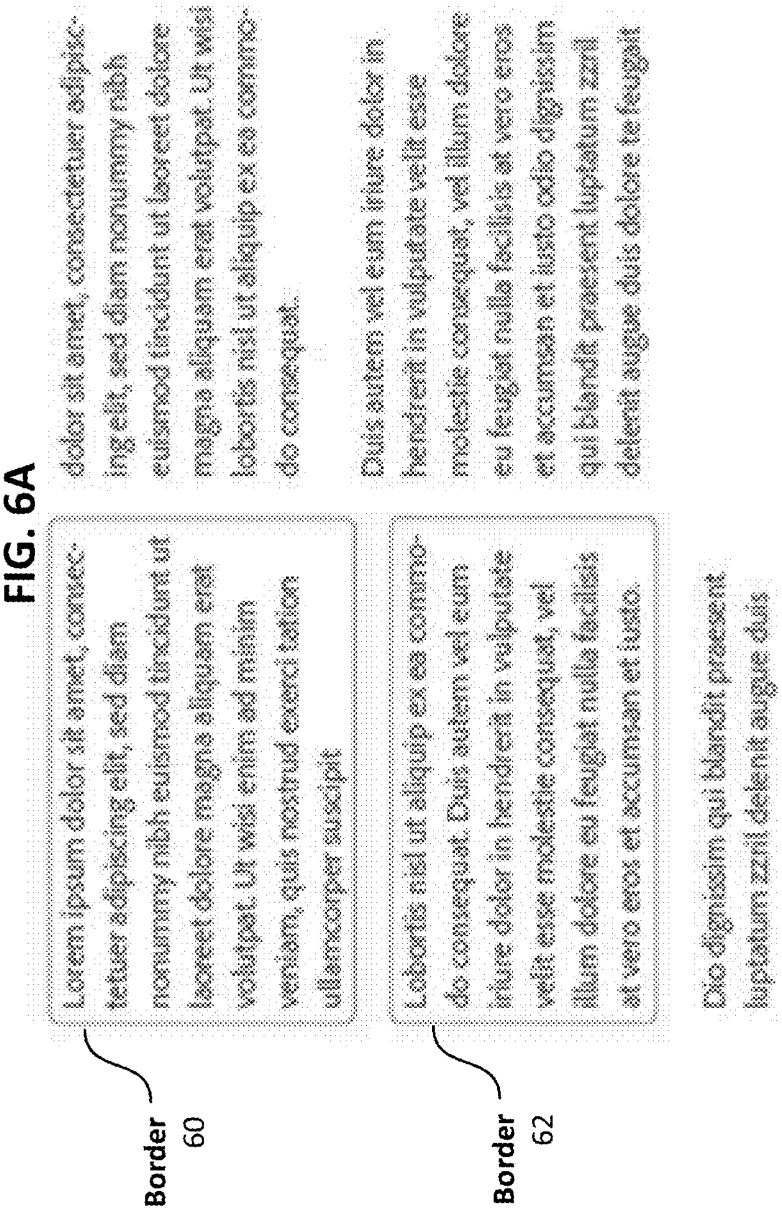
FIG. 6A illustrates textual content that includes abutting paragraphs having distinct borders.
Figure 6B:
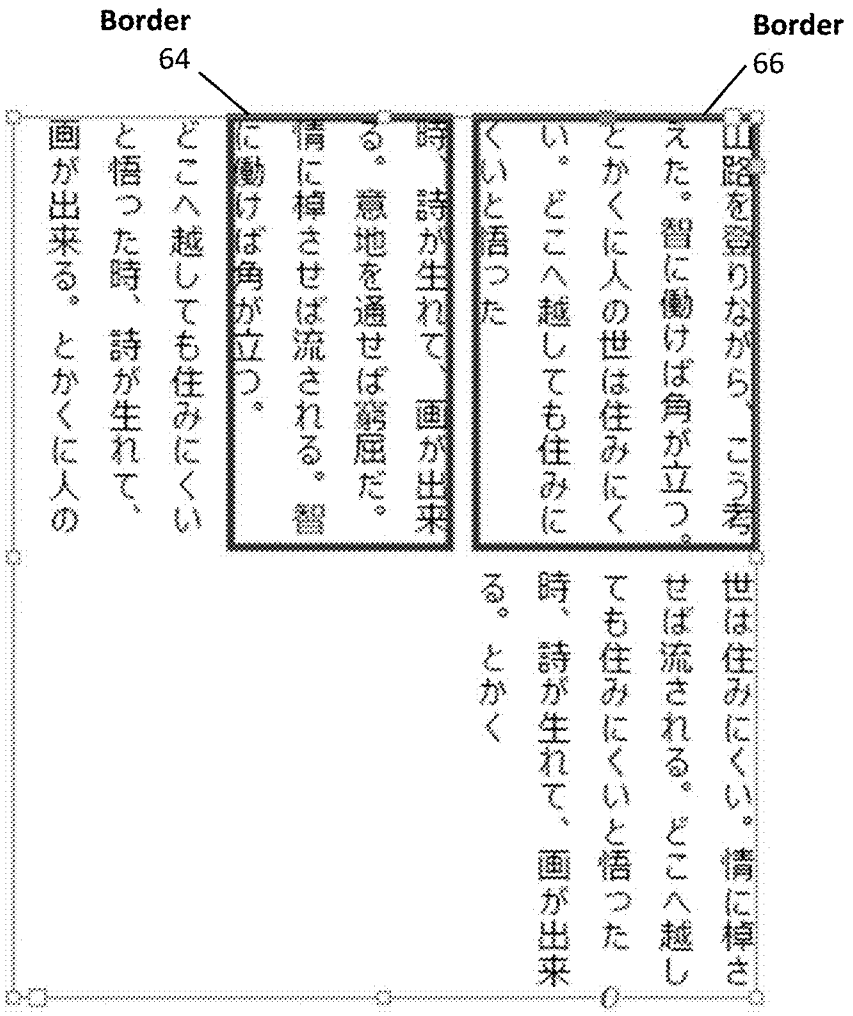
FIG. 6B illustrates textual content that includes abutting paragraphs having distinct borders.

Existing desktop publishing applications do not provide a control for merging consecutive borders, even where those borders have the same attributes. In some instances, maintaining respective, consecutive borders may decrease the relevance of the borders. This effect is shown in FIGS. 6A and 6B. FIG. 6A illustrates two consecutive borders 60 and 62 having common attributes. As shown, despite these common attributes, the borders 60 and 62 remain respective and consecutive. Similarly, FIG. 6B illustrates two consecutive borders 64 and 66 having common attributes that remain respective and consecutive. As can be appreciated in view of FIGS. 6A and 6B, these visual representations lack the relevance that a single bordered section of textual content may convey.

Disclosed herein are various techniques for merging respective and consecutive borders with a common set of attributes. One solution that employs these techniques is shown in FIG. 6C. In particular, the borders 60 and 62 have been merged into a single, unitary border 68. FIG. 6D illustrates the same approach, wherein the borders 64 and 66 have been merged into a single, unitary border 69. This approach allows for merging of the borders increase the relevance of a particular section of textual content, thus making it easier for the digital publisher to achieve a desired bordering effect.

General Overview: Stylized Corner Boundaries and Corners

Desktop publishing applications can be understood as generally rendering background shading with square shaped corners. Thus, desktop publishing applications do not provide users with a way to apply more complex, stylized corners to background shading. To create background shading with more complex, stylized corners, users have resorted to workarounds. These workarounds may involve applying background shading to a text frame including textual content to be shaded and/or superimposing a graphic frame over textual content to be shaded. Disadvantages suffered by these workarounds include the need to sacrifice the precise layout desired in some cases and/or the need to maintain the graphic frame separately from the textual content.

Figure 7A:
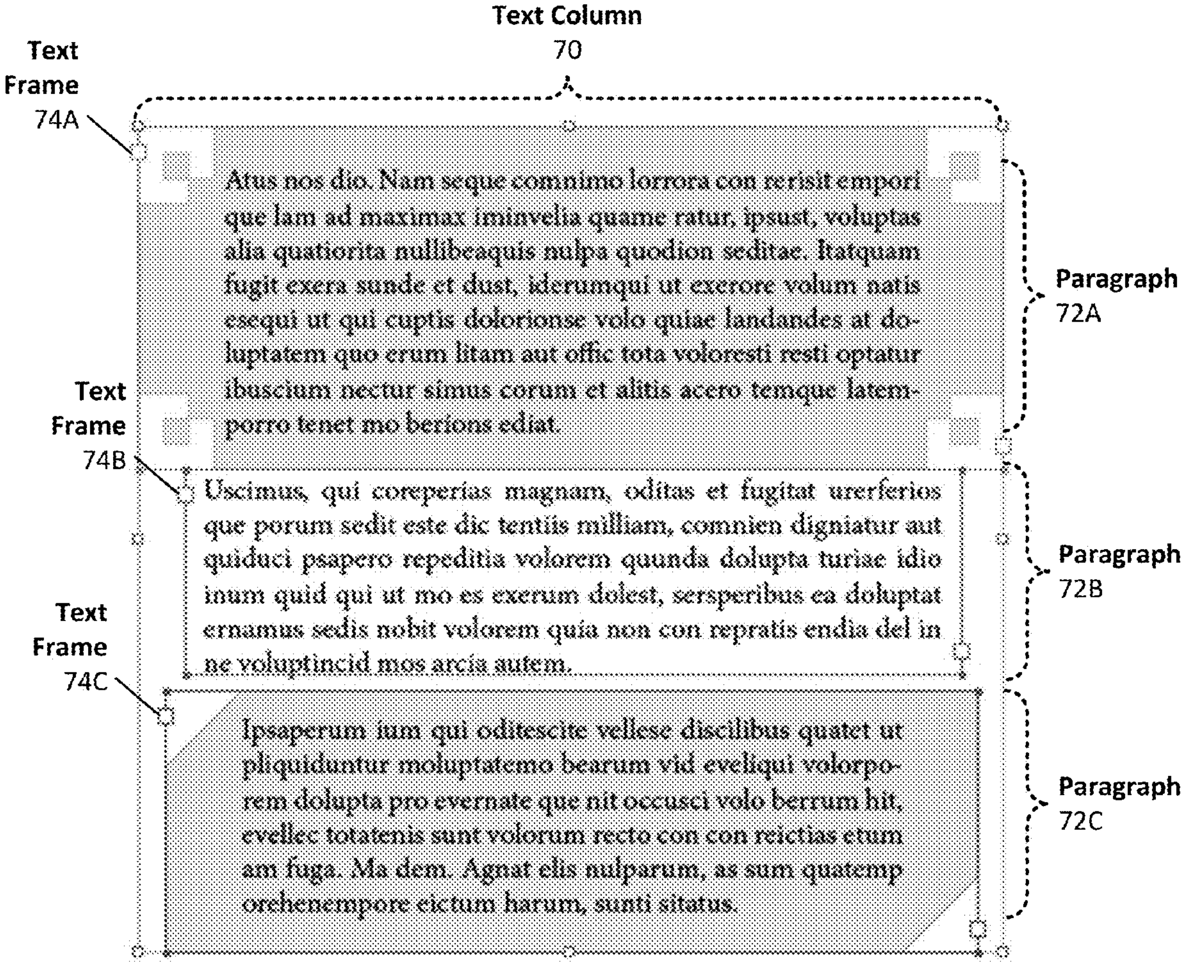
FIG. 7A illustrates a column of textual content with two paragraphs having background shading with stylized corners generated by a workaround.

FIG. 7A illustrates one workaround developed by users to render textual content having background shading with stylized corners. This workaround uses distinct text frames for each section of textual content to be shaded. As shown, FIG. 7A includes a text column 70 that includes 3 paragraphs 72A, 72B, and 72C. Paragraph 72A resides in a text frame 74A. Paragraph 72B resides in a text frame 74B. Paragraph 72C resides in a text frame 74C. According to this workaround, each text frame encapsulates both the background shading with stylized corners and the textual content. As such, the space available to the textual content is limited. This can lead to undesirable effects, such as unintended indentation/repositioning of the paragraphs 72A, 72B, and 72C.

Figure 7B:
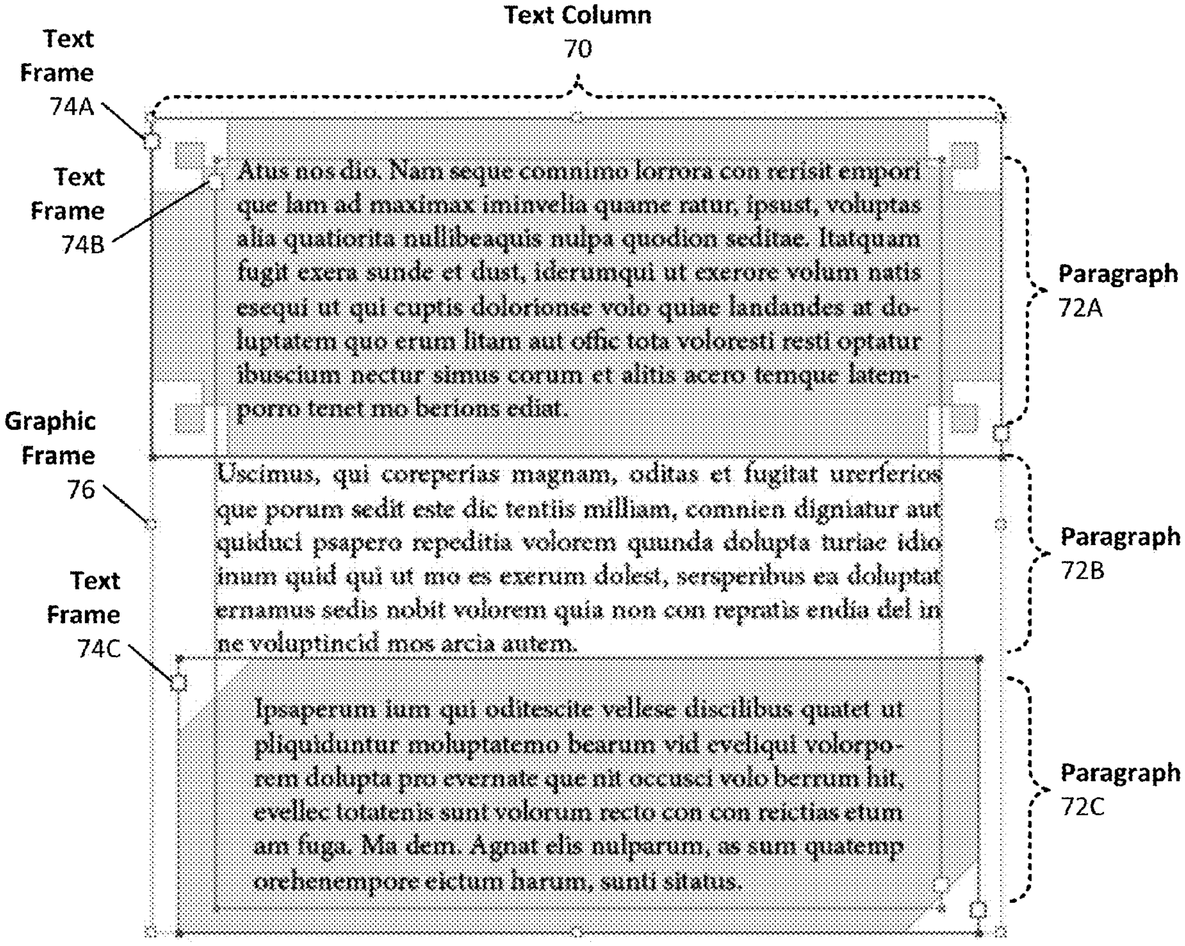
FIG. 7B illustrates a column of textual content with two paragraphs having background shading with stylized corners generated by another workaround.

FIG. 7B illustrates another workaround developed by users to render textual content having background shading with stylized corners. This workaround uses a graphic frame 76 and distinct text frames for each section of textual content to be shaded. As shown, FIG. 7B includes the text column 70 and the 3 paragraphs 72A, 72B, and 72C. Paragraph 72A resides in a text frame 74A. Paragraph 72B resides in a text frame 74B. Paragraph 72C resides in a text frame 74C. According to this workaround, each text frame encapsulates the textual content and the graphic frame 76, which overlays the textual content, contains the background shading with stylized corners. As such, the space available to the textual content may extend to the dimensions of the text frame. Thus, this workaround does not suffer from the space limitations imposed by the workaround described above with reference to FIG. 7A. However, this workaround requires a user to maintain, track, and adjust both the text frames and the graphic frame 76. This workaround can lead to substantial non-productive time where the textual content changes (thus requiring a separate change to the graphic frame 76). Additionally, the layout created by this workaround does not export well to HTML because the stylized corners are not applied directly to the textual content, but instead are applied to a separate HTML element (e.g., a <div> element). The workaround illustrated in FIG. 7B can also be applied to generate borders with stylized corners, such as the borders 90 illustrated in FIG. 9A.

Disclosed herein are various techniques for precisely and reliably positioning background shading and borders with stylized corner boundaries and corners relative to textual content. For example, certain embodiments remove the need for the workarounds described above by allowing a user to select textual content and to select background shading and/or borders and stylized corner boundaries and corners to apply to the selected textual content. An example of this solution is illustrated in FIG. 7C. In particular, the text column 70 illustrated in FIG. 7C includes background shading with stylized corner boundaries applied directly to textual content (i.e., the paragraphs 72A and 72C) rather than frames in which they are contained.

Figure 8A:
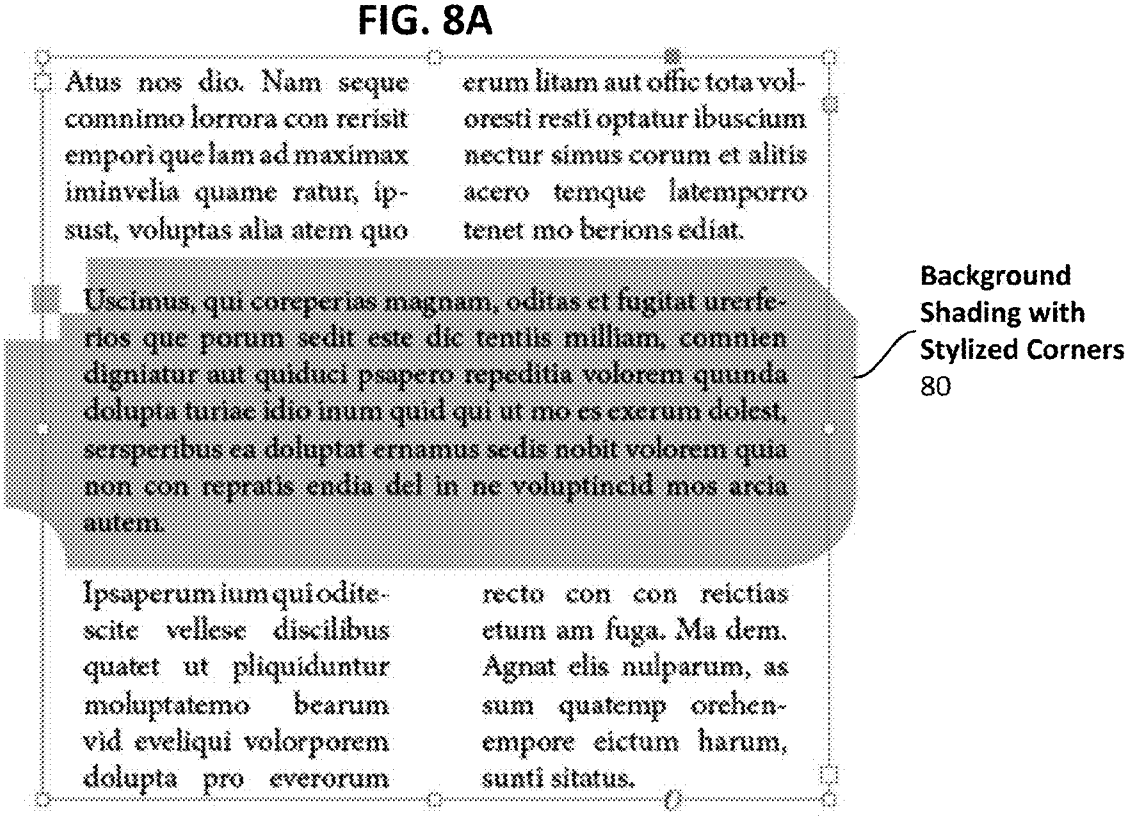
FIG. 8A illustrates a column of textual content with a paragraph having background shading with stylized corners generated by a boundary positioning process.
Figure 8B:
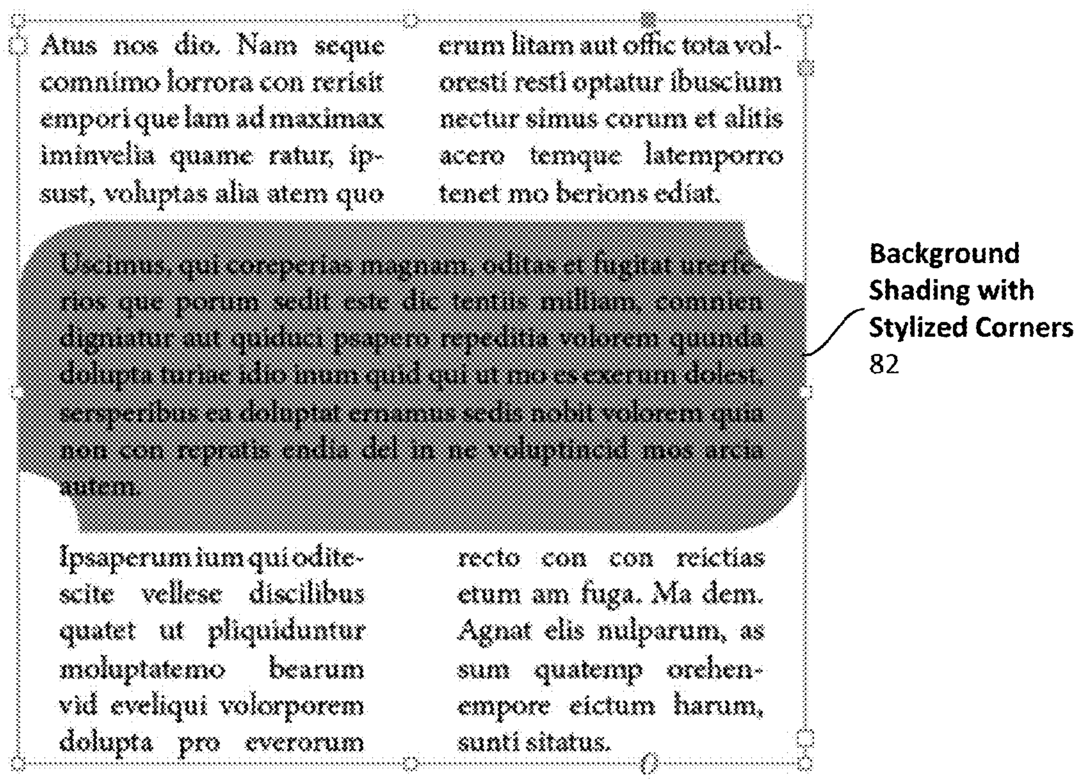
FIG. 8B illustrates a column of textual content with a paragraph having background shading with stylized corners generated by a boundary positioning process.

Others example of this solution are illustrated in FIGS. 8A, 8B, and 9B. As shown, FIG. 8A illustrates background shading 80 including multiple types of stylized corner boundaries that have been applied directly to textual content (i.e., not applied to a graphic frame or a text frame housing the textual content). FIG. 8B, illustrates background shading 82 including multiple types of stylized corner boundaries that have been applied directly to textual content. The background shading 82 illustrated in FIG. 8B includes a gradient swatch. FIG. 9B includes a border with stylized corners 92 applied directly to textual content rather than frames in which it is contained. Using techniques described herein, some embodiments position the background shading and borders with stylized corners reliably and precisely regardless of the particular glyphs used in textual content. These features, in turn, make it easier for the digital publisher to achieve a desired shading and/or bordering effect.

General Overview: Arbitrarily-Shaped Background Shading Regions

Figure 10A:
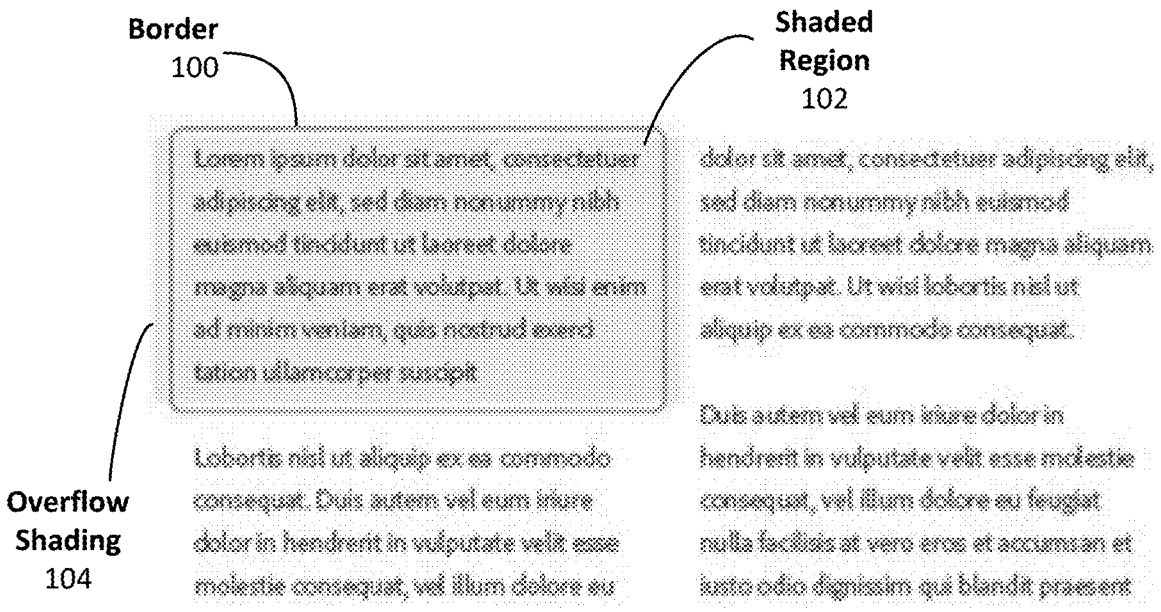
FIG. 10A illustrates textual content with a border, wherein the textual content has background shading that extends outside the border.
Figure 10B:
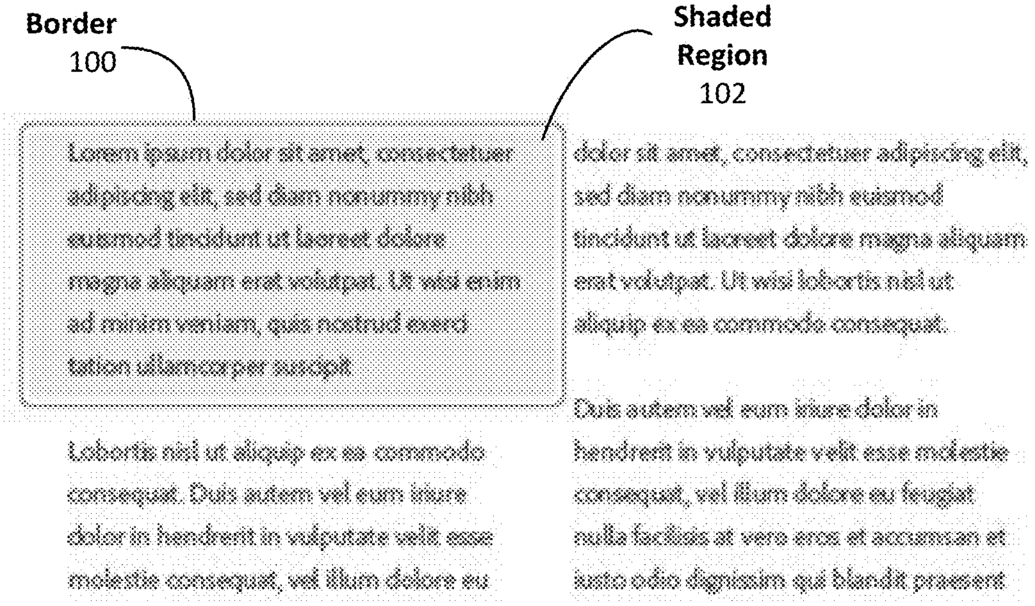
FIG. 10B illustrates textual content that is positioned within a frame-width border, wherein the textual content has background shading that is contained within the frame-width border.
Figures 11A, 11B:
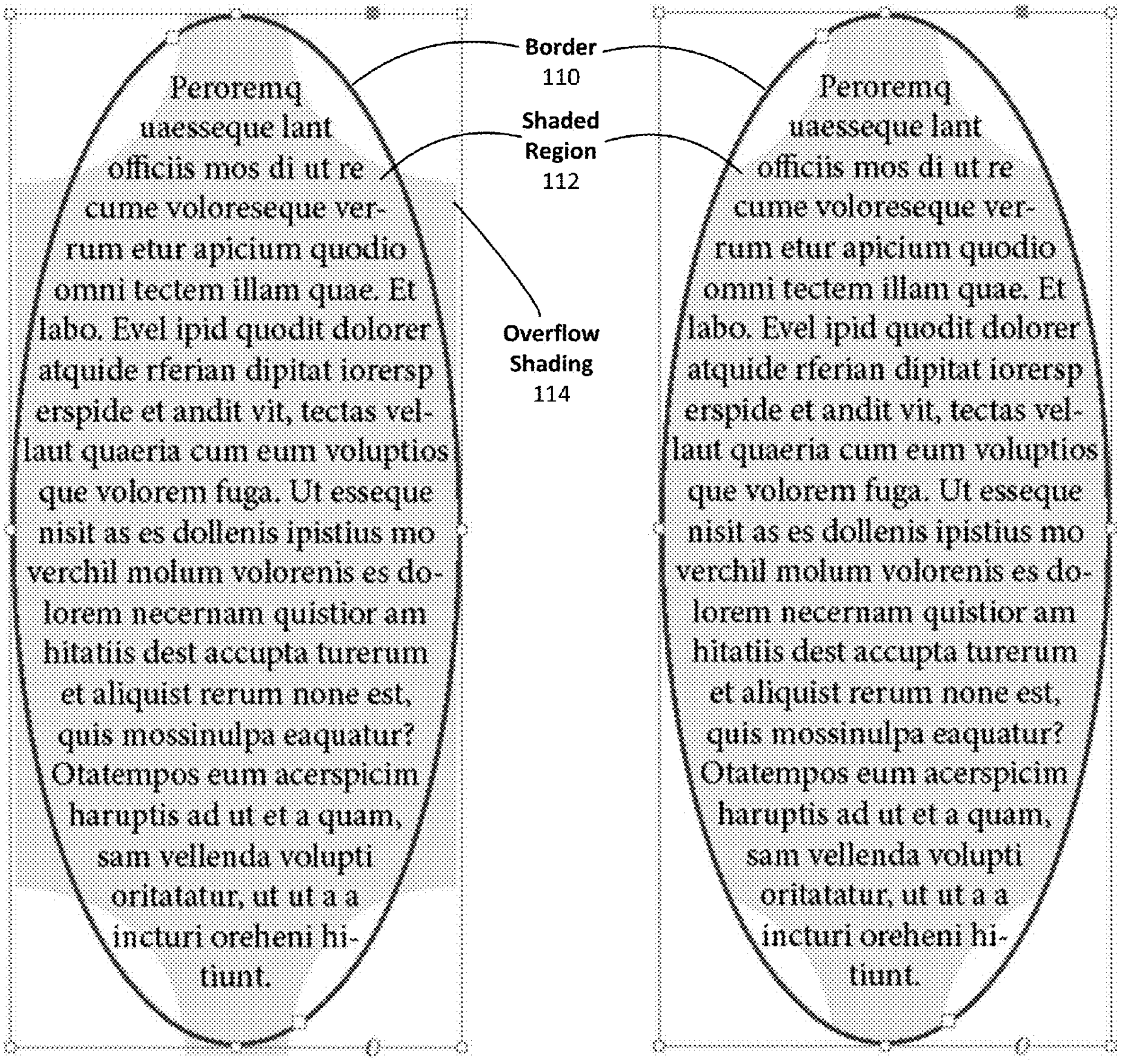
FIG. 11A illustrates textual content with a border, wherein the textual content has background shading with stylized corners that extends outside the border.
FIG. 11B illustrates textual content with a border, wherein the textual content has background shading with stylized corners that is contained within the border.
Figures 12A, 12B:
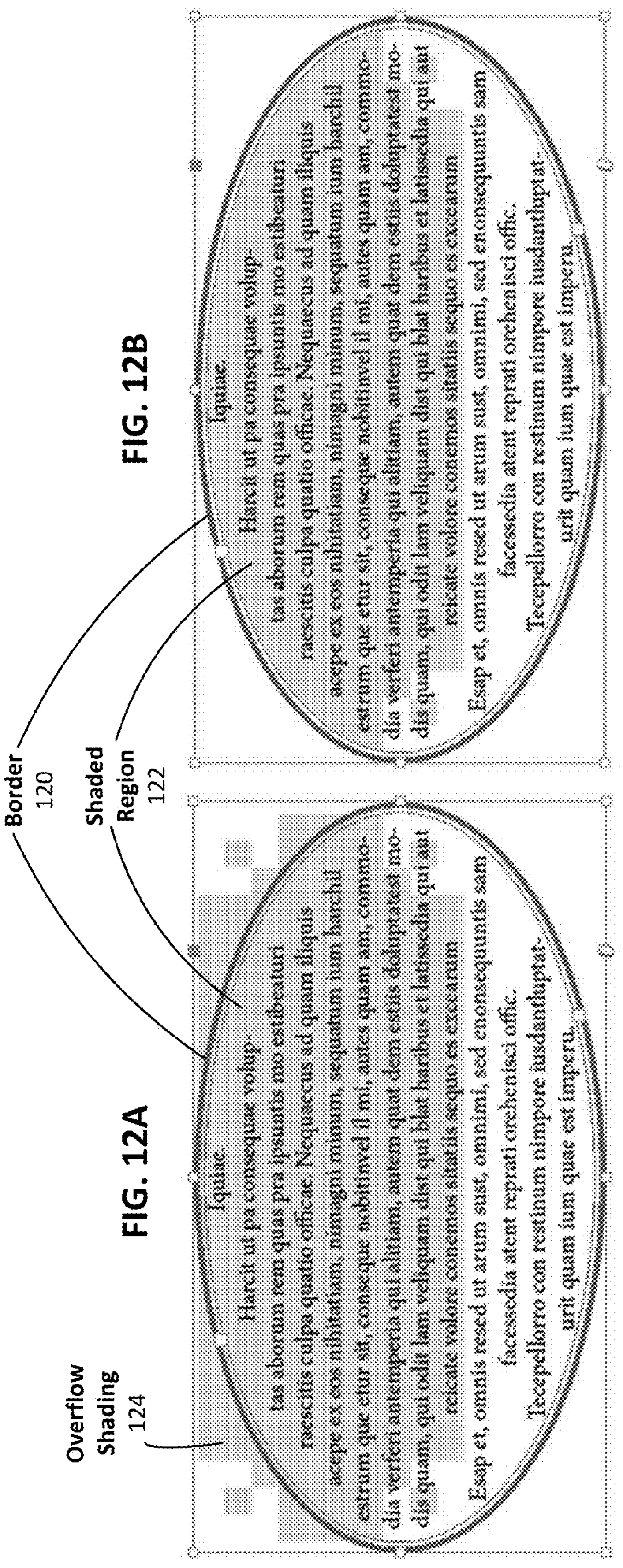
FIG. 12A illustrates textual content with a border, wherein the textual content has background shading with stylized corners that extends outside the border.
FIG. 12B illustrates textual content with a border, wherein the textual content has background shading with stylized corners that is contained within the border.

Existing desktop publishing applications are unable to automatically conform background shading to a border of textual content. As a result, users must manually workaround this issue by creating borders and shading as individual elements. As changes are made to the shaded and bordered textual content, users may have to update the borders and/or the shading to synchronize the spacing between them. Where a user forgets to do so, the shading may, for example, overrun the border. This effect is illustrated in FIGS. 10A, 11A, and 12A, which depict shaded regions 102, 112, and 122 that are positioned within borders 100, 110, and 120, wherein the overflow shadings 104, 114, and 124 extend outside the borders 100, 110, and 120. Preferably, these shadings would not extend outside the borders 100, 110, and 120 as illustrated in FIGS. 10B, 11B, and 12B. Disclosed herein are various techniques for precisely and reliably applying borders and background shading to textual content. For example, in certain embodiments a clipping path is applied to shaded regions 102, 112, and 122 wherein the clipping path is defined by the geometry of the borders 100, 110, and 120. This allows the shaded regions 102, 112, and 122 to conform to the borders 100, 110, and 120 thus providing digital publishers with greater versatility in applying bordering and background shading, and making it easier for them to achieve desired border and background shading effects.

Figure 13A:
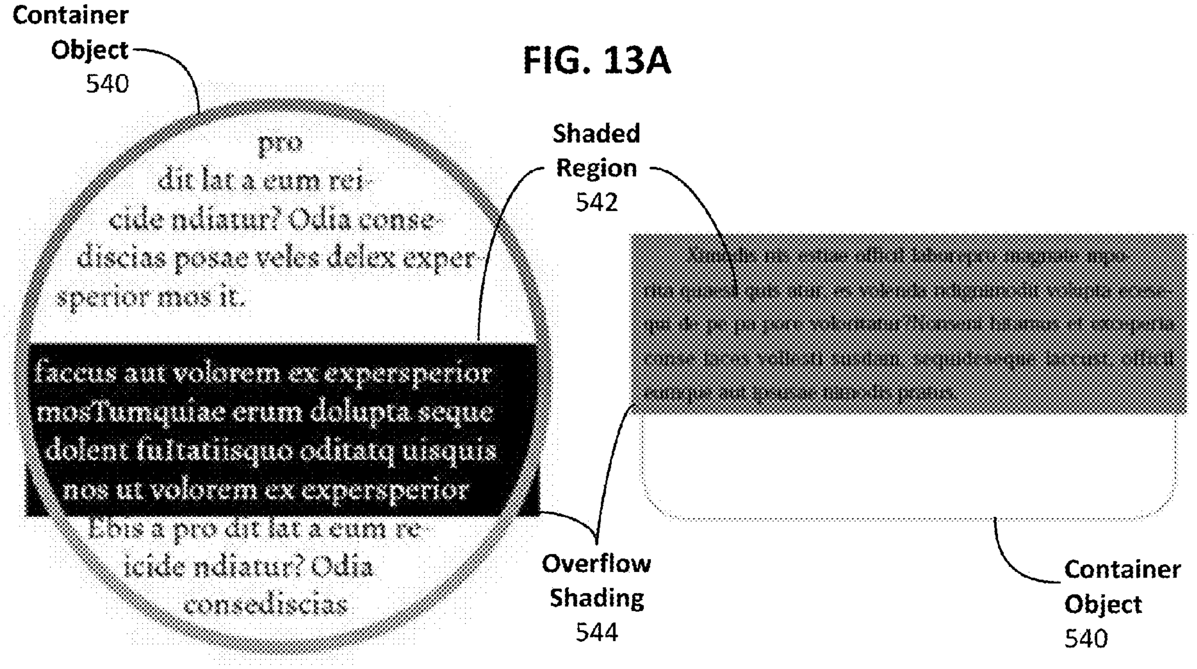
FIG. 13A illustrates textual content that is positioned within a container object, wherein the textual content has background shading that extends outside the container object.
Figure 13B:
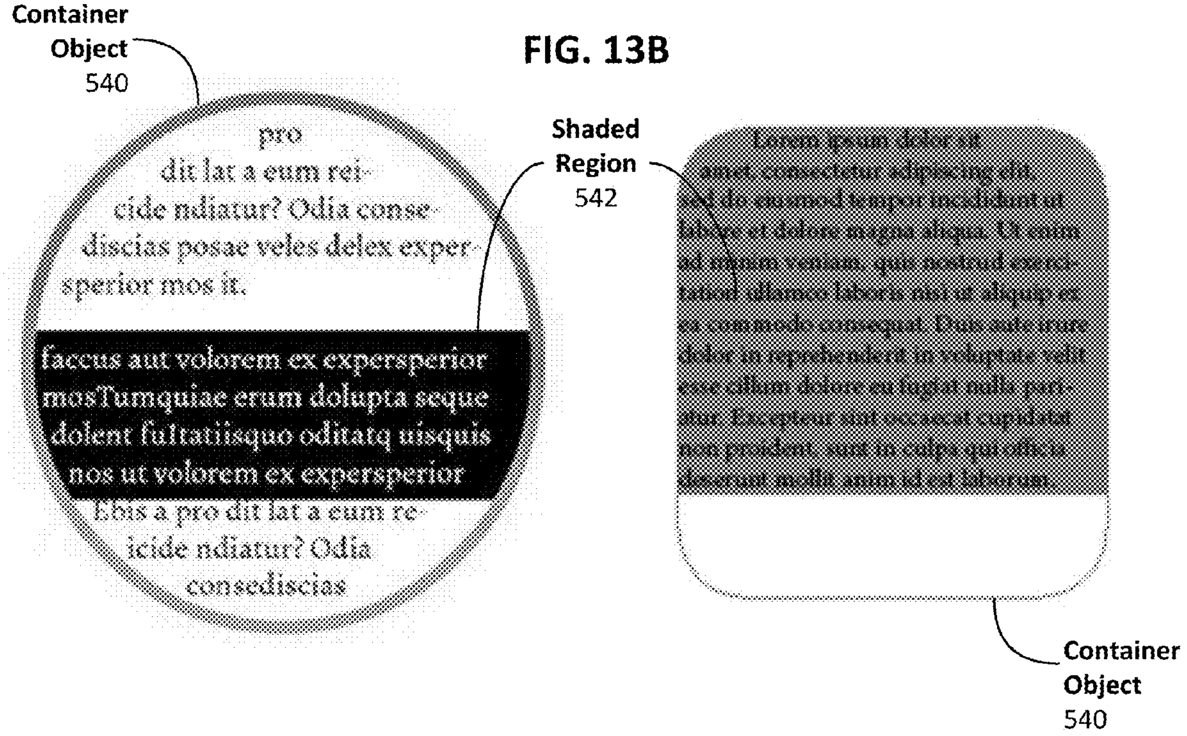
FIG. 13B illustrates textual content that is positioned within a container object, wherein the textual content has background shading that is contained within the container object.

More generally, existing desktop publishing applications are unable to conform background shading to an arbitrarily-shaped object that contains textual content. As a result, the background shading may overrun the container object. This effect is shown in FIG. 13A, which illustrates a shaded region 542 that is positioned within a container object 540, wherein overflow shading 544 extends outside container object 540. Preferably, the background shading would not extend outside container object 540, as illustrated in FIG. 13B. Disclosed herein are various techniques for precisely and reliably applying background shading to an arbitrarily-shaped object that contains textual content. For example, in certain embodiments a clipping path is applied to shaded region 542, wherein the clipping path is defined by the geometry of container object 540. This allows the shaded region 542 to conform to an arbitrarily-shaped container object 540, thus providing digital publishers with greater versatility in applying background shading, and making it easier for them to achieve a desired background shading effect.

General Overview: Definitions

While the various techniques disclosed herein are often described as being used by a digital publisher using a desktop publishing application to manipulate a digital publication, it will be appreciated that such techniques may be implemented using a wide variety of software applications including word processors, spreadsheet applications, presentation applications, photo editors, electronic mail clients, and any other software capable of manipulating digital content. It will also be appreciated that such techniques can be used by not only digital publishers, but indeed by any other user seeking to more precisely and reliability define how borders and background shading is to be applied to textual content, whether that textual content be rendered digitally or in print. For example, although much of this specification describes techniques for applying borders and background shading to digital content, it is appreciated that such digital content may be published in print. As such the scope of this disclosure is intended to cover both digital and printed content.

As used herein the term "region" refers, in addition to its ordinary meaning, to a portion of an output that can be perceived by a user. As such regions may have absolute and relative locations and may comprise physical area or volumes. In some instances, a region will have a length and a width and will be a portion of a display, although any given region is not limited thereto.

As used herein the term "glyph" refers, in addition to its ordinary meaning, to a typographical element that can be understood as including one or more characters. Thus, a paragraph can be understood as including a plurality of glyphs arranged in one or more lines. More generally, textual content can be understood as including a plurality of glyphs, and therefore the terms "textual content" and "plurality of glyphs" may be used interchangeably herein. Textual content can be selected or targeted for operations by a user via a user interface.

In many cases, a one-to-one correspondence exists between glyphs and characters, such as in the case of the character "a" being represented by the glyph "a." However in some cases a combination of multiple characters can be represented by a single glyph. For instance, the characters "o" and "e" can be combined and represented by the single glyph "œ ." Similarly, the characters "f" and "l" can be combined and represented by glyphs such as "ffl" or "fl." As yet another example, the Arabic characters "ف " and "ي " can be combined and represented by the single glyph "في. " The term "ligature" refers to the action of binding two characters together to form a glyph, and therefore the terms "glyph" and "ligature" are often used interchangeably when referring to glyphs that correspond to multiple characters. Although ligatures are used in a wide range of languages, they are particularly common in Arabic.

As used herein the term "font resource" refers, in addition to its ordinary meaning, to information that defines a particular font with sufficient specificity such that the font may be rendered using appropriate software. Such software may include, for example, an operating system, an application such as a word processor or a desktop publishing application, or a device driver that is capable of controlling hardware. A font resource may define a set of glyphs, characters, or symbols using a matrix of dots (in the case of bitmap fonts) or a collection of lines and/or curves (in the case of outline and stroke fonts). The digital information that comprises a font resource can be organized and stored according to a variety of different standards, such as the Glyph Bitmap Distribution Format (BDF) for bitmap fonts, the PostScript (PS) format for outline fonts, or the Metafont description language for stroke fonts. Other proprietary or open source formats can be used in other embodiments, and thus it will be appreciated that the various embodiments disclosed herein are not limited to use of font resource data that is stored in any particular format.

As used herein, the term "background shading" refers, in addition to its ordinary meaning, to a field that is applied behind a foreground element. For example, in certain of the embodiments disclosed herein background shading is applied behind textual content or a frame containing textual content. Background shading may also be applied behind non-textual elements. The field used in background shading may comprise a solid color field, a color field having a gradient, a pattern, or any other suitable appearance. Where background shading comprises a color field, virtually any color can be used, including black, white, and transparent. Background shading may have a degree of transparency, such that additional elements or graphical features located behind the background shading field, such as a watermark, may be at least partially visible. Background shading can be represented by metadata in a wide range of digital formats, including the electronic publication (EPUB) format and hypertext markup language (HTML). The various techniques for applying background shading that are disclosed herein can be applied to background shading generally, and thus are not intended to be limited to any particular type of background shading.

As used herein, the term "border" refers, in addition to its ordinary meaning, to a field that is applied between foreground elements. For example, in certain of the embodiments disclosed herein a border is applied between textual content. A border may also be applied between non-textual elements. The field used to create a border may comprise a solid color field, a color field having a gradient, a pattern, or any other suitable appearance. Where a border comprises a color field, virtually any color can be used, including black, white, and transparent. A border can be represented by metadata in a wide range of digital formats, including the electronic publication (EPUB) format and hypertext markup language (HTML). The various techniques for applying borders that are disclosed herein can be applied to borders generally, and thus are not intended to be limited to any particular type of border.

System Architecture

Figure 14:
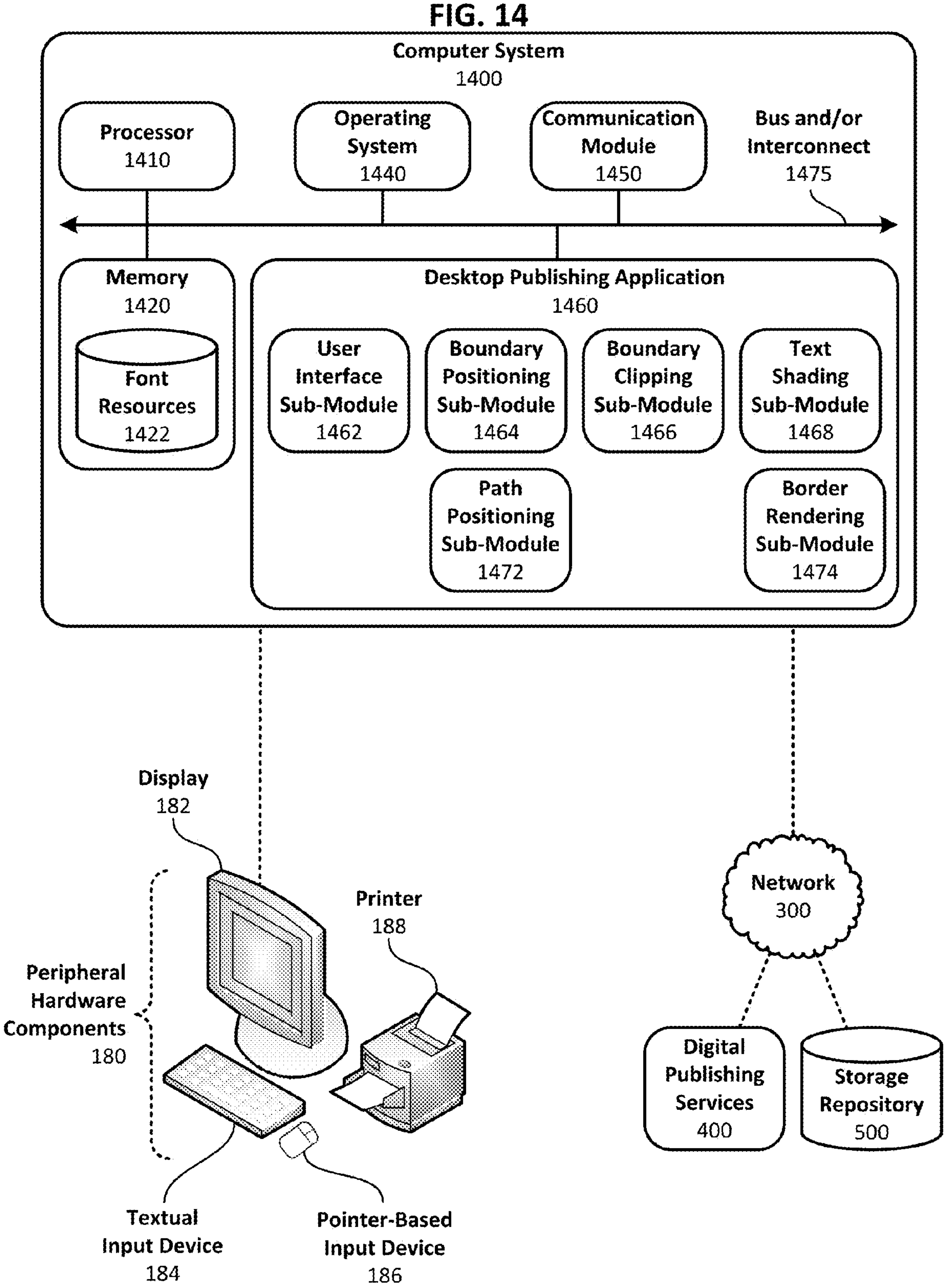
FIG. 14 is a block diagram schematically illustrating selected components of an example computer system that can be used to position border edges that are applied to digitally published textual content and/or to position boundaries that define regions of background shading that are applied to digitally published textual content.

FIG. 14 is a block diagram schematically illustrating selected components of an example computer system 1400 that can be used to position borders and boundaries that define a region of background shading that is applied to digitally published text. Computer system 1400 may comprise, for example, one or more devices selected form a desktop computer, a laptop computer, a workstation, a tablet computer, a smartphone, a handheld computer, a set-top box, an enterprise class server, or any other such computing derive. A combination of different devices may be used in certain embodiments. In the illustrated embodiment, computer system 1400 includes, among other things, a processor 1410, a memory 1420, an operating system 1440, a communication module 1450, and a desktop publishing application 1460. As can be further seen a bus and/or interconnect 1475 is also provided to allow for inter- and intra-device communications using, for example, communication module 1450.

Depending on the particular type of device used for implementation, computer system 1400 is optionally coupled to or otherwise implemented in conjunction with, one or more peripheral hardware components 180. Examples of peripheral hardware components 180 include a display 182, a textual input device 184 (such as a keyboard), a pointer-based input device 186 (such as a mouse), and a printer 188 (or other output device). One or more other input/output devices, such as a touch sensitive display, a speaker, a scanner, a printer capable of generating a three-dimensional object (often colloquially referred to as a "3D printer"), or a microphone, can be used in other embodiments. For example, in a particular alternative embodiment wherein computer system 1400 is implemented in the form of a tablet computer, certain functionality associated with the particular peripheral hardware components 180 illustrated in FIG. 14 is provided instead by a touch sensitive display and a camera that forms part of the tablet computer. In general, computer system 1400 may be coupled to a network 300 to allow for communications with other computing devices or resources, such as remotely-provisioned digital publishing services 400 and/or a networked storage repository 500. Other components and functionality not reflected in the schematic block diagram of FIG. 14 will be apparent in light of this disclosure and thus it will be appreciated that other embodiments are not limited to any particular hardware configuration.

Processor 1410 can be any suitable processor, and may include one or more coprocessors or controllers, such as an audio processor or a graphics processing unit, to assist in processing operations of computer system 1400. Memory 1420 can be implemented using any suitable type of digital storage, such as one or more of a disk drive, a universal serial bus drive, flash memory, and random access memory. Memory 1420 can be used to store font resources 1422 that define the various fonts used by software such as desktop publishing application 1460, although font resources 1422 may additionally or alternatively be stored in networked storage repository 500. Operating system 1440 may comprise any suitable operating system, such as Google Android (Google Inc., Mountain View, CA), Microsoft Windows (Microsoft Corp., Redmond, WA), Apple iOS (Apple Inc., Cupertino, CA), or Apple OS X (Apple Inc., Cupertino CA). As will be appreciated in light of this disclosure, the techniques provided herein can be implemented without regard to the particular operating system provided in conjunction with computer system 1400, and therefore may also be implemented using any suitable existing or subsequently developed platform. Communication module 1450 can be any appropriate network chip or chipset which allows for wired and/or wireless communication via network 300 to external resources such as digital publishing services 400 and networked storage repository 500. Bus and/or interconnect 1475 may also be provided to allow for inter- and intra-device communications using, for example, communication module 1450.

Desktop publishing application 1460 comprises any suitable computer software application that enables users to create and manipulate a wide range of digital content, including digital publications, textual documents, graphical layouts, and the like. To this end, desktop publishing application 1460 includes a wide range of functionality that allows visual aspects of both graphical and textual content to be manipulated. Particularly with respect to textual content, desktop publishing application 1460 includes typography tools that allow borders and background shading to be applied to textual content, as will be described in turn. Desktop publishing application 1460 is capable of manipulating digital content that is stored both locally (for example, in memory 1420) as well as remotely (for example, in networked storage repository 500). Examples of commercially available desktop publishing applications include Adobe® InDesign® (Adobe Systems Incorporated, San Jose, CA) and Microsoft® Publisher (Microsoft Corporation, Redmond, WA).

In certain embodiments desktop publishing application 1460 is installed local to computer system 1400, as illustrated in the example embodiment of FIG. 14. However, in alternative embodiments computer system 1400 is implemented in a client-server computing environment wherein at least a portion of desktop publishing application 1460 is provided to computer system 1400 using an applet, such as a JavaScript applet, or other downloadable module. Such a remotely-provisioned module can be provided in real-time in response to a request from computer system 1400 for access to a server having resources that are of interest to a user of computer system 1400, such as remotely-provisioned digital publishing services 400. The server, if applicable, may be local to network 300 or may be remotely coupled to network 300 by one or more other networks or communication channels. In any such standalone or networked computing scenarios, desktop publishing application 1460 can be implemented with any suitable combination of technologies that allow a user to create and manipulate digital publications.

Still referring to the example embodiment illustrated in FIG. 14, desktop publishing application 1460 includes a user interface sub-module 1462. User interface sub-module 1462 comprises instructions encoded on a computer readable medium that, when executed using a processor, cause a user interface to be generated. The user interface is configured to receive user input that defines how borders and background shading is to be applied to textual content. To this end, the user interface generated by user interface sub-module 1462 may include elements such as menu bars, toolbars, dialog boxes, control panels, dropdown menus, context menus, checkboxes, radio buttons, and the like.

Figure 15A:
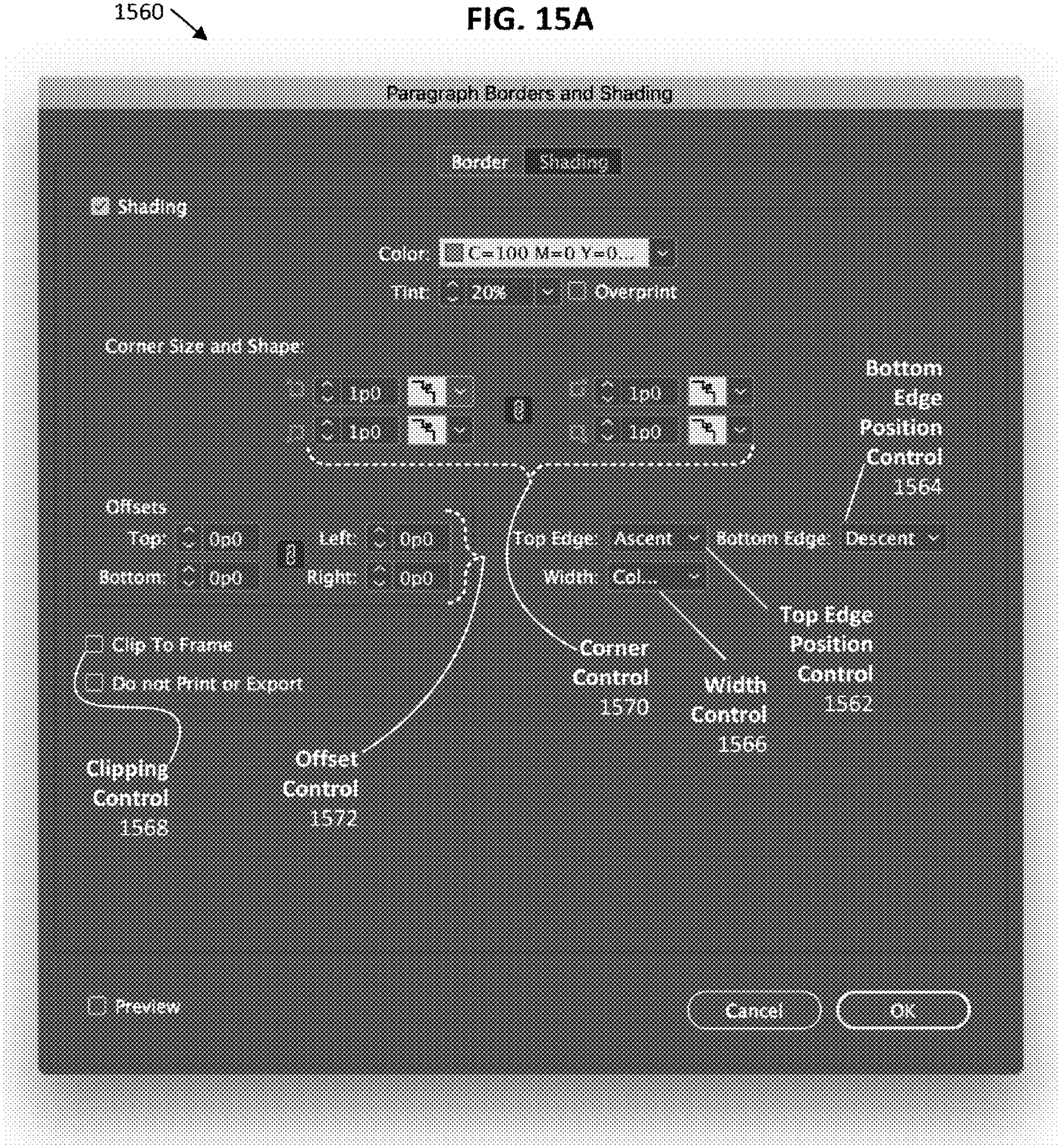
FIG. 15A illustrates an example user interface that can be used to define how background shading is applied to digitally published textual content.

FIG. 15A illustrates an example user interface 1560 that can be used to define how background shading is applied to digitally published text. User interface 1560 includes a top edge position control 1562 that allows a user to select a particular basis for positioning the top boundary of a region of background shading, and a bottom edge position control 1564 that allows a user to select a particular basis for positioning the bottom boundary of a region of background shading. Similarly, user interface 1560 also includes a width control 1566 that allows a user to select a particular basis for positioning the left and right boundaries of a region of background shading. The various bases for positioning the top, bottom, left, and right boundaries of the shaded region will be described in turn. In some implementations, one or more of top edge position control 1562, bottom edge position control 1564, and width control 1566 include a user interface element that allows a numerical position to be input, thus providing even further control over the exact position of the boundaries of the shaded region. In certain embodiments user interface 1560 also includes a clipping control 1568 that allows a user to specify whether the region of background shading should be clipped to the shape of a text container object.

Figure 15B:
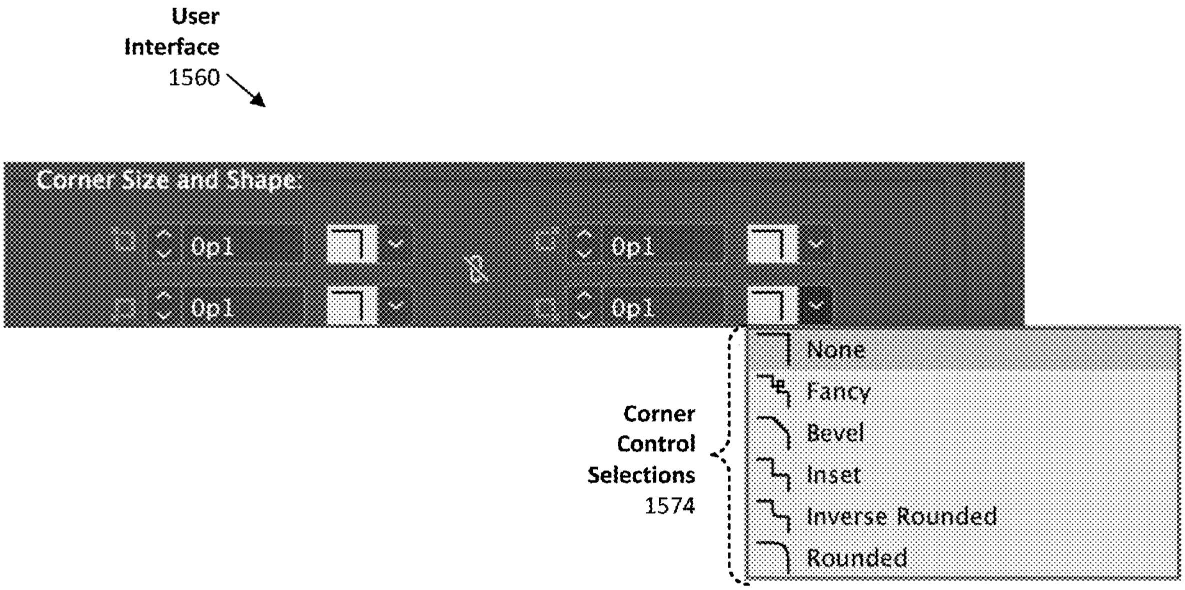
FIG. 15B illustrates an example user interface that can be used to specify stylized corner boundaries for a region of background shading or stylized corners for a border.

User interface 1560 also includes a corner control 1570 that allows a user to select particular types of stylized corners for the region of background shading, and an offset control 1572 that allows a user to select an offset or inset for the region of background shading. In some implementations, when selected, the corner control 1570 displays a list of stylized corners for selection. FIG. 15B illustrates one example of a list 1574 of stylized corners displayed by the corner control 1570. These stylized corners are described further below. In some implementations, the offset control 1572 includes a user interface element that allows a numerical offset/inset to be input, thus providing even further control over the exact position of the boundaries of the shaded region. The various user interface controls illustrated in FIG. 15A are examples, and thus other embodiments may have fewer, additional, or alternative controls.

The user interface generated by user interface sub-module 1462 is also optionally configured to receive user input that characterizes the background shading itself, for example in terms of visual attributes such as color, gradient, transparency, pattern, and so forth. In certain embodiments the user interface is also capable of receiving a text selection that defines the particular textual content to which the background shading is to be applied. And in addition to receiving the various inputs described herein, the user interface can also be used to display digital content, and in particular, digital content to which background shading has been applied. User interface therefore allows a user to simultaneously define and visualize background shading.

Figure 15C:
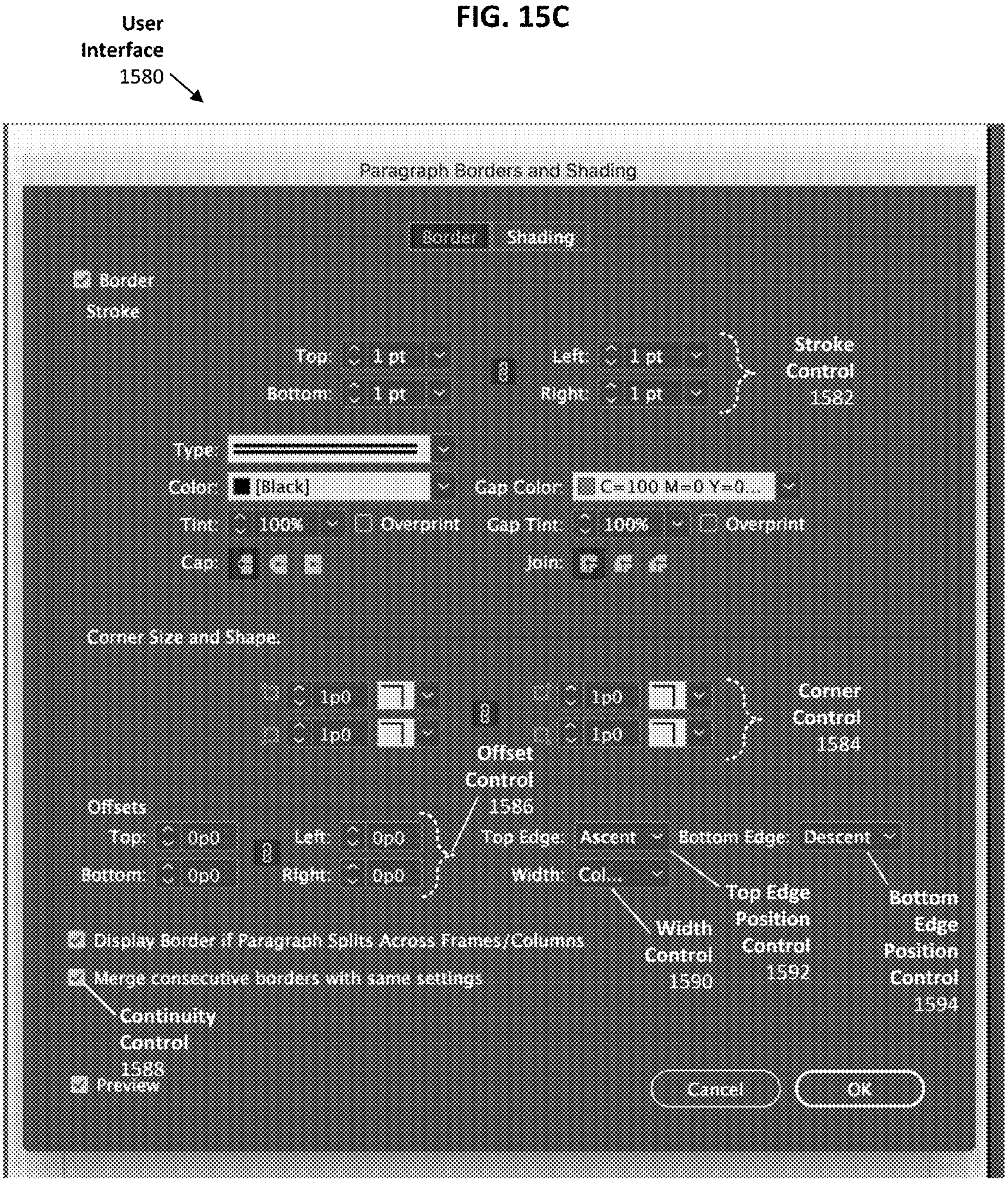
FIG. 15C illustrates an example user interface that can be used to define how a border is applied to digitally published textual content.

FIG. 15C illustrates an example user interface 1580 that can be used to define how borders are applied to digitally published text. User interface 1580 includes a stroke control 1582, a corner control 1584, an offset control 1586, a continuity control 1588, a width control 1590, a top edge position control 1592, and a bottom edge position control 1594. The stroke control 1582 allows a user to select a width for each of the top, bottom, left, and right edges of the border. Where the user selects a stroke width of 0 for an edge, the border will be rendered without that edge. The corner control 1584 allows a user to select particular types of stylized corners for the path of the border. In some implementations, when selected, the corner control 1584 displays a list of stylized corners for selection. FIG. 15B illustrates one example of a list 1574 of stylized corners displayed by the corner control 1570. These stylized corners are described further below. The offset control 1586 allows a user to select an offset or inset for the path of the border. In some implementations, the offset control 1586 includes a user interface element that allows a numerical offset/inset to be input, thus providing even further control over the exact position of the path of the border. In certain embodiments, the continuity control 1588 allows a user to specify that consecutive borders with common characteristics are to be merged.

The top edge position control 1592 allows a user to select a particular basis for positioning the path of the top border edge. The bottom edge position control 1594 allows a user to select a particular basis for positioning the path of the bottom border edge. The width control 1590 that allows a user to select a particular basis for positioning the left and right paths of the left and right border edges. The various bases for positioning the top, bottom, left, and right paths of the shaded region will be described in turn. In some implementations, one or more of top edge position control 1592, bottom edge position control 1594, and width control 1590 include a user interface element that allows a numerical position to be input, thus providing even further control over the exact position of the paths of one or more borders. The various user interface controls illustrated in FIG. 15C are examples, and thus other embodiments may have fewer, additional, or alternative controls.

The user interface generated by user interface sub-module 1462 is also optionally configured to receive user input that characterizes the border itself, for example in terms of visual attributes such as color, gradient, transparency, pattern, caps, whether or not to display the border if the paragraph spans frame or columns, and so forth. In some embodiments, the sub-module is also optionally configured to receive user input that specifies characteristics of any gaps between the border the textual content to which the border is to be applied. In certain embodiments the user interface is also capable of receiving a text selection that defines the particular textual content to which the border is to be applied. And in addition to receiving the various inputs described herein, the user interface can also be used to display digital content, and in particular, digital content to which the border has been applied. User interface therefore allows a user to simultaneously define and visualize a border.

In certain embodiments desktop publishing application 1460 further includes a boundary positioning sub-module 1464. Boundary positioning sub-module 1464 comprises instructions encoded on a computer readable medium that, when executed using a processor, cause a boundary positioning process to be invoked. The boundaries, which define a region of background shading, can be positioned based on a number of factors. For example, in one embodiment the boundaries are positioned based on the shape of the glyphs that comprise the fonts present in the identified textual content to which background shading is to be applied. Boundary positioning sub-module 1464 is therefore capable of leveraging font resources 1422 stored in memory 1420 to evaluate the various glyphs that comprise a detected font. In some implementations the boundaries are positioned based on a user-specified boundary, such as a baseline-based shading boundary. Boundary positioning sub-module 1464 is therefore also capable of leveraging user preferences received via, for example, a user interface generated by user interface sub-module 1462. Furthermore, in applications where background shading is to be applied to glyphs which are arranged in a frame grid, as is often the case for CJK typesetting, the boundaries may be positioned in accordance with the edges of the emboxes that contain the glyphs to which background shading is to be applied.

Desktop publishing application 1460 also optionally includes a boundary clipping sub-module 1466. Boundary clipping sub-module 1466 comprises instructions encoded on a computer readable medium that, when executed using a processor, cause a boundary clipping process to be invoked. The boundary clipping process can be used to conform background shading to an arbitrarily-shaped container object that contains textual content. In certain embodiments this is accomplished by applying a clipping path to the region that is defined by boundary positioning sub-module 1464. In such embodiments the clipping path is defined by the geometry of the arbitrarily-shaped container object.

As noted above, desktop publishing application 1460 includes typography tools that allow background shading to be applied to textual content. To this end, in one embodiment desktop publishing application 1460 includes a text shading sub-module 1468 that comprises instructions encoded on a computer readable medium that, when executed using a processor, cause a background shading process to be invoked. In one implementation, the background shading process causes background shading to be applied to the region defined by the aforementioned boundary positioning process, as optionally modified by the aforementioned boundary clipping process. Once the background shading is applied in accordance with the foregoing, the textual content with its underlying background shading can be displayed via the user interface generated by user interface sub-module 1462.

In certain embodiments desktop publishing application 1460 further includes a path positioning sub-module 1472. Path positioning sub-module 1472 comprises instructions encoded on a computer readable medium that, when executed using a processor, cause a path positioning process to be invoked. Borders can be positioned along a path based on a number of factors. For example, in one embodiment the borders are positioned along a path based on the shape of the glyphs that comprise the fonts present in the identified textual content to which one or more borders are to be applied. Path positioning sub-module 1472 is therefore capable of leveraging font resources 1422 stored in memory 1420 to evaluate the various glyphs that comprise a detected font. In some implementations the borders are positioned based on a user-specified path, such as a baseline-based path. Path positioning sub-module 1472 is therefore also capable of leveraging user preferences received via, for example, a user interface generated by user interface sub-module 1462. Furthermore, in applications where one or more borders are to be applied to glyphs which are arranged in a frame grid, as is often the case for CJK typesetting, the borders may be positioned along paths in accordance with the edges of the emboxes that contain the glyphs to which one or more borders are to be applied.

As noted above, desktop publishing application 1460 includes typography tools that allow borders to be applied to textual content. To this end, in one embodiment desktop publishing application 1460 includes a border rendering sub-module 1474 that comprises instructions encoded on a computer readable medium that, when executed using a processor, cause a background shading process to be invoked. In one implementation, the border rendering process causes one or more borders to be applied to the path defined by the aforementioned path positioning process. Once the one or more borders are applied in accordance with the foregoing, the textual content with its border can be displayed via the user interface generated by user interface sub-module 1462.

Computer system 1400 can communicate with the various networked resources described herein via network 300. Network 300 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 300 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases, access to resources on a given network or computing system may require credentials such as a username and password, and/or may require compliance with any other suitable security mechanism.

The embodiments described herein can be implemented in various forms of hardware, software, firmware, and/or special purpose processors. For example, in one embodiment a non-transitory computer readable medium has instructions encoded thereon that, when executed by one or more processors, cause one or more of the background shading application methodologies described herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, such as desktop publishing applications, word processing applications, image editing software applications, and presentation applications. For example, an image editing application can be configured to apply borders and/or background shading to text within a graphical object that forms part of a graphical image. The image processing application can therefore be configured to implement certain of the functionalities disclosed herein so as to allow such borders and/or background shading to be applied to the text consistently and precisely. The computer software applications described herein may include a number of different modules, sub-modules, or other components of distinct functionality, and can provide information to, or receive information from, still other components and services. These modules can be used, for example, to communicate with peripheral hardware components 180, networked storage resources such as networked storage repository 500, or other external components. More generally, other components and functionality not reflected in the illustrations will be apparent in light of this disclosure, and it will be appreciated that the present disclosure is not intended to be limited to any particular hardware or software configuration. Thus, in other embodiments the components illustrated in FIG. 14 may include additional, fewer, or alternative subcomponents.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and/or firmware can be used, and that the present disclosure is not intended to be limited to any particular system architecture.

Methodology: General Overview of Background Shading

Figure 16:
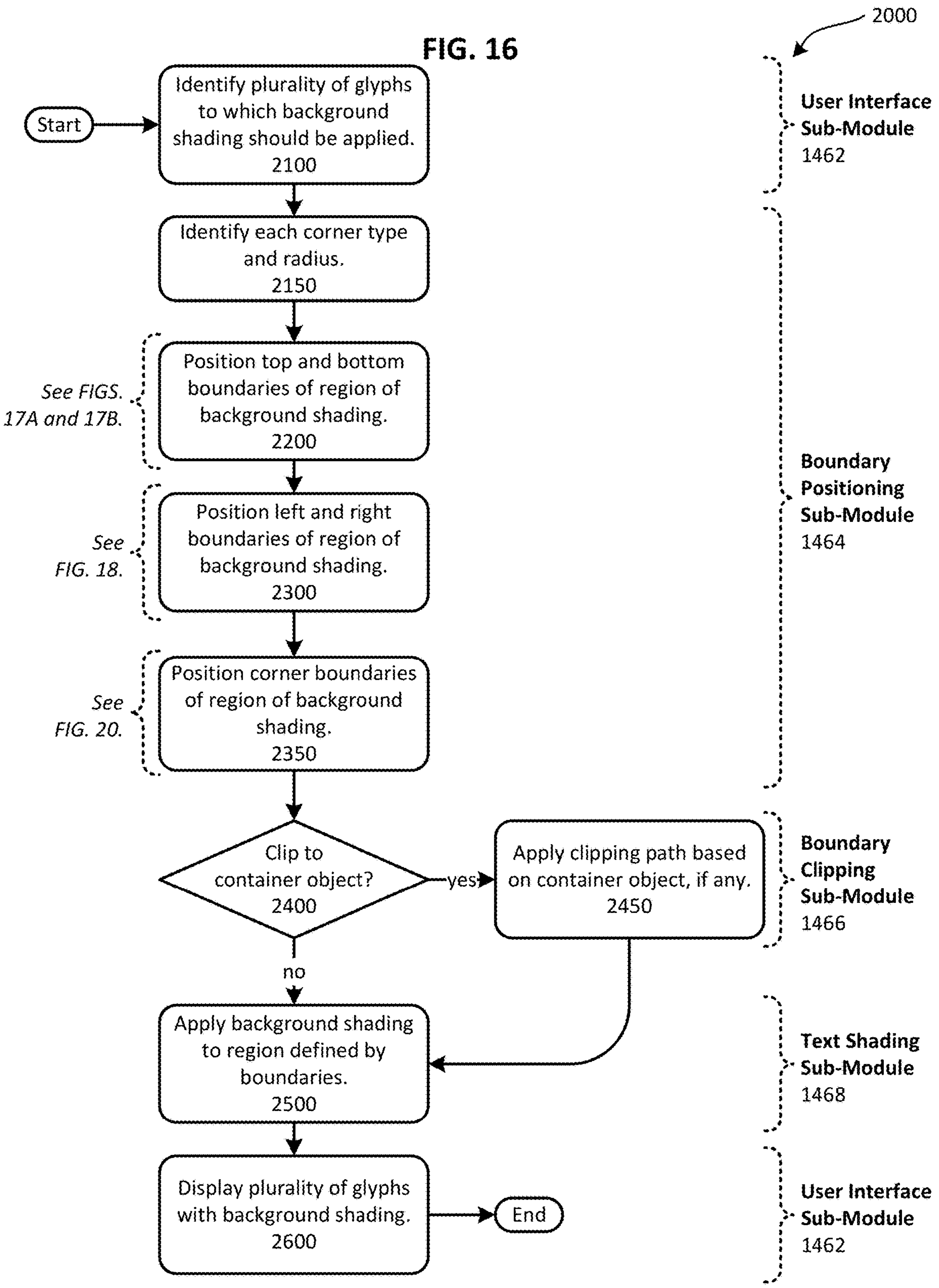
FIG. 16 is a flowchart illustrating an example method for positioning boundaries that define a region of background shading that is applied to digitally published textual content.

FIG. 16 is a flowchart illustrating an example method 2000 for positioning boundaries that define a region of background shading that is applied to digitally published text, and then applying background shading to the defined region. As can be seen, method 2000 includes a number of phases and sub-processes, the sequence of which may vary from one embodiment to another. However, when considered in the aggregate, these phases and sub-processes form part of an improved digital publishing framework that is capable of precisely and reliably applying background shading to textual content. The techniques disclosed herein are responsive to user input in accordance with certain of the embodiments disclosed herein. Method 2000 can be implemented, for example, using the system architecture illustrated in FIG. 14 and described herein. However, other system architectures can be used in other embodiments, as will be apparent in light of this disclosure. To this end, the correlation of the various functionalities shown in FIG. 16 to the specific components illustrated in FIG. 14 is not intended to imply any structural and/or use limitations. Rather other embodiments may include, for example, varying degrees of integration wherein multiple functionalities are effectively performed by one system or module. For example, in an alternative embodiment a single module can be used to apply background shading to a defined region and display text over the applied background shading. Thus, other embodiments may have fewer or more modules depending on the granularity of implementation. Numerous variations and alternative configurations will be apparent in light of this disclosure.

As illustrated in FIG. 16, method 2000 commences with identifying a plurality of glyphs to which background shading should be applied. See reference numeral 2100 in FIG. 16. The plurality of glyphs can be identified via the user interface generated by user interface sub-module 1462. For example, in one embodiment a user highlights the text to which background shading is to be applied using pointer-based input device 186. Other text selection techniques can be used in other embodiments. Once the plurality of glyphs has been identified, method 2000 continues with identifying the type and radius of each corner to be applied to the background shading. See reference numeral 2150 in FIG. 16. The types of corners and their radii can be identified via the user interface generated by user interface sub-module 1462. For example, in one embodiment a user selects the corner types and their radii using pointer-based input device 186 via corner control 1570 rendered by the user interface 1560. Other text selection techniques can be used in other embodiments.

Figure 17A:
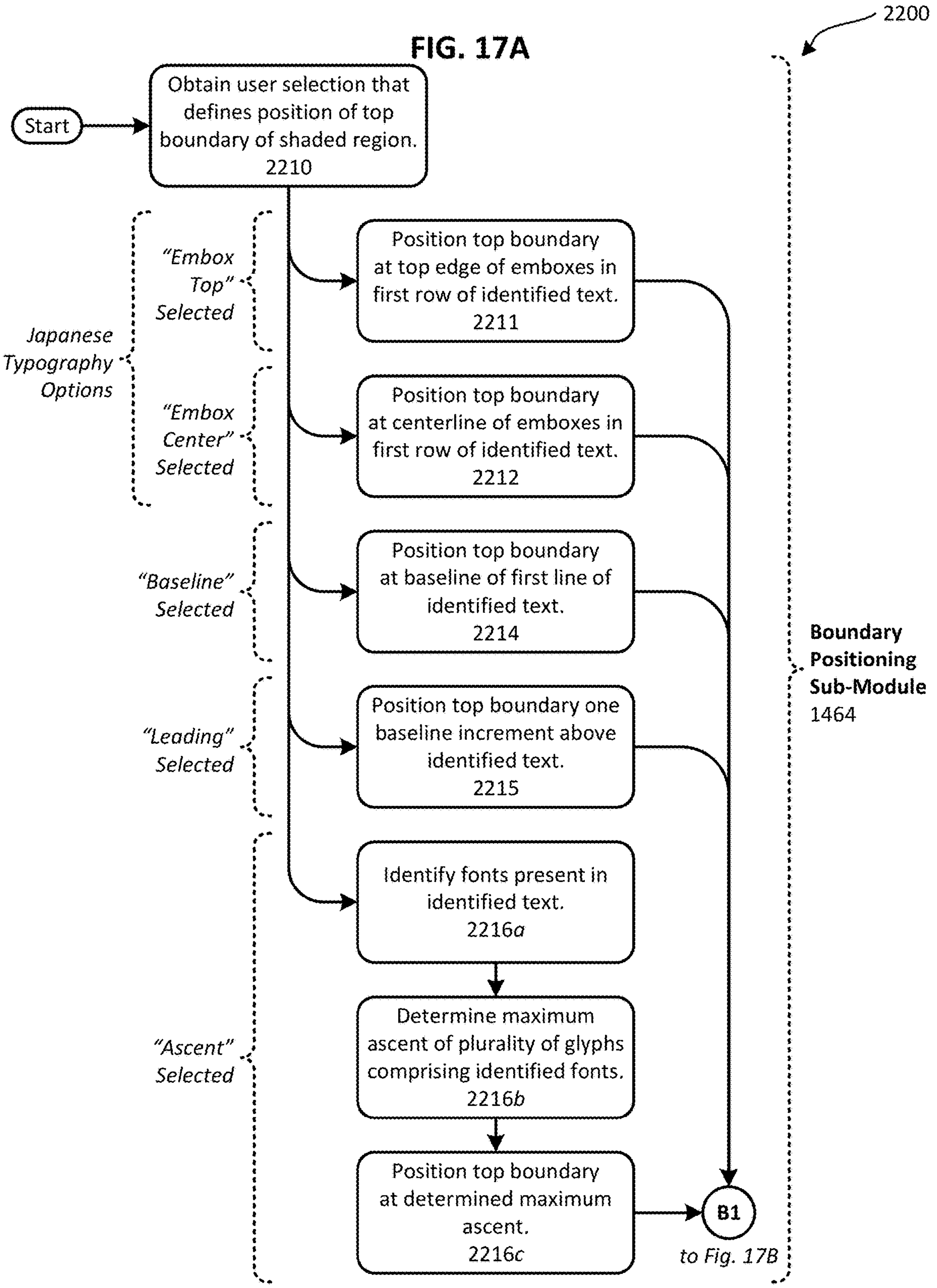
FIGS. 17A and 17B comprise a flowchart illustrating an example method for positioning top and bottom boundaries of a region of background shading that is to be applied to digitally published textual content.
Figure 17B:
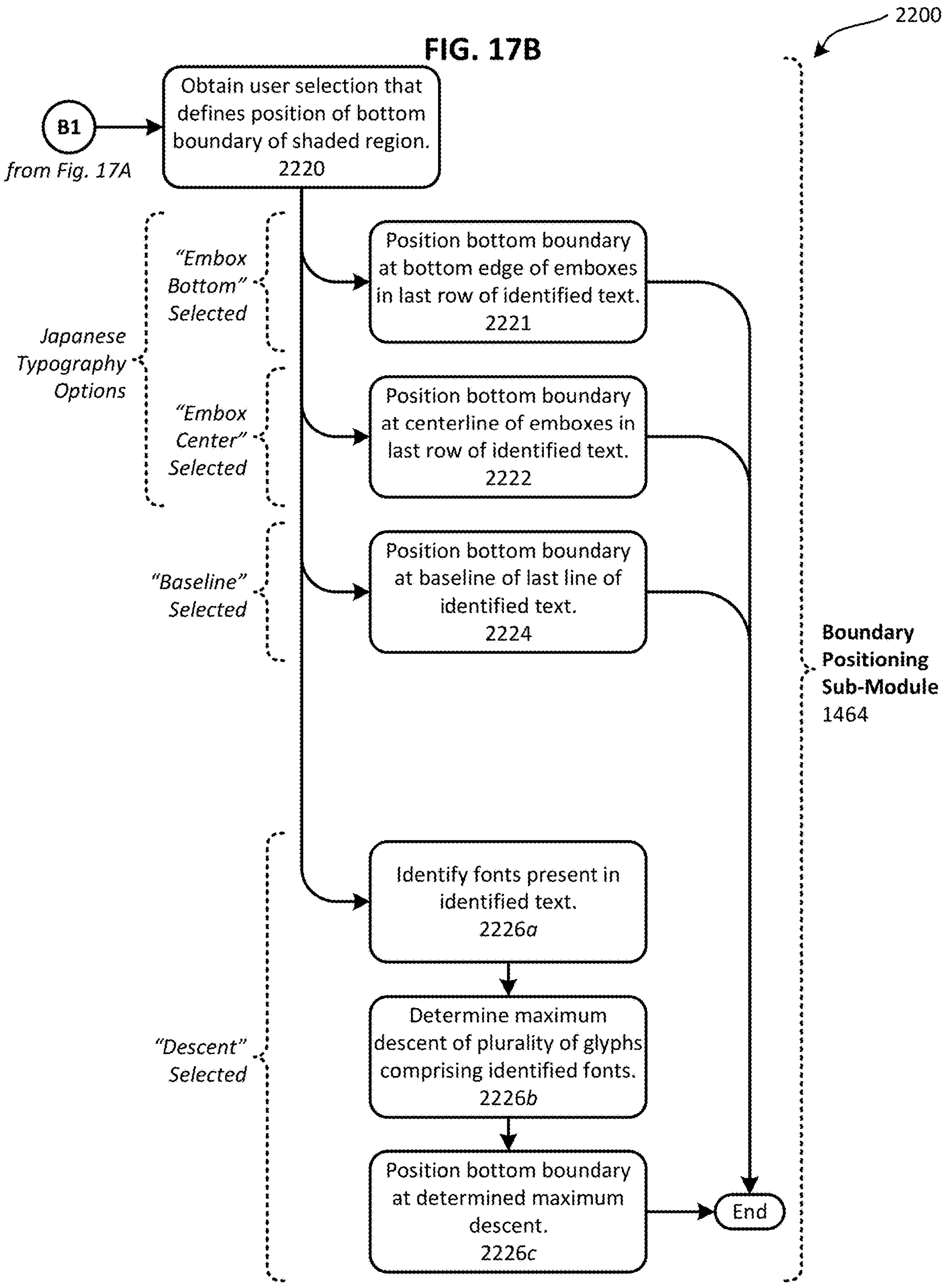
Figure 18:
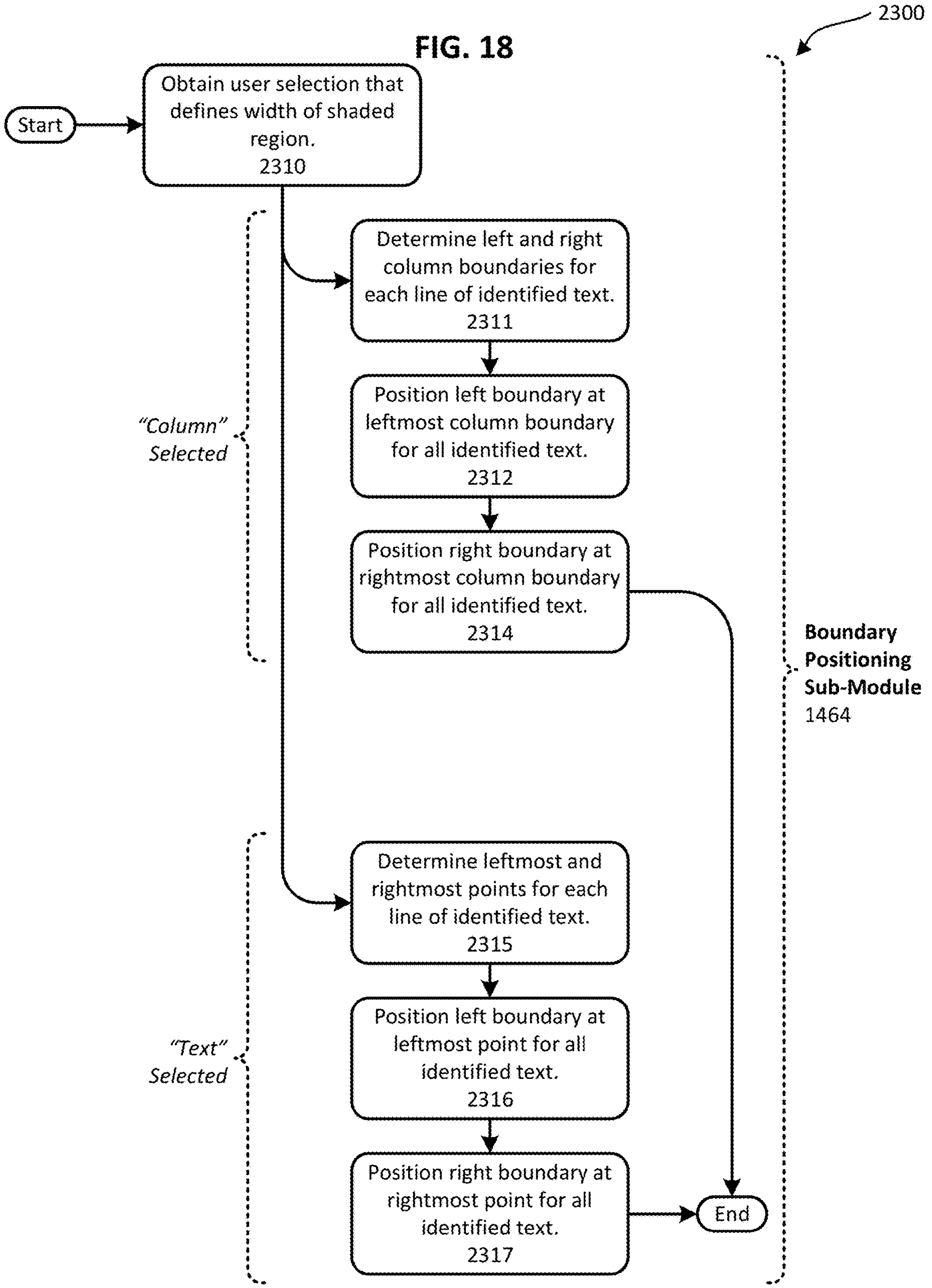
FIG. 18 is a flowchart illustrating an example method for positioning left and right boundaries of a region of background shading that is to be applied to digitally published textual content.
Figure 20:
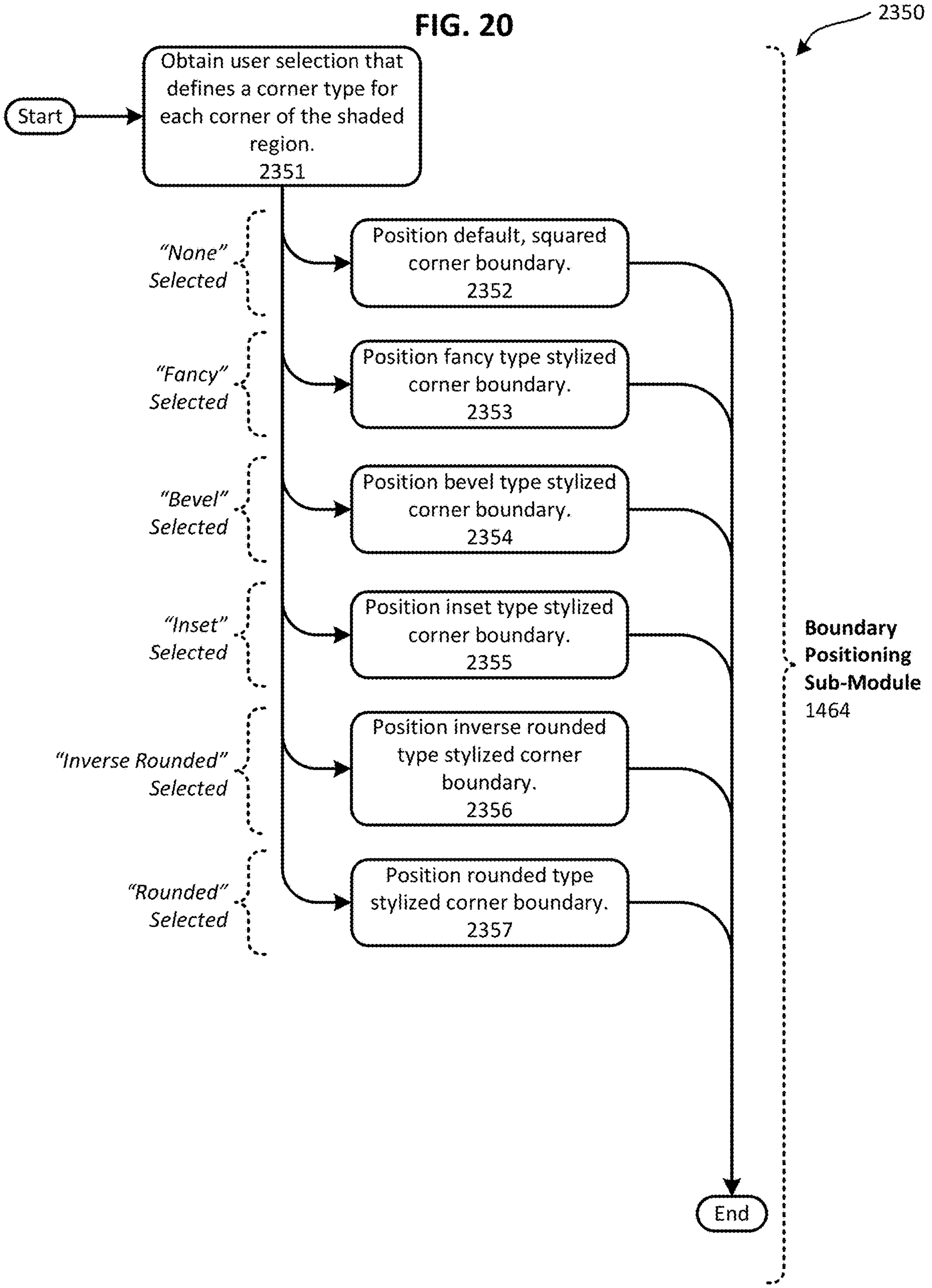
FIG. 20 is a flowchart illustrating an example method for positioning corner boundaries of a region of background shading that is to be applied to digitally published textual content.

Once the types of the corners have been identified, the boundary positioning process invoked by boundary positioning sub-module 1464 positions top and bottom boundaries of the region of background shading. See reference numeral 2200 in FIG. 16. One way of accomplishing this is illustrated in FIGS. 17A and 17B, which will be described in turn. The boundary positioning process invoked by boundary positioning sub-module 1464 also positions left and right boundaries of the region of background shading. See reference numeral 2300 in FIG. 16. One way of accomplishing this is illustrated in FIG. 18, which will also be described in turn. The boundary positioning process invoked by the boundary positioning sub-module 1464 also positions corner boundaries of the region of background shading. See reference numeral 2350 in FIG. 16. One way of accomplishing this is illustrated in FIG. 20, which will also be described in turn. In certain embodiments the boundary positioning process is responsive to user input received via one or more of top edge position control 1562, bottom edge position control 1564, width control 1566, and corner control 1570 in the example user interface 1560 that is illustrated in FIG. 15A. An example of background shading with stylized corner boundaries resulting from execution of the boundary positioning process is illustrated in FIG. 7C.

Once the top, bottom, left, right, and corner boundaries have been positioned, the boundary clipping process invoked by boundary clipping sub-module 1466 determines whether the boundaries of the region to which background shading is to be applied should be clipped to a surrounding container object, if any. See reference numeral 2400 in FIG. 16. In some implementations, this determination may be based on user input received via clipping control 1568 in the example user interface 1560 that is illustrated in FIG. 15A. In other implementations, this determination may be based on an evaluation of whether any container object is present. If the boundaries should be clipped, the boundary clipping process invoked by boundary clipping sub-module 1466 applies a clipping path to the region defined by boundary positioning sub-module 1464. The clipping path, which may be defined by the geometry of an arbitrarily-shaped container object, can be applied on a graphics port which is used to render the background shading. See reference numeral 2450 in FIG. 16. This allows background shading to be applied to a plurality of glyphs that are contained within non-rectangular objects, and in particular, that are contained within any arbitrarily-shaped container object. Examples of background shading resulting from clipped boundaries are illustrated in FIGS. 10B, 11B, 12B, and 13B.

Once the region of background shading has been appropriately modified to conform to a container object, if any, the background shading process invoked by text shading sub-module 1468 applies background shading to the region defined by the boundary positioning process. See reference numeral 2500 in FIG. 16. This can be accomplished by drawing the background shading color, pattern, or other visual characteristic on the aforementioned graphics port. In some embodiments, the text shading sub-module 1468 identifies whether any offset (or inset) was specified by the user prior to applying the background shading. For example, the text shading sub-module 1468 may identify any such offset responsive to user input received via the offset control 1572. Where an offset was specified, the text shading sub-module 1468 adjusts application of the background shading relative to the region based on the offset (e.g., drawing background shading to cover less area where an offset is specified and drawing background shading to cover greater area where an inset is specified). Applying background shading optionally includes updating metadata that characterizes the digital content which includes the applied background shading. The previously identified plurality of glyphs and the background shading can then be displayed using the user interface generated by user interface sub-module 1462. See reference numeral 2600 in FIG. 16. This allows a user to simultaneously define and visualize background shading.

Methodology: Positioning Top and Bottom Boundaries

Figure 4D:
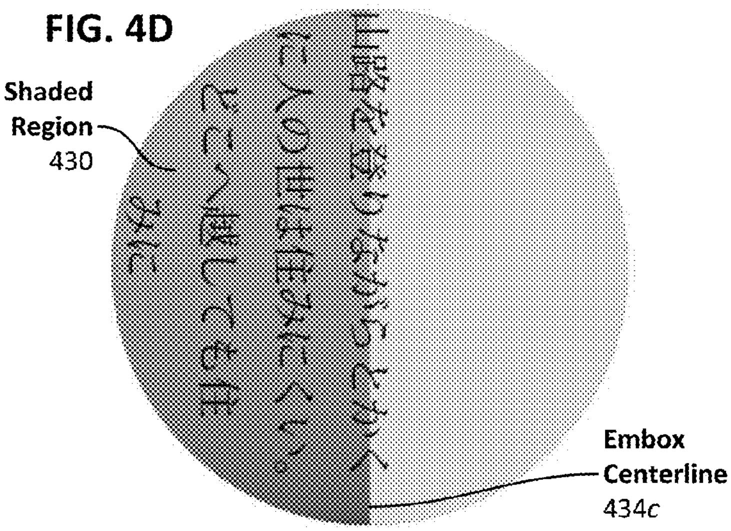
FIG. 4D illustrates Japanese characters associated with a shaded region defined by a top boundary that is aligned with an embox centerline of the first line of the Japanese characters.

FIGS. 17A and 17B comprise a flowchart illustrating an example method 2200 for positioning top and bottom boundaries of a region of background shading that is to be applied to digitally published text. The vertical span of the shaded region can be understood as the difference between the top and bottom edges of the shaded region. Method 2200 commences with obtaining a user selection that defines the position of the top boundary of the region to which background shading is to be applied. See reference numeral 2210 in FIG. 17A. In certain embodiments this user selection is provided via top edge position control 1562 of example user interface 1560. A number of rules may exist for defining the top boundary position. In some cases, the top boundary position can be set manually, for example by the user specifying a position numerically or graphically. Examples of rules for defining the top boundary position include, but are not limited to:

a. Embox Top: Where background shading is to be applied to glyphs which are arranged in a frame grid, as is often the case for CJK typesetting, the top boundary of the shaded region may be positioned at the top edge of the first row of emboxes in the frame grid. See reference numeral 2211 in FIG. 17A. Background shading is thus applied to the entire area of each embox in the first row of the previously identified text. The top boundary of the shaded region is unaffected by the geometry of the particular glyphs present in the first row of emboxes. The result is a more stable and precise positioning of the top boundary of the shaded region. An example of such background shading is illustrated in FIG. 4C, where shaded region 430 uniformly extends to embox edges 434. Positioning the top boundary of the shaded region in this way can be achieved by selecting "Embox Top" in top edge position control 1562 of user interface 1560, as illustrated in FIG. 15A.

b. Embox Center: Where background shading is to be applied to glyphs which are arranged in a frame grid, as is often the case for CJK typesetting, the top boundary of the shaded region may be positioned along a centerline of the first row of emboxes in the frame grid. See reference numeral 2212 in FIG. 17A. Background shading is thus applied to half of each embox in the first row of the previously identified text. The top boundary of the shaded region is unaffected by the geometry of the particular glyphs present in the first row of emboxes. The result is a more stable and precise positioning of the top boundary of the shaded region. An example of such background shading is illustrated in FIG. 4D, wherein shaded region 430 extends only to an embox centerline 434*c* associated with the first row of emboxes in the frame grid. Positioning the top boundary of the shaded region in this way can be achieved by selecting "Embox Center" in top edge position control 1562 of user interface 1560, as illustrated in FIG. 15A. While one embodiment provides for positioning of the top boundary at embox centerline 434*c*, the top boundary may be positioned elsewhere with respect to a row of emboxes, including, for example, at a user-defined position with respect to the row of emboxes.

c. Baseline: The top boundary of the shaded region may be positioned along the baseline of the first line of identified text. See reference numeral 2214 in FIG. 17A. In this case, the top boundary of the shaded region is unaffected by the geometry of the particular glyphs present in the first line of identified text. The result is a more stable and precise positioning of the top boundary of the shaded region. An example of a baseline-based shading boundary 39*b* is illustrated in FIG. 1C, wherein boundary 39*b* extends uniformly across each column 36ℓ, 36*c*, 36*r*. Positioning the top boundary of the shaded region in this way can be achieved by selecting "Baseline" in top edge position control 1562 of user interface 1560, as illustrated in FIG. 15A.

d. Leading: The top boundary of the shaded region may be positioned one baseline increment above the identified text. See reference numeral 2215 in FIG. 17A. In this case, the top boundary of the shaded region is unaffected by the geometry of the particular glyphs present in the first line of identified text. The result is a more stable and precise positioning of the top boundary of the shaded region. An example of a leading-based shading boundary 39ℓ is illustrated in FIG. 1C, wherein boundary 39ℓ extends uniformly across each column 36ℓ, 36*c*, 36*r*. Positioning the top boundary of the shaded region in this way can be achieved by selecting "Leading" in top edge position control 1562 of user interface 1560, as illustrated in FIG. 15A.

e. Ascent: The top boundary of the shaded region may be positioned based on the largest ascent of all of the glyphs that comprise the fonts present in the identified text. More specifically, the top boundary can be positioned at a distance above the baseline of the first line of identified text, wherein the distance is substantially equal to the aforementioned largest ascent. As used herein, "substantially equal" refers to an equivalence that gives a consumer of the identified text the impression that the background shading would fully encompass all glyphs that comprise the fonts present in the identified text. Positioning the top boundary of the shaded region in this way can be accomplished by first identifying the fonts present in the identified text. See reference numeral 2216*a* in FIG. 17A. Each of the fonts present in the identified text defines a plurality of glyphs. The maximum ascent of the plurality of glyphs comprising the identified fonts is then determined. See reference numeral 2216*b* in FIG. 17A. Such a determination can be made with reference to font resources 1422 stored in memory 1420. The top boundary of the shaded region, also referred to as an ascent-based shading boundary, can then be positioned at the determined maximum ascent. See reference numeral 2216*c* in FIG. 17A. Thus, even if the identified text is later manipulated such that different glyphs are present in the first line, the top boundary of the shaded region will be unaffected by such manipulations. The result is a more stable and precise positioning of the top boundary of the shaded region. An example of ascent-based shading boundary 39*a* is illustrated in FIG. 1C, wherein boundary 39*a* extends uniformly across each column 36ℓ, 36*c*, 36*r*. Positioning the top boundary of the shaded region in this way can be achieved by selecting "Ascent" in top edge position control 1562 of user interface 1560, as illustrated in FIG. 15A.

Method 2200 also comprises obtaining a user selection that defines the position of the bottom boundary of the region to which background shading is to be applied. See reference numeral 2220 in FIG. 17B. While example method 2200 is described herein as defining the position of the top boundary before that of the bottom boundary, in alternative implementations the position of the bottom boundary is defined first. In certain embodiments the user selection that defines the position of the bottom boundary is provided via bottom edge position control 1564 of example user interface 1560. A number of rules exist for defining the bottom boundary position. In some cases, the bottom boundary position can be set manually, for example by the user specifying a position numerically or graphically. Examples of rules for defining the bottom boundary position include, but are not limited to:

a. Embox Bottom: Where background shading is to be applied to glyphs which are arranged in a frame grid, as is often the case for CJK typesetting, the bottom boundary of the shaded region may be positioned at the bottom edge of the last row of emboxes in the frame grid. See reference numeral 2221 in FIG. 17B. Background shading is thus applied to the entire area of each embox in the last row of identified text. The bottom boundary of the shaded region is unaffected by the geometry of the particular glyphs present in the last row of emboxes. The result is a more stable and precise positioning of the bottom boundary of the shaded region. An example of such background shading is illustrated in FIG. 4C, where shaded region 430 uniformly extends to embox edges 434. Positioning the bottom boundary of the shaded region in this way can be achieved by selecting "Embox Bottom" in bottom edge position control 1564 of user interface 1560, as illustrated in FIG. 15.

b. Embox Center: Where background shading is to be applied to glyphs which are arranged in a frame grid, as is often the case for CJK typesetting, the bottom boundary of the shaded region may be positioned along a centerline of the last row of emboxes in the frame grid. See reference numeral 2222 in FIG. 17B.

Background shading is thus applied to half of each embox in the last row of the previously identified text. The bottom boundary of the shaded region is unaffected by the geometry of the particular glyphs present in the last row of emboxes. The result is a more stable and precise positioning of the bottom boundary of the shaded region. Positioning the bottom boundary of the shaded region in this way can be achieved by selecting "Embox Center" in bottom edge position control 1564 of user interface 1560, as illustrated in FIG. 15A. While one embodiment provides for positioning of the bottom boundary at an embox centerline, the bottom boundary may be positioned elsewhere with respect to a row of emboxes, including, for example, at a user-defined position with respect to the row of emboxes.

c. Baseline: The bottom boundary of the shaded region may be positioned along the baseline of the last line of identified text. See reference numeral 2224 in FIG. 17B. In this case, the bottom boundary of the shaded region is unaffected by the geometry of the particular glyphs present in the last line of identified text. The result is a more stable and precise positioning of the bottom boundary of the shaded region. An example of a baseline-based shading boundary is illustrated in FIG. 1C, wherein boundary 39*b* extends uniformly across each column 36ℓ, 36*c*, 36*r*. Positioning the bottom boundary of the shaded region in this way can be achieved by selecting "Baseline" in bottom edge position control 1564 of user interface 1560, as illustrated in FIG. 15A.

d. Descent: The bottom boundary of the shaded region may be positioned based on the largest descent of all of the glyphs that comprise the fonts present in the identified text. More specifically, the bottom boundary can be positioned at a distance below the baseline of the last line of identified text, wherein the distance is substantially equal to the aforementioned largest descent. As used herein, "substantially equal" refers to an equivalence that gives a consumer of the identified text the impression that the background shading would fully encompass all glyphs that comprise the fonts present in the identified text. Positioning the bottom boundary of the shaded region in this way can be accomplished by first identifying the fonts present in the identified text. See reference numeral 2226*a* in FIG. 17B. Each of the fonts present in the identified text defines a plurality of glyphs. The maximum descent of the plurality of glyphs comprising the identified fonts is then determined. See reference numeral 2226*b* in FIG. 17B. Such a determination can be made with reference to font resources 1422 stored in memory 1420. The bottom boundary of the shaded region, also referred to as a descent-based shading boundary, can then be positioned at the determined maximum descent. See reference numeral 2226*c* in FIG. 17B. Thus, even if the identified text is later manipulated such that different glyphs are present in the last line, the bottom boundary of the shaded region will be unaffected by such manipulations. The result is a more stable and precise positioning of the bottom boundary of the shaded region. An example of a descent-based shading boundary 39*d* is illustrated in FIG. 1C, wherein boundary 39*d* extends uniformly across each column 36ℓ, 36*c*, 36*r*. Positioning the bottom boundary of the shaded region in this way can be achieved by selecting "Descent" in bottom edge position control 1564 of user interface 1560, as illustrated in FIG. 15A.

The example methods disclosed herein for positioning the top and bottom boundaries of a region of background shading can be applied in automated workflows. For example, baseline settings or fixed position settings can be scripted and applied as fixed offsets based on font attributes. Fixed position settings can be defined as a numerically-provided offset relative to a page edge, a margin, a column, a baseline, or some other layout feature. In embodiments wherein baseline settings or fixed position settings are scripted, user interface 1560 and user interface sub-module 1462 are optionally omitted.

Methodology: Positioning Left and Right Boundaries

FIG. 18 is a flowchart illustrating an example method 2300 for positioning left and right boundaries of a region of background shading that is to be applied to digitally published text. The horizontal span of the shaded region can be understood as the difference between the left and right edges of the shaded region. Method 2300 commences with obtaining a user selection that defines the width of the region to which background shading is to be applied. See reference numeral 2310 in FIG. 18. In certain embodiments the user selection is provided via width control 1566 of example user interface 1560. A number of rules exist for defining the position of the left and right boundaries of the shaded region. In some cases, the left and right boundary positions can be set manually, for example by the user specifying a position numerically or graphically. Examples of rules for defining the left and right boundary positions include, but are not limited to:

a. Column: Where the user specifies that the width of the shaded region should correspond to the width of the column containing the identified text, the left and right column boundaries for each line of identified text are determined. See reference numeral 2311 in FIG. 18. The left boundary of the shaded region is positioned at the leftmost column boundary. See reference numeral 2312 in FIG. 18. Likewise, the right boundary of the shaded region is positioned at the rightmost column boundary. See reference numeral 2314 in FIG. 18. An example of textual content having background shading that is applied in this way is illustrated in FIG. 2C. In particular, FIG. 2C illustrates frame-width background shading 324 that extends to frame boundary 322, regardless of the fact that the textual content within the frame does not. Positioning the left and right boundaries of the shaded region in this way can be achieved by selecting "Column" in width control 1566 of user interface 1560, as illustrated in FIG. 15A.

b. Text: Where the user specifies that the width of the shaded region should correspond to the width of the identified text itself, the leftmost and rightmost points in each line of identified text are determined. See reference numeral 2315 in FIG. 18. The left boundary of the shaded region is positioned at the leftmost point for all lines of identified text. See reference numeral 2316 in FIG. 18. Likewise, the right boundary of the shaded region is positioned at the rightmost point for all lines of identified text. See reference numeral 2317 in FIG. 18. An example of textual content having background shading that is applied in this way is illustrated in FIG. 2C. In particular, FIG. 2C illustrates text-width background shading 326 that extends only to left and right text boundaries 320, regardless of the location of frame boundaries 322. This provides digital publishers with a greater degree of control over how background shading is applied to identified text, and in particular, helps avoid shading margin regions that do not contain any textual content. Positioning the left and right boundaries of the shaded region in this way can be achieved by selecting "Text" in width control 1566 of user interface 1560, as illustrated in FIG. 15A.

The example methods disclosed herein for positioning the left and right boundaries of a region of background shading can be applied in automated workflows. For example, width control settings or fixed position settings can be scripted and applied as fixed offsets based on user preference. Fixed position settings can be defined as a numerically-provided offset relative to a page edge, a margin, a column, a baseline, or some other layout feature. In embodiments wherein width control settings or fixed position settings are scripted, user interface 1560 and user interface sub-module 1462 are optionally omitted.

Methodology: Positioning Corner Boundaries

Figure 21A:
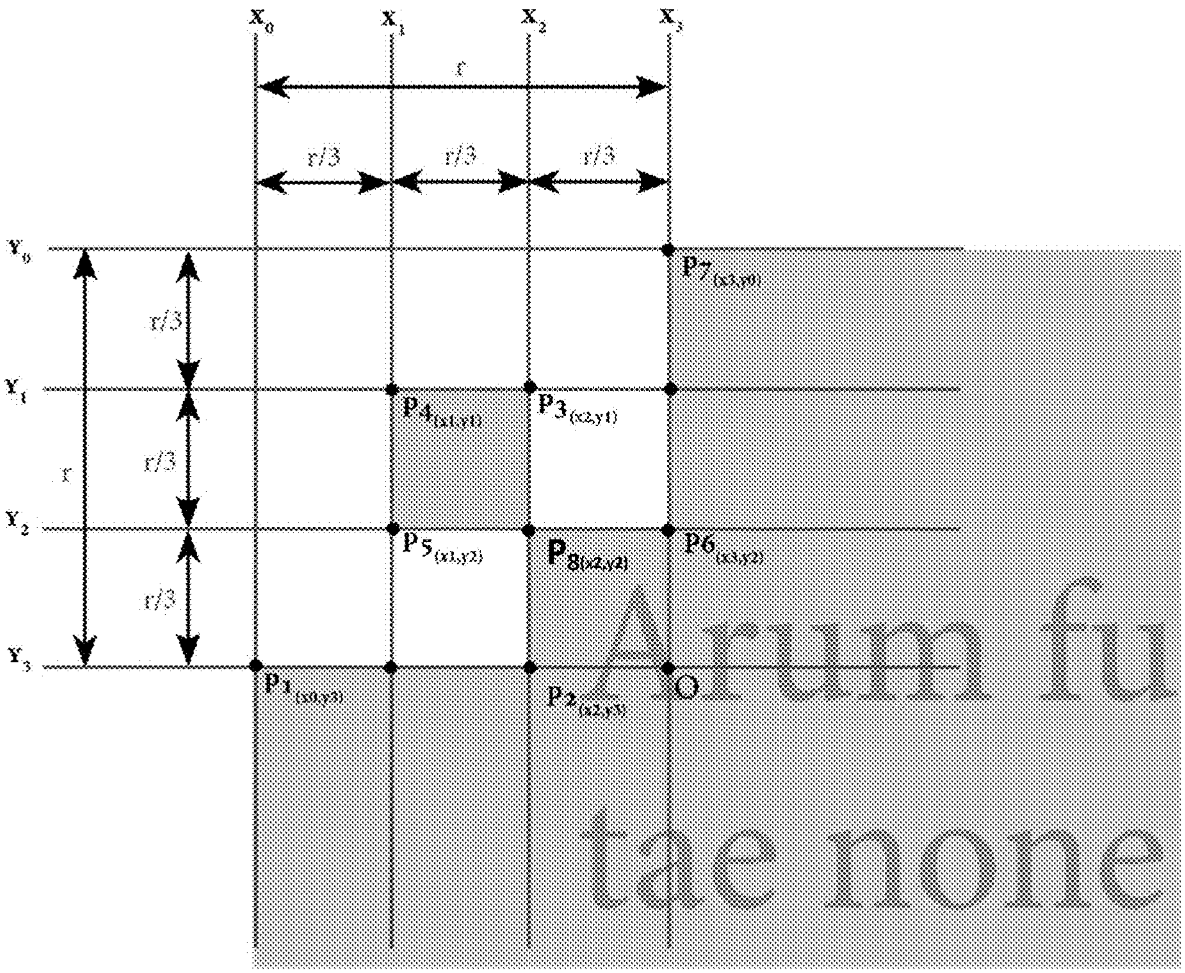
FIG. 21A is an illustration of a fancy type corner boundary and corner.

FIG. 20 is a flowchart illustrating an example method 2350 for positioning corner boundaries of a region of background shading that is to be applied to digitally published text. Method 2350 commences with obtaining a user selection that defines the type and/or the radius of each corner to be positioned for the shaded region. See reference numeral 2351 in FIG. 20. In certain embodiments the user selection is provided via corner control 1570 of example user interface 1560. A number of rules exist for defining the position of the corner boundaries of the shaded region. In some cases the corner boundary positions can be set manually, for example by the user specifying a position numerically or graphically. Examples background shading resulting from of stylized corner boundaries are illustrated in FIGS. 7C, 8A, and 8B. Examples of rules for defining the position of each respective corner boundary are associated with the corner type and include, but are not limited to:

a. None: For each corner type specified by the user as "None," a default, squared corner boundary is positioned. See reference numeral 2352 in FIG. 20. A corner type of "None" indicates that no stylized corner is to be applied to a corner, and the corner boundary for that corner remains the intersection of the horizontal boundary (e.g., the top or bottom boundary) and the vertical boundary (e.g., the left or right boundary). Thus, the corner boundary retains a default, squared shape. An example of textual content having background shading with default corners is illustrated in FIG. 1C. In particular, FIG. 1C illustrates shaded region 38ℓ, which has squared corners. Positioning corner boundaries of the shaded region in this way can be achieved by selecting "None" in corner control 1570 of user interface 1560, as illustrated in FIG. 15A.

b. Fancy: For each corner type specified by the user as "Fancy," a stylized corner boundary of the fancy type is positioned. See reference numeral 2353 in FIG. 20. FIG. 21A illustrates a top-left fancy corner boundary, and the process executed to position it. As shown in FIG. 21A, to position the top-left fancy corner boundary, a point, P1, along the left boundary is selected. As shown, P1 is positioned a distance away from the intersection of the top boundary and the left boundary equal to the radius of the stylized corner. P1 is recorded as the new top of the left boundary. Next, a line having a length equal to ⅔ the radius is followed from P1 toward the right boundary. The point at the end of this line is P2. From P2, a line having a length equal to ⅔ the radius is followed toward the top boundary. The point at the end of this line is P3. From P3, a line having a length equal to ⅓ of the radius is followed toward the left boundary. The point at the end of this line is P4. From P4, a line having a length equal to ⅓ of the radius is followed toward the bottom boundary. The point at the end of this line is P5. From P5, a line having a length equal to ⅔ of the radius is followed toward the right boundary. The point at the end of this line is P6. From P6, a line having a length equal to ⅔ of the radius is followed toward the top boundary. The point at the end of this line is P7. P7 is recorded as the new left end of the top boundary. The shape formed by traversing a path including P1, P2, P8, P5, P4, P3, P8, P6, and P7 as shown in FIG. 21A forms the new top left corner boundary. Analogous processes are executed to position top-right, bottom-right, and bottom-left corner boundaries where the type of the corner is fancy. Where, for example, the radius of a fancy corner boundary is 21 and the x, y coordinates illustrated in FIG. 21A begin at (0,0) with the x-axis extending positively toward the right boundary and the y-axis extending positively toward the bottom boundary, P1-P7 may be calculated as follows.

$$P1=(x0,y3)\text{i.e. }(\text{left},\text{top}+r)=(0,21).$$

$$P2=(x2,y3)\text{i.e. }(\text{left}+2*(r/3),\text{top}+r)=(14,21).$$

$$P3=(x2,y1)\text{i.e. }(\text{left}+2*(r/3),\text{top}+r/3)=(14,7).$$

$$P4=(x1,y1)\text{i.e. }(\text{left}+(r/3),\text{top}+(r/3))=(7,7).$$

$$P5=(x1,y2)\text{i.e. }(\text{left}+(r/3),\text{top}+2*(r/3))=(7,14).$$

$$P6=(x3,y2)\text{i.e. }(\text{left}+r,\text{top}+2*(r/3))=(21,14).$$

$$P7=(x3,y0)\text{i.e. }(\text{left}+r,\text{top})=(21,0).$$

Figure 21B:
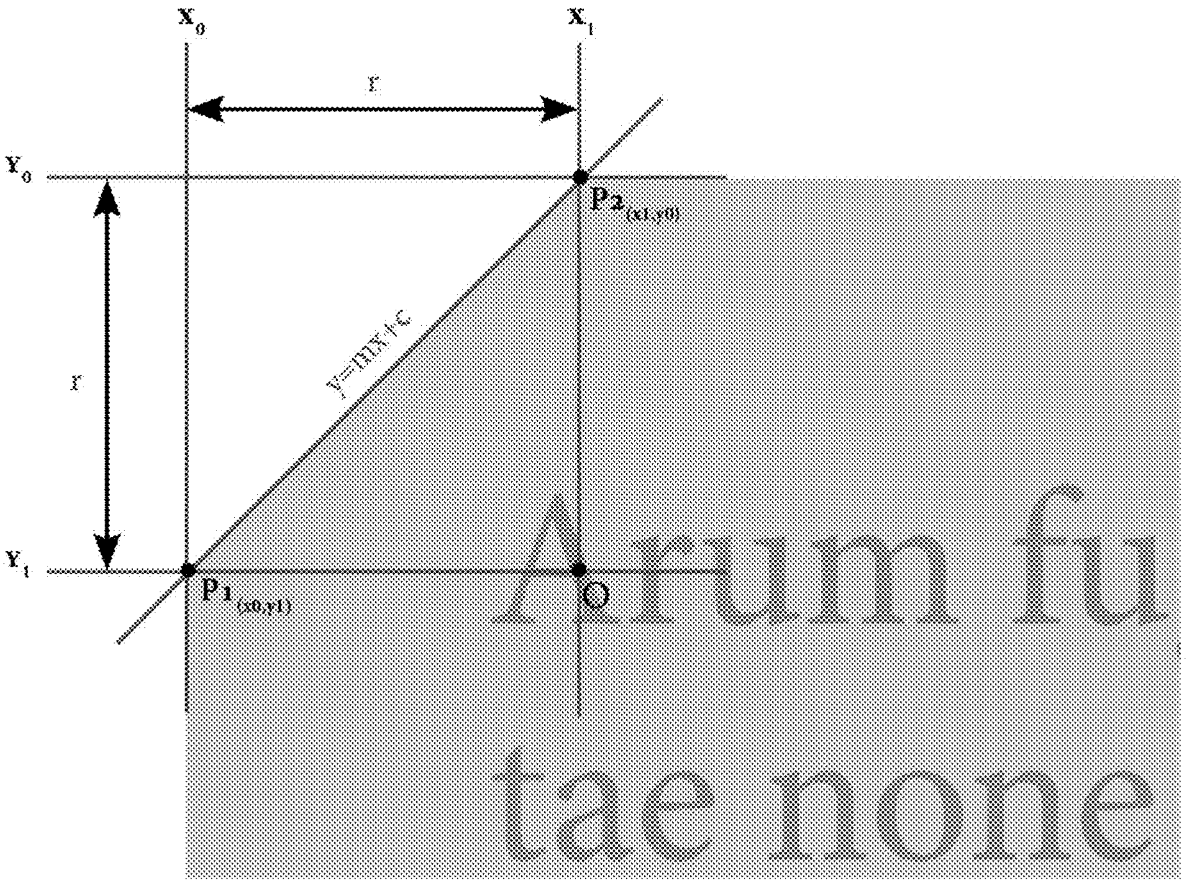
FIG. 21B is an illustration of a bevel type corner boundary and corner.

The fancy corner type provides digital publishers with a greater degree of control over how background shading is applied to identified text. Positioning the corner boundaries of the shaded region in this way can be achieved by selecting "Fancy" in corner control 1570 of user interface 1560, as illustrated in FIG. 15A.

c. Bevel: For each corner type specified by the user as "Bevel," a stylized corner boundary of the Bevel type is positioned. See reference numeral 2354 in FIG. 20. FIG. 21B illustrates a top-left bevel corner boundary, and the process executed to position it. As shown in FIG. 21B, to position the top-left bevel corner, a point, P1, along the left boundary is selected. As shown, P1 is positioned a distance away from the intersection of the top boundary and the left boundary equal to the radius of the stylized corner. P1 is recorded as the new top of the left boundary. Next, a point, P2, along the top boundary is selected. As shown, P2 is positioned a distance away from the intersection of the top boundary and the left boundary equal to the radius of the stylized corner. P2 is recorded as the new left end of the top boundary. Next, a line is followed from P1 to P2. The shape formed by traversing a path including P1 and P2 forms the new top left corner boundary. Analogous processes are executed to position top-right, bottom-right, and bottom-left corner boundaries where the type of the corner is bevel. Where, for example, the radius of a bevel corner is 21 and the x, y coordinates illustrated in FIG. 21B begin at (0,0) with the x-axis extending positively toward the right boundary and the y-axis extending positively toward the bottom boundary, P1 and P2 may be calculated as follows.

$P1=(x0,y1)$ i.e. (left,top+$r$)=(0,21).

$P2=(x1,y0)$ i.e. (left+$r$,top)=(21,0).

Figure 21C:
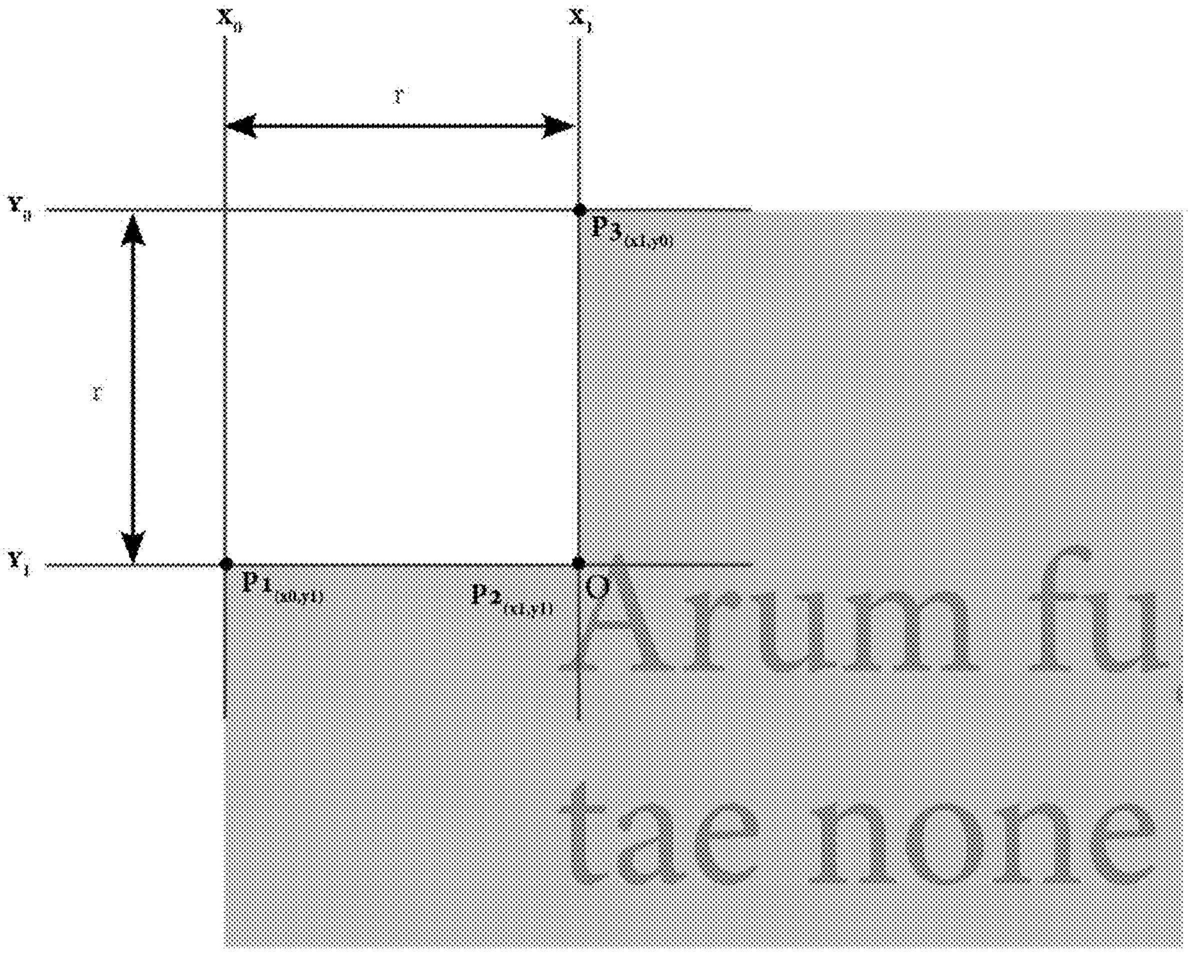
FIG. 21C is an illustration of an inset type corner boundary and corner.

The bevel corner type provides digital publishers with a greater degree of control over how background shading is applied to identified text. Positioning the corner boundaries of the shaded region in this way can be achieved by selecting "Bevel" in corner control 1570 of user interface 1560, as illustrated in FIG. 15A.

d. Inset: For each corner type specified by the user as "Inset," a stylized corner boundary of the Inset type is positioned. See reference numeral 2355 in FIG. 20. FIG. 21C illustrates a top-left inset corner boundary, and the process executed to position it. As shown in FIG. 21C, to position the top-left inset corner, a point, P1, along the left boundary is selected. As shown, P1 is positioned a distance away from the intersection of the top boundary and the left boundary equal to the radius of the stylized corner. P1 is recorded as the new top of the left boundary. Next, a line having a length equal to the radius is followed from P1 toward the right boundary. The point at the end of this line is P2. From P2, a line having a length equal to the radius is followed toward the top boundary. The point at the end of this line is P3. The shape formed by traversing a path including P1, P2, and P3 forms the new top left corner boundary. Analogous processes are executed to position top-right, bottom-right, and bottom-left corner boundaries where the type of the corner is inset. Where, for example, the radius of an inset corner is 21 and the x, y coordinates illustrated in FIG. 21C begin at (0,0) with the x-axis extending positively toward the right boundary and the y-axis extending positively toward the bottom boundary, P1-P3 may be calculated as follows.

$P1=(x0,y1)$ i.e. (left,top+$r$)=(0,21).

$P2=(x1,y1)$ i.e. (left+$r$,top+$r$)=(21,21).

$P3=(x1,y0)$ i.e. (left+$r$,top)=(21,0).

Figure 21D:
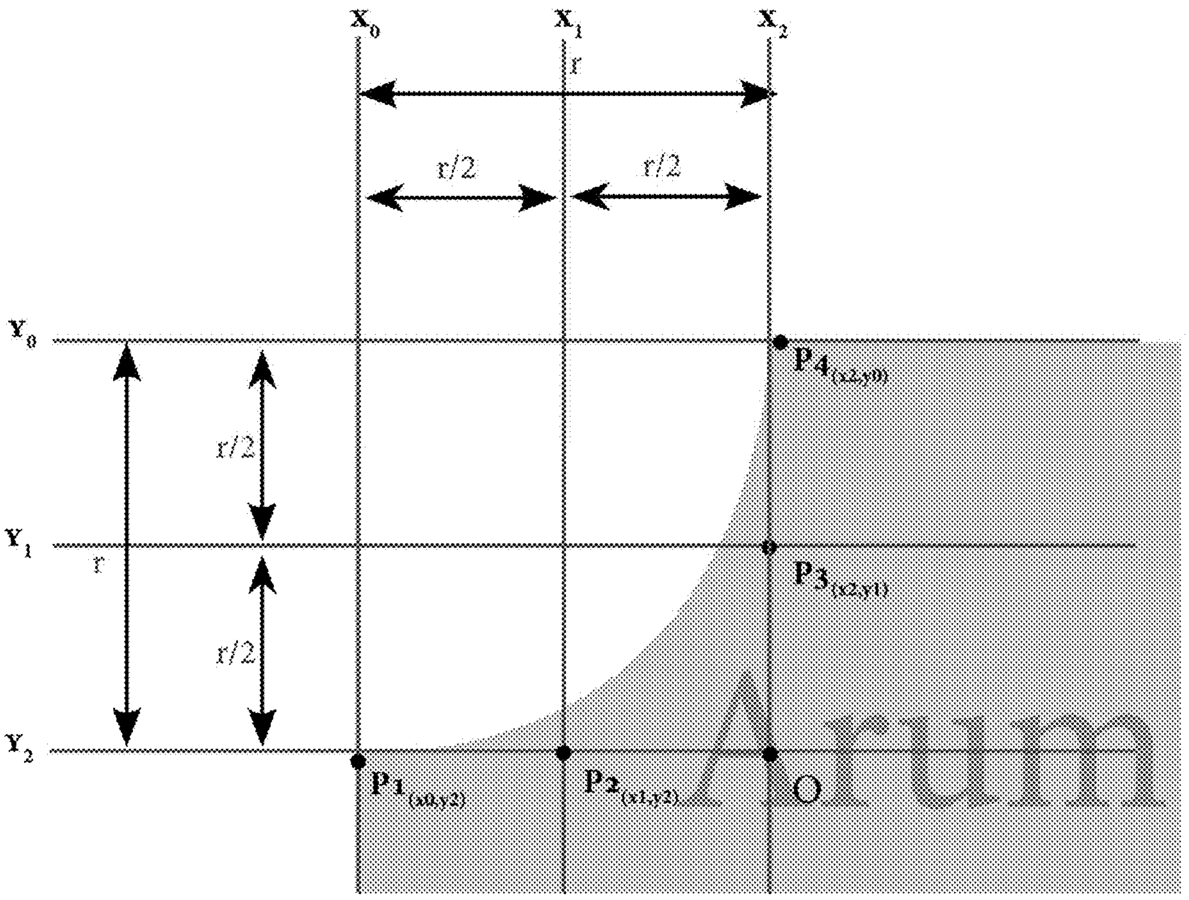
FIG. 21D is an illustration of an inverse rounded type corner boundary and corner.

The inset corner type provides digital publishers with a greater degree of control over how background shading is applied to identified text. Positioning the corner boundaries of the shaded region in this way can be achieved by selecting "Inset" in corner control 1570 of user interface 1560, as illustrated in FIG. 15A.

e. Inverse Rounded: For each corner type specified by the user as "Inverse Rounded," a stylized corner boundary of the inverse rounded type is positioned. See reference numeral 2356 in FIG. 20. FIG. 21D illustrates a top-left inverse rounded corner boundary, and the process executed to position it. As shown in FIG. 21D, to position the top-left inverse rounded corner, a point, P1, along the left boundary is selected. As shown, P1 is positioned a distance away from the intersection of the top boundary and the left boundary equal to the radius of the stylized corner. P1 is recorded as the new top of the left boundary. Next, a line having a length equal to ½ the radius is followed from P1 toward the right boundary. The point at the end of this line is P2. From P2, a line having a length equal to ½ the radius is followed toward the right boundary. Next, a line having a length equal to ½ the radius is followed toward the top boundary. The point at the end of this line is P3. Next, a line having a length equal to ½ the radius is followed toward the top boundary. The point at the end of this line is P4. P4 is recorded as the new left end of the top boundary. The shape formed by traversing a cubic Bezier curve from P1 to P4 using P2 and P3 as control points forms the new top left corner boundary. Analogous processes are executed to position top-right, bottom-right, and bottom-left corner boundaries where the type of the corner is inverse rounded. Where, for example, the radius of an inverse rounded corner is 21 and the x, y coordinates illustrated in FIG. 21D begin at (0,0) with the x-axis extending positively toward the right boundary and the y-axis extending positively toward the bottom boundary, P1-P4 may be calculated as follows.

$P1=(x0,y1)$ i.e. (left,top+$r$)=(0,21).

$P2=(x1,y2)$ i.e. (left+$r$/2,top+$r$)=(10.5,21).

$P3=(x2,y1)$ i.e. (left+$r$,top+$r$/2)=(21,10.5).

$P4=(x1,y0)$ i.e. (left+$r$,top)=(21,0).

Figure 21E:
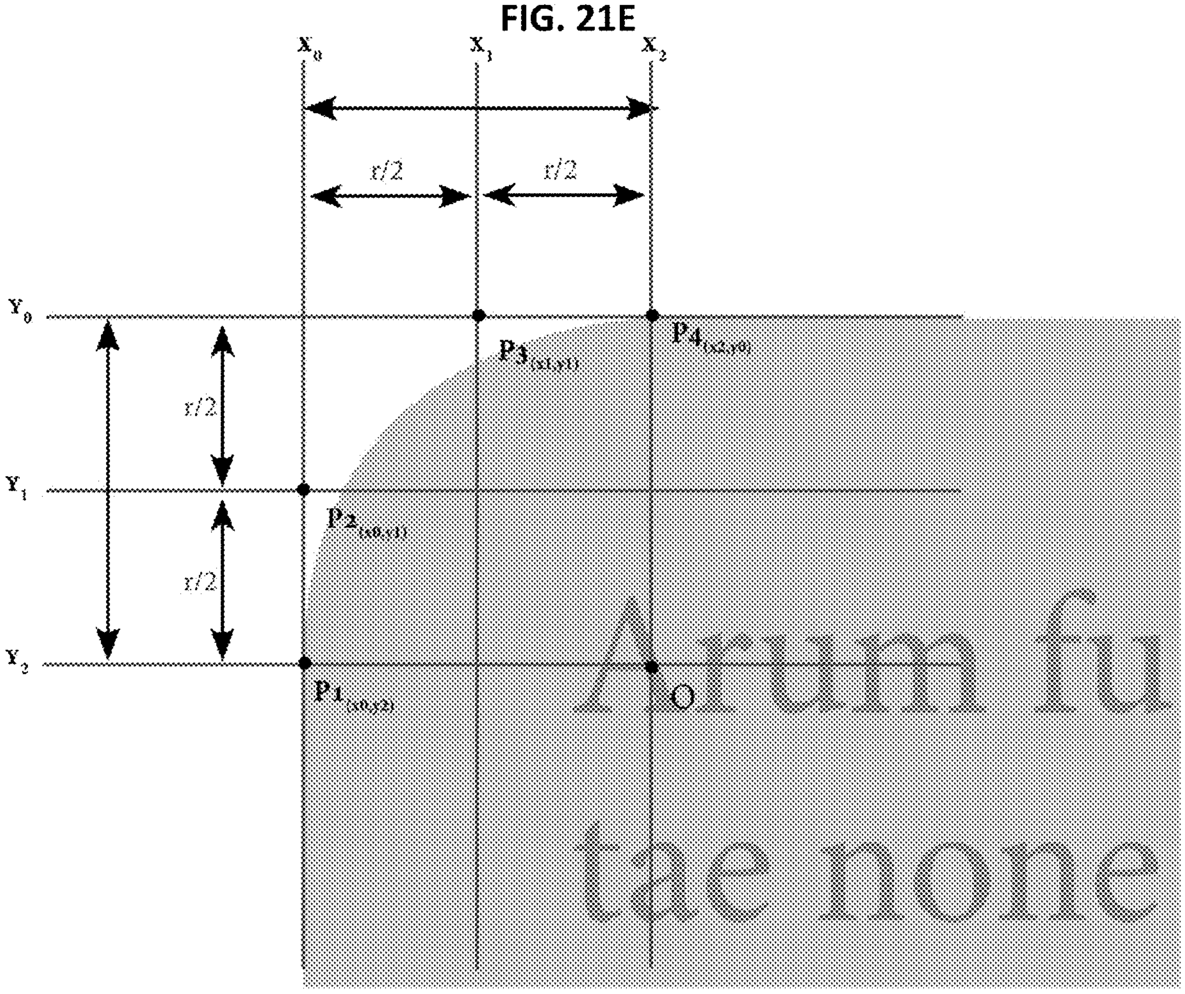
FIG. 21E is an illustration of a rounded type corner boundary and corner.

The inverse rounded corner type provides digital publishers with a greater degree of control over how background shading is applied to identified text. Positioning the corner boundaries of the shaded region in this way can be achieved by selecting "Inverse Rounded" in corner control 1570 of user interface 1560, as illustrated in FIG. 15A.

f. Rounded: For each corner type specified by the user as "Rounded," a stylized corner boundary of the rounded type is positioned. See reference numeral 2357 in FIG. 20. FIG. 21E illustrates a top-left rounded corner boundary, and the process executed to position it. As shown in FIG. 21E, to position the top-left rounded corner, a point, P1, along the left boundary is selected. As shown, P1 is positioned a distance away from the intersection of the top boundary and the left boundary equal to the radius of the stylized corner. P1 is recorded as the new top of the left boundary. Next, a line having a length equal to ½ the radius is followed from P1 toward the top boundary. The point at the end of this line is P2. From P2, a line having a length equal to ½ the radius is followed toward the top boundary. Next, a line having a length equal to ½ the radius is followed toward the right boundary. The point at the end of this line is P3. Next, a line having a length equal to ½ the radius is followed toward the right boundary. The point at the end of this line is P4. P4 is recorded as the new left end of the top boundary. The shape formed by traversing a cubic Bezier curve from P1 to P4 using P2 and P3 as control points forms the new top left corner boundary. Analogous processes are executed to position top-right, bottom-right, and bottom-left corner boundaries where the type of the corner is rounded. Where, for example, the radius of a rounded corner is 21 and the x, y coordinates illustrated in FIG. 21E begin at (0,0) with the x-axis extending positively toward the right boundary and the y-axis extending positively toward the bottom boundary, P1-P4 may be calculated as follows.

$P1=(x0,y1)$i.e. (left,top+$r$)=(0,21).

$P2=(x0,y1)$i.e. (left,top+$r$/2)=(0,10.5).

$P3=(x1,y0)$i.e. (left+$r$/2,top)=(10.5,0).

$P4=(x1,y0)$i.e. (left+$r$,top)=(21,0).

The rounded corner type provides digital publishers with a greater degree of control over how background shading is applied to identified text. Positioning the corner boundaries of the shaded region in this way can be achieved by selecting "Rounded" in corner control 1570 of user interface 1560, as illustrated in FIG. 15A.

The example methods disclosed herein for positioning the corner boundaries of a region of background shading can be applied in automated workflows. For example, corner control settings or fixed position settings can be scripted and applied as fixed offsets based on user preference. Fixed position settings can be defined as a numerically-provided offset relative to a page edge, a margin, a column, a baseline, or some other layout feature. In embodiments wherein corner control settings or fixed position settings are scripted, user interface 1560 and user interface sub-module 1462 are optionally omitted.

Further Example Background Shading Embodiments

Numerous variations and configurations will be apparent in light of this disclosure. For instance, as illustrated in FIG. 19, one example embodiment provides a computer-implemented method 3000 for applying background shading to textual content. The method includes receiving user input that defines a textual content segment that is to be located within a region of background shading. The textual content segment includes a first plurality of glyphs arranged in one or more lines. See reference numeral 3100 in FIG. 19. See also reference numeral 2100 in FIG. 16, which indicates that method 2000 for positioning the boundaries that define a region of background shading includes identifying a first plurality of glyphs to which background shading should be applied.

Method 3000 further includes identifying a font associated with the first plurality of glyphs. The identified font includes a second plurality of glyphs. See reference numeral 3200 in FIG. 19. See also reference numerals 2216*a* in FIG. 17A and 2226*a* in FIG. 17B, which indicate that method 2200 for positioning top and bottom boundaries of a region of background shading includes identifying fonts present in the identified text. Thus, in such embodiments the first plurality of glyphs includes the text selected to which background shading is to be applied, and the second plurality of glyphs includes the glyphs that collectively include one of the identified fonts.

Method 3000 further includes determining a maximum dimension associated with the second plurality of glyphs. See reference numeral 3300 in FIG. 19. See also reference numeral 2216*b* in FIG. 17A, which indicates that method 2200 for positioning top and bottom boundaries of a region of background shading includes determining a maximum ascent of the plurality of glyphs comprising the identified fonts, that is, the second plurality of glyphs. Likewise, reference numeral 2226*b* in FIG. 17B indicates that method 2200 includes determining a maximum descent of the second plurality of glyphs.

Method 3000 further includes positioning a boundary of the region of background shading at a distance from a baseline of a particular one of the lines. The distance is based on the determined maximum dimension. See reference numeral 3400 in FIG. 19. See also reference numeral 2216*c* in FIG. 17A, which indicates that method 2200 for positioning top and bottom boundaries of a region of background shading includes positioning a top boundary at a determined maximum ascent. Ascent-based shading boundary 39*a* illustrated in FIG. 1C is an example of a top boundary positioned in this way. See also reference numeral 2226*c* in FIG. 17B, which indicates that method 2200 includes positioning a bottom boundary at a determined maximum descent. Descent-based shading boundary 39*d* illustrated in FIG. 1C is an example of a bottom boundary positioned in this way.

Method 3000 further includes displaying background shading in the region of background shading. See reference numeral 3500 in FIG. 19. See also reference numerals 2500 and 2600 in FIG. 16, which indicate that method 2000 for positioning the boundaries that define a region of background shading includes applying background shading to a region defined by such boundaries, and displaying the plurality of glyphs with the background shading. Shaded regions 38€, 38*c*, 38*r* illustrated in FIG. 1C are examples of a region wherein a plurality of glyphs displayed with background shading, and wherein the region of background shading is at least partially defined by an ascent-based shading boundary.

Methodology: General Overview of Borders

Figure 22:
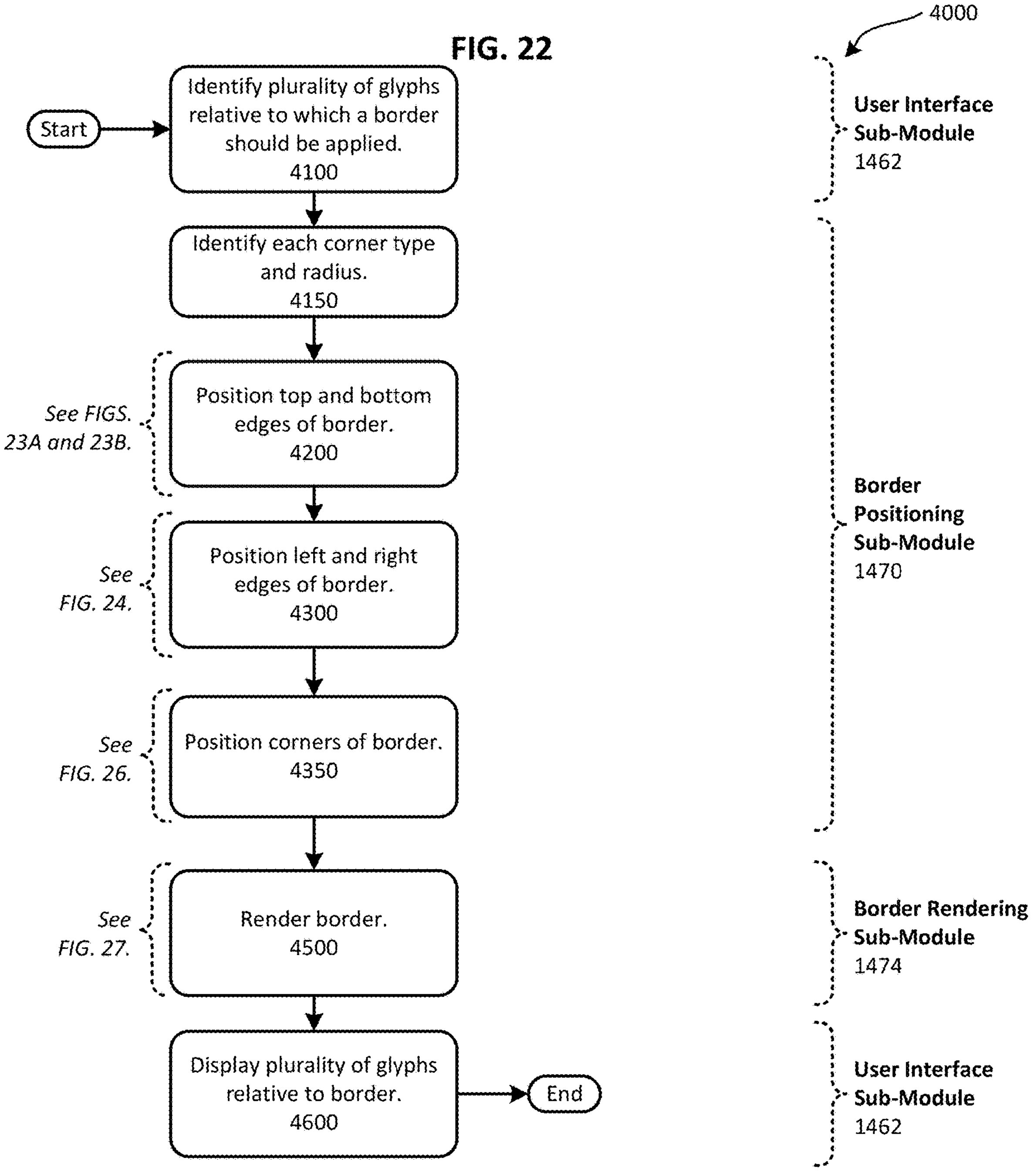
FIG. 22 is a flowchart illustrating an example method for positioning edges that define a border that is applied to digitally published textual content.

FIG. 22 is a flowchart illustrating an example method 4000 for positioning edges that define a border that is applied to digitally published text. As can be seen, method 4000 includes a number of phases and sub-processes, the sequence of which may vary from one embodiment to another. However, when considered in the aggregate, these phases and sub-processes form part of an improved digital publishing framework that is capable of precisely and reliably applying borders to textual content. The techniques disclosed herein are responsive to user input in accordance with certain of the embodiments disclosed herein. Method 4000 can be implemented, for example, using the system architecture illustrated in FIG. 14 and described herein. However, other system architectures can be used in other embodiments, as will be apparent in light of this disclosure. To this end, the correlation of the various functionalities shown in FIG. 22 to the specific components illustrated in FIG. 14 is not intended to imply any structural and/or use limitations. Rather other embodiments may include, for example, varying degrees of integration wherein multiple functionalities are effectively performed by one system or module. For example, in an alternative embodiment a single module can be used to apply borders to defined textual content and display the textual content relative to the applied border. Thus other embodiments may have fewer or more modules depending on the granularity of implementation. Numerous variations and alternative configurations will be apparent in light of this disclosure.

As illustrated in FIG. 22, method 4000 commences with identifying a plurality of glyphs to which a border should be applied. See reference numeral 4100 in FIG. 22. The plurality of glyphs can be identified via the user interface generated by user interface sub-module 1462. For example, in one embodiment a user highlights the text to which the border is to be applied using pointer-based input device 186. Other text selection techniques can be used in other embodiments. Once the plurality of glyphs has been identified, method 4000 continues with identifying the type and radius of each corner to be applied to the border. See reference numeral 4150 in FIG. 22. The types of corners and their radii can be identified via the user interface generated by user interface sub-module 1462. For example, in one embodiment a user selects the corner types and their radii using pointer-based input device 186 via corner control 1584 rendered by the user interface 1580. Other text selection techniques can be used in other embodiments.

Figure 23A:
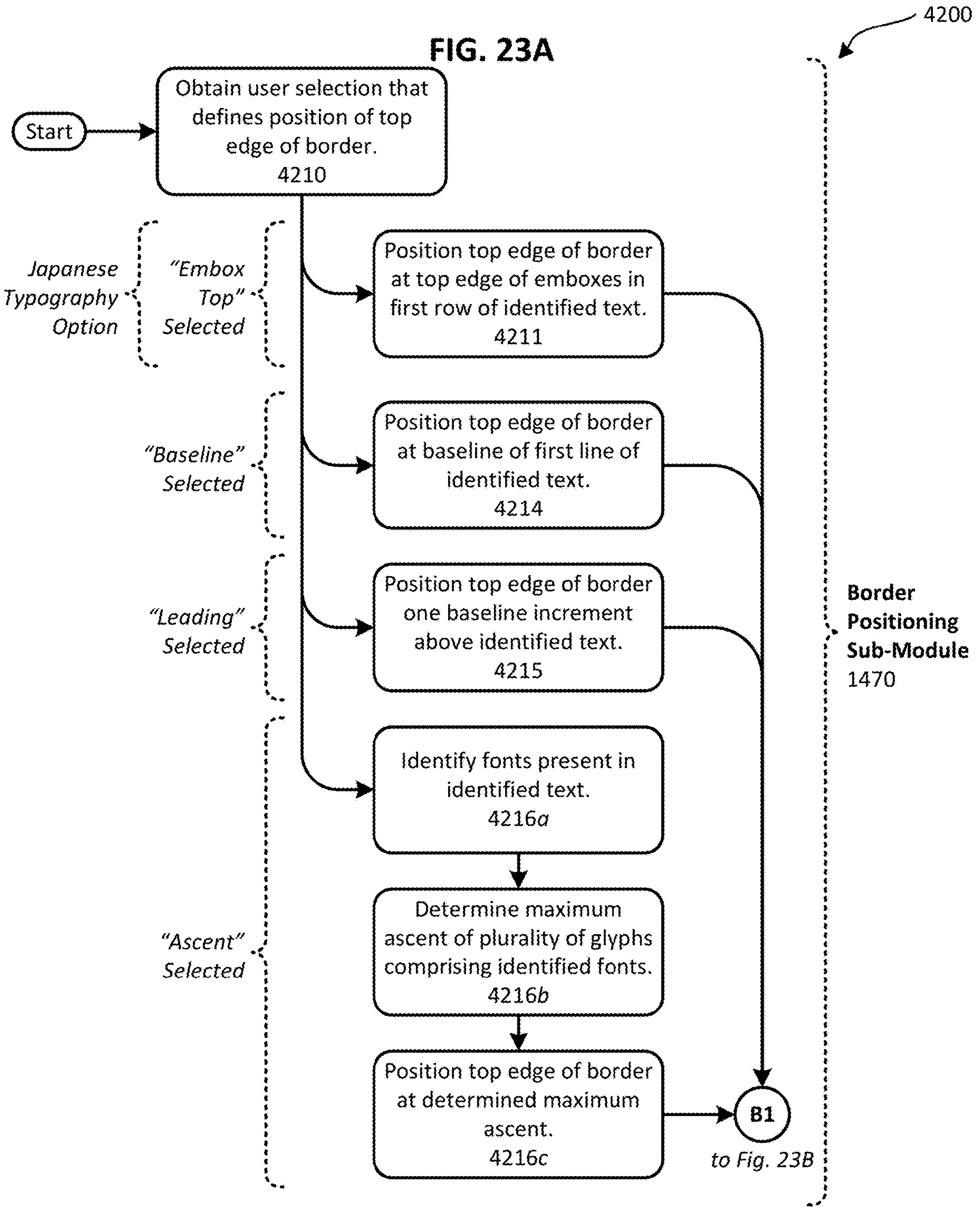
FIGS. 23A and 23B comprise a flowchart illustrating an example method for positioning top and bottom edges of a border that is to be applied to digitally published textual content.
Figure 23B:
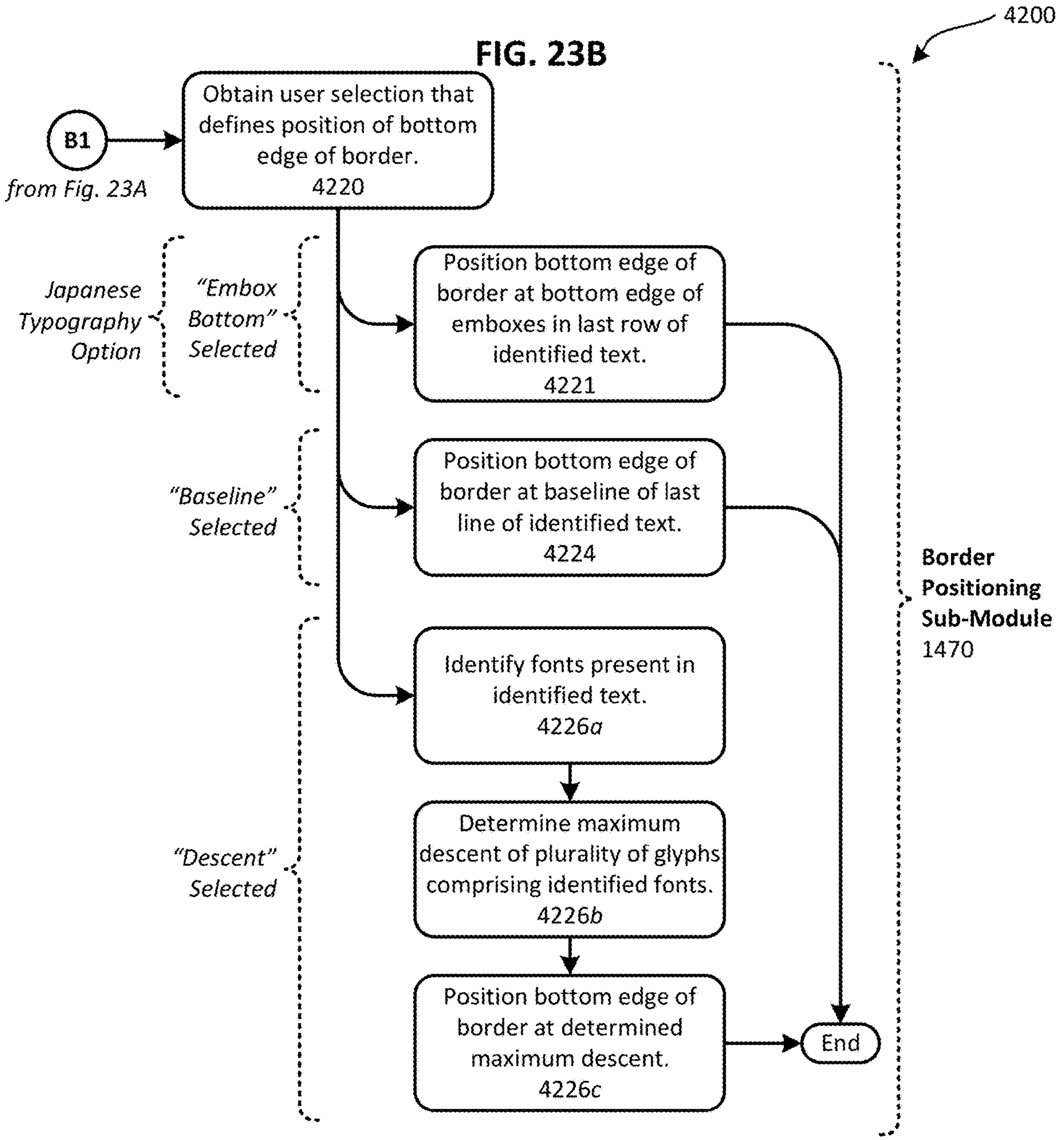
Figure 24:
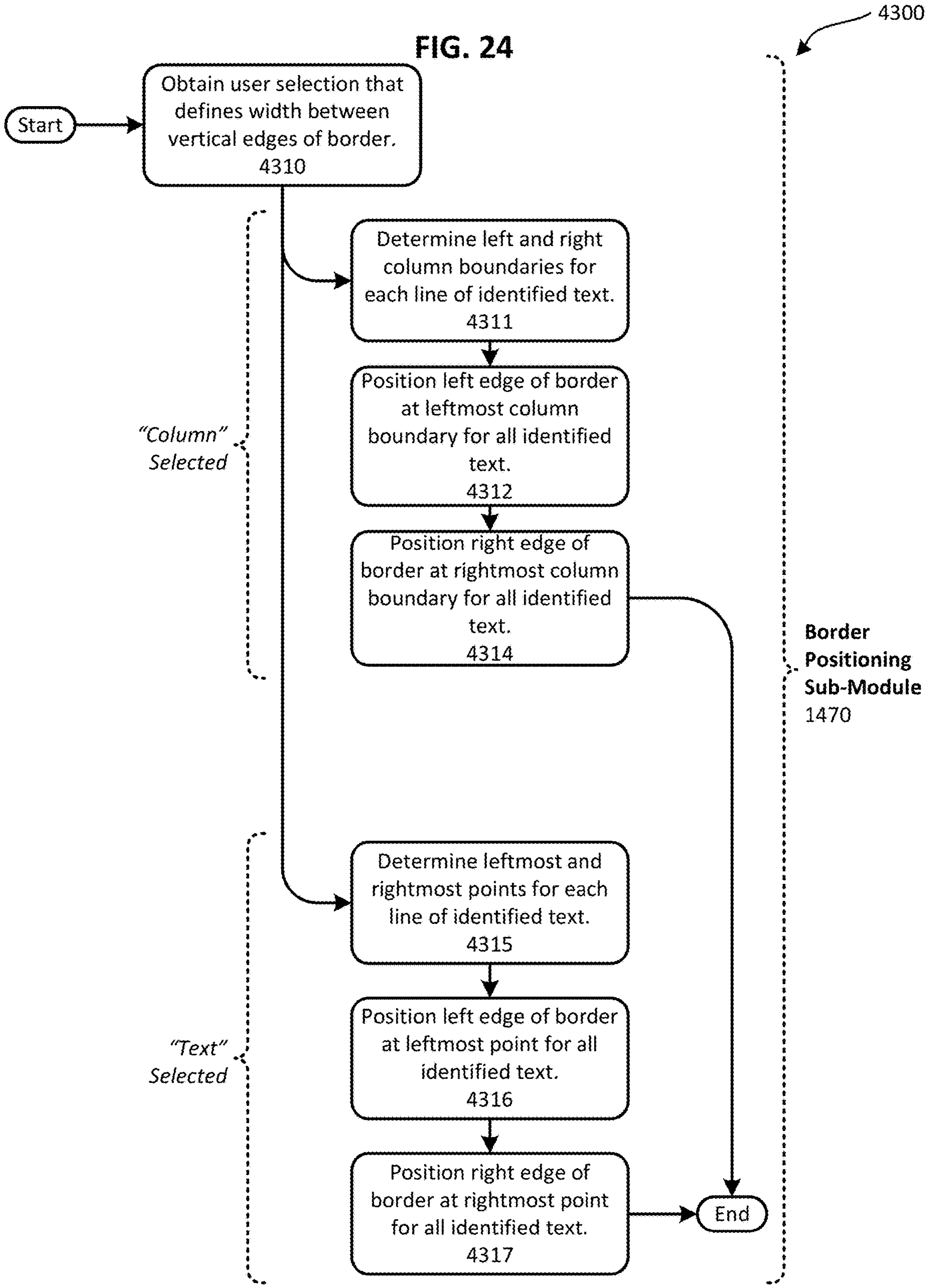
FIG. 24 is a flowchart illustrating an example method for positioning left and right edges of a border that is to be applied to digitally published textual content.
Figure 26:
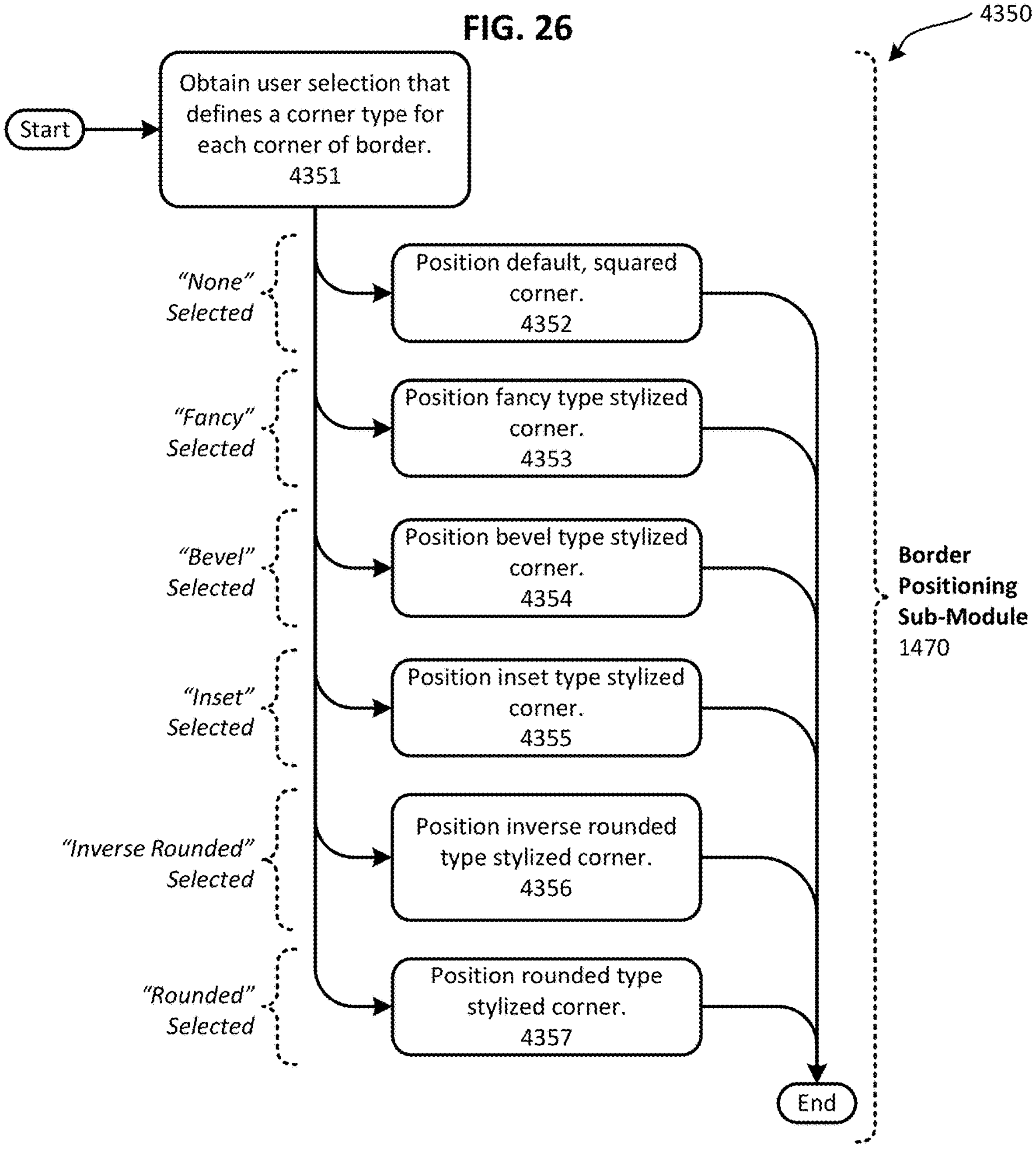
FIG. 26 is a flowchart illustrating an example method for positioning corners of a border that is to be applied to digitally published textual content.

Once the types of the corners have been identified, the border positioning process invoked by border positioning sub-module 1470 positions top and bottom edges of the border. See reference numeral 4200 in FIG. 22. One way of accomplishing this is illustrated in FIGS. 23A and 23B, which will be described in turn. The border positioning process invoked by border positioning sub-module 1470 also positions left and right edges of the border. See reference numeral 4300 in FIG. 22. One way of accomplishing this is illustrated in FIG. 24, which will also be described in turn. The border positioning process invoked by the border positioning sub-module 1470 also positions corners of the border. See reference numeral 4350 in FIG. 22. One way of accomplishing this is illustrated in FIG. 26, which will also be described in turn. In certain embodiments the border positioning process is responsive to user input received via one or more of top edge position control 1592, bottom edge position control 1594, width control 1590, and corner control 1584 in the example user interface 1580 that is illustrated in FIG. 15C. An example of a border with stylized corners resulting from execution of the border positioning process is illustrated in FIG. 9B.

Once the top, bottom, left, and right corners have been positioned, the border rendering process invoked by border rendering sub-module 1474 generates border edges at the positions defined by the border positioning process. See reference numeral 4500 in FIG. 22. This can be accomplished by drawing the border color, pattern, or other visual characteristic on the aforementioned graphics port. Additional border rendering options and their effect on the border rendering process are described further below with reference to FIG. 27. Rendering the border optionally includes updating metadata that characterizes the digital content which includes the applied border. The previously identified plurality of glyphs and the border can then be displayed using the user interface generated by user interface sub-module 1462. See reference numeral 4600 in FIG. 22. This allows a user to simultaneously define and visualize a border.

Methodology: Positioning Top and/or Bottom Edges of a Border

FIGS. 23A and 23B comprise a flowchart illustrating an example method 4200 for positioning top and bottom edges of a border that is to be applied to digitally published text. The vertical span of the border can be understood as the difference between the top and bottom edges of the border. Method 4200 commences with obtaining a user selection that defines the position of the top edge of the border to be applied. See reference numeral 4210 in FIG. 23A. In certain embodiments this user selection is provided via top edge position control 1592 of example user interface 1580. A number of rules may exist for defining the top edge position. In some cases the top edge position can be set manually, for example by the user specifying a position numerically or graphically. Examples of rules for defining the top edge position include, but are not limited to:

a. Embox Top: Where border is to be applied to glyphs which are arranged in a frame grid, as is often the case for CJK typesetting, the top edge of the border may be positioned at the top edge of the first row of emboxes in the frame grid. See reference numeral 4211 in FIG. 23A. The top edge is thus positioned above the entire area of each embox in the first row of the previously identified text. The top edge of the border is unaffected by the geometry of the particular glyphs present in the first row of emboxes. The result is a more stable and precise positioning of the top edge of the border. An example of such a top edge is illustrated in FIG. 4A, where embox border 46 uniformly extends along embox edges. Positioning the top edge of the border in this way can be achieved by selecting "Embox Top" in top edge position control 1592 of user interface 1580, as illustrated in FIG. 15C.

b. Baseline: The top edge of the border may be positioned along the baseline of the first line of identified text. See reference numeral 4214 in FIG. 23A. In this case, the top edge of the border is unaffected by the geometry of the particular glyphs present in the first line of identified text. The result is a more stable and precise positioning of the top edge of the border. An example of a baseline-based border edge 14*b* is illustrated in FIG. 1B, wherein border edge 14*b* extends uniformly across each column 10ℓ, 10*c*, 10*r*. Positioning the top edge of the border in this way can be achieved by selecting "Baseline" in top edge position control 1592 of user interface 1580, as illustrated in FIG. 15C.

c. Leading: The top edge of the border may be positioned one baseline increment above the identified text. See reference numeral 4215 in FIG. 23A. In this case, the top edge of the border is unaffected by the geometry of the particular glyphs present in the first line of identified text. The result is a more stable and precise positioning of the top edge of the border. An example of a leading-based border edge 14ℓ is illustrated in FIG. 1B, wherein border edge 14ℓ extends uniformly across each column 10ℓ, 10*c*, 10*r*. Positioning the top edge of the border in this way can be achieved by selecting "Leading" in top edge position control 1592 of user interface 1580, as illustrated in FIG. 15C.

d. Ascent: The top edge of the border may be positioned based on the largest ascent of all of the glyphs that comprise the fonts present in the identified text. More specifically, the top edge can be positioned at a distance above the baseline of the first line of identified text, wherein the distance is substantially equal to the aforementioned largest ascent. As used herein, "substantially equal" refers to an equivalence that gives a consumer of the identified text the impression that the border would fully encompass all glyphs that comprise the fonts present in the identified text. Positioning the top edge of the border in this way can be accomplished by first identifying the fonts present in the identified text. See reference numeral 4216*a* in FIG. 23A. Each of the fonts present in the identified text defines a plurality of glyphs. The maximum ascent of the plurality of glyphs comprising the identified fonts is then determined. See reference numeral 4216*b* in FIG. 23A. Such a determination can be made with reference to font resources 1422 stored in memory 1420. The top edge of the border, also referred to as an ascent-based border edge, can then be positioned at the determined maximum ascent. See reference numeral 4216*c* in FIG. 23A. Thus, even if the identified text is later manipulated such that different glyphs are present in the first line, the top edge of the border will be unaffected by such manipulations. The result is a more stable and precise positioning of the top edge of the border. An example of ascent-based border edge 14*a* is illustrated in FIG. 1B, wherein border edge 14*a* extends uniformly across each column 10ℓ, 10*c*, 10*r*. Positioning the top edge of the border in this way can be achieved by selecting "Ascent" in top edge position control 1592 of user interface 1580, as illustrated in FIG. 15C.

Method 4200 also comprises obtaining a user selection that defines the position of the bottom edge of the border to be applied. See reference numeral 4220 in FIG. 23B. While example method 4200 is described herein as defining the position of the top edge before that of the bottom edge, in alternative implementations the position of the bottom edge is defined first. In certain embodiments the user selection that defines the position of the bottom edge is provided via bottom edge position control 1594 of example user interface 1580. A number of rules exist for defining the bottom edge position. In some cases the bottom edge position can be set manually, for example by the user specifying a position numerically or graphically. Examples of rules for defining the bottom edge position include, but are not limited to:

a. Embox Bottom: Where border is to be applied to glyphs which are arranged in a frame grid, as is often the case for CJK typesetting, the bottom edge of the border may be positioned at the bottom edge of the last row of emboxes in the frame grid. See reference numeral 4221 in FIG. 23B. The bottom edge is thus positioned below to the entire area of each embox in the last row of identified text. The bottom edge of the border is unaffected by the geometry of the particular glyphs present in the last row of emboxes. The result is a more stable and precise positioning of the bottom edge of the border. An example of such a border is illustrated in FIG. 4A, where embox border 46 uniformly extends along embox edges. Positioning the bottom edge of the border in this way can be achieved by selecting "Embox Bottom" in bottom edge position control 1594 of user interface 1580, as illustrated in FIG. 15.

b. Baseline: The bottom edge of the border may be positioned along the baseline of the last line of identified text. See reference numeral 4224 in FIG. 23B. In this case, the bottom edge of the border is unaffected by the geometry of the particular glyphs present in the last line of identified text. The result is a more stable and precise positioning of the bottom edge of the border. An example of a baseline-based border edge is illustrated in FIG. 1B, wherein border edge 14*b* extends uniformly across each column 10ℓ, 10*c*, 10*r*. Positioning the bottom edge of the border in this way can be achieved by selecting "Baseline" in bottom edge position control 1594 of user interface 1580, as illustrated in FIG. 15C.

c. Descent: The bottom edge of the border may be positioned based on the largest descent of all of the glyphs that comprise the fonts present in the identified text. More specifically, the bottom edge can be positioned at a distance below the baseline of the last line of identified text, wherein the distance is substantially equal to the aforementioned largest descent. As used herein, "substantially equal" refers to an equivalence that gives a consumer of the identified text the impression that the border would fully encompass all glyphs that comprise the fonts present in the identified text. Positioning the bottom edge of the border in this way can be accomplished by first identifying the fonts present in the identified text. See reference numeral 4226*a* in FIG. 23B. Each of the fonts present in the identified text defines a plurality of glyphs. The maximum descent of the plurality of glyphs comprising the identified fonts is then determined. See reference numeral 4226*b* in FIG. 23B. Such a determination can be made with reference to font resources 1422 stored in memory 1420. The bottom edge of the border, also referred to as a descent-based border edge, can then be positioned at the determined maximum descent. See reference numeral 4226*c* in FIG. 23B. Thus, even if the identified text is later manipulated such that different glyphs are present in the last line, the bottom edge of the border will be unaffected by such manipulations. The result is a more stable and precise positioning of the bottom edge of the border. An example of a descent-based border edge 14*d* is illustrated in FIG. 1B, wherein border edge 14*d* extends uniformly across each column 10ℓ, 10*c*, 10*r*. Positioning the bottom edge of the border in this way can be achieved by selecting "Descent" in bottom edge position control 1594 of user interface 1580, as illustrated in FIG. 15C.

The example methods disclosed herein for positioning the top and bottom edges of a border can be applied in automated workflows. For example, baseline settings or fixed position settings can be scripted and applied as fixed offsets based on font attributes. Fixed position settings can be defined as a numerically-provided offset relative to a page edge, a margin, a column, a baseline, or some other layout feature. In embodiments wherein baseline settings or fixed position settings are scripted, user interface 1580 and user interface sub-module 1462 are optionally omitted.

Methodology: Positioning Left and/or Right Edges of a Border

FIG. 24 is a flowchart illustrating an example method 4300 for positioning left and right edges of a border to be applied to digitally published text. The horizontal span of the border can be understood as the difference between the left and right edges of the border. Method 4300 commences with obtaining a user selection that defines the width of the border to be applied. See reference numeral 4310 in FIG. 24. In certain embodiments the user selection is provided via width control 1590 of example user interface 1580. A number of rules exist for defining the position of the left and right edges of the border. In some cases the left and right edge positions can be set manually, for example by the user specifying a position numerically or graphically. Examples of rules for defining the left and right edge positions include, but are not limited to:

a. Column: Where the user specifies that the width of the border should correspond to the width of the column containing the identified text, the left and right column boundaries for each line of identified text are determined. See reference numeral 4311 in FIG. 24. The left edge of the border is positioned at the leftmost column boundary. See reference numeral 4312 in FIG. 24. Likewise, the right edge of the border is positioned at the rightmost column boundary. See reference numeral 4314 in FIG. 24. An example of textual content having vertical border edges that are applied in this way is illustrated in FIG. 2A. In particular, FIG. 2A illustrates frame-width border 24 that extends to frame boundary 22, regardless of the fact that the textual content within the frame does not. Positioning the left and right edges of the border in this way can be achieved by selecting "Column" in width control 1590 of user interface 1580, as illustrated in FIG. 15C.

b. Text: Where the user specifies that the width of the border should correspond to the width of the identified text itself, the leftmost and rightmost points in each line of identified text are determined. See reference numeral 4315 in FIG. 24. The left edge of the border is positioned at the leftmost point for all lines of identified text. See reference numeral 4316 in FIG. 24. Likewise, the right edge of the border is positioned at the right-most point for all lines of identified text. See reference numeral 4317 in FIG. 24. An example of textual content having a border that is applied in this way is illustrated in FIG. 2A. In particular, FIG. 2A illustrates text-width border 26 that extends only to left and right text boundaries 20, regardless of the location of frame boundaries 22. This provides digital publishers with a greater degree of control over how a border is applied to identified text, and in particular, helps avoid bordering margin regions that do not contain any textual content. Positioning the left and right edges of the border in this way can be achieved by selecting "Text" in width control 1590 of user interface 1580, as illustrated in FIG. 15C.

The example methods disclosed herein for positioning the left and right edges of a border can be applied in automated workflows. For example, width control settings or fixed position settings can be scripted and applied as fixed offsets based on user preference. Fixed position settings can be defined as a numerically-provided offset relative to a page edge, a margin, a column, a baseline, or some other layout feature. In embodiments wherein width control settings or fixed position settings are scripted, user interface 1580 and user interface sub-module 1462 are optionally omitted.

Methodology: Positioning Corners of a Border

FIG. 26 is a flowchart illustrating an example method 4350 for positioning corners of a border to be applied to digitally published text. Method 4350 commences with obtaining a user selection that defines the type and/or the radius of each corner to be positioned for the border. See reference numeral 4351 in FIG. 26. In certain embodiments the user selection is provided via corner control 1584 of example user interface 1580. A number of rules exist for defining the position of the corners of the border. In some cases the corner positions can be set manually, for example by the user specifying a position numerically or graphically. Examples of stylized corners resulting from execution of these rules are illustrated in FIG. 9B. Examples of rules for defining the position of each respective corner are associated with the corner type and include, but are not limited to:

a. None: For each corner type specified by the user as "None," a default, squared corner is positioned. See reference numeral 4352 in FIG. 26. A corner type of "None" indicates that no stylized corner is to be applied to a corner, and the corner remains the intersection of the horizontal edge (e.g., the top or bottom edge) and the vertical edge (e.g., the left or right edge). Thus, the corner retains a default, squared shape. An example of textual content having a border with default corners is illustrated in FIG. 3. In particular, FIG. 3 illustrates a mixed edge border 30, which has a default bottom-left corner. Positioning corners of the border in this way can be achieved by selecting "None" in corner control 1584 of user interface 1580, as illustrated in FIG. 15C.

b. Fancy: For each corner type specified by the user as "Fancy," a stylized corner of the fancy type is positioned. See reference numeral 4353 in FIG. 26. FIG. 21A illustrates a top-left fancy corner, and the process executed to position it. As shown in FIG. 21A, to position the top-left fancy corner, a point, P1, along the left edge is selected. As shown, P1 is positioned a distance away from the intersection of the top edge and the left edge equal to the radius of the stylized corner. P1 is recorded as the new top of the left edge. Next, a line having a length equal to ⅔ the radius is followed from P1 toward the right edge. The point at the end of this line is P2. From P2, a line having a length equal to ⅔ the radius is followed toward the top edge. The point at the end of this line is P3. From P3, a line having a length equal to ⅓ of the radius is followed toward the left edge. The point at the end of this line is P4. From P4, a line having a length equal to ⅓ of the radius is followed toward the bottom edge. The point at the end of this line is P5. From P5, a line having a length equal to ⅔ of the radius is followed toward the right edge. The point at the end of this line is P6. From P6, a line having a length equal to ⅔ of the radius is followed toward the top edge. The point at the end of this line is P7. P7 is recorded as the new left end of the top edge. The new top-left corner is rendered by traversing a path including P1, P2, P5, P4, P3, P6, and P7 as shown in FIG. 21A. Analogous processes are executed to position top-right, bottom-right, and bottom-left corners where the type of the corner is fancy. Where, for example, the radius of a fancy corner is 21 and the x, y coordinates illustrated in FIG. 21A begin at (0,0) with the x-axis extending positively toward the right edge and the y-axis extending positively toward the bottom edge, P1-P7 may be calculated as follows.

$$P1=(x0,y3)\text{i.e. }(\text{left},\text{top}+r)=(0,21).$$

$$P2=(x2,y3)\text{i.e. }(\text{left}+2*(r/3),\text{top}+r)=(14,21).$$

$$P3=(x2,y1)\text{i.e. }(\text{left}+2*(r/3),\text{top}+r/3)=(14,7).$$

$$P4=(x1,y1)\text{i.e. }(\text{left}+(r/3),\text{top}+(r/3))=(7,7).$$

$$P5=(x1,y2)\text{i.e. }(\text{left}+(r/3),\text{top}+2*(r/3))=(7,14).$$

$$P6=(x3,y2)\text{i.e. }(\text{left}+r,\text{top}+2*(r/3))=(21,14).$$

$$P7=(x3,y0)\text{i.e. }(\text{left}+r,\text{top})=(21,0).$$

The fancy corner type provides digital publishers with a greater degree of control over how a border is applied to identified text. Positioning the corners of the border in this way can be achieved by selecting "Fancy" in corner control 1584 of user interface 1580, as illustrated in FIG. 15C.

c. Bevel: For each corner type specified by the user as "Bevel," a stylized corner of the Bevel type is positioned. See reference numeral 4354 in FIG. 26. FIG. 21B illustrates a top-left bevel corner, and the process executed to position it. As shown in FIG. 21B, to position the top-left bevel corner, a point, P1, along the left edge is selected. As shown, P1 is positioned a distance away from the intersection of the top edge and the left edge equal to the radius of the stylized corner. P1 is recorded as the new top of the left edge. Next, a point, P2, along the top edge is selected. As shown, P2 is positioned a distance away from the intersection of the top edge and the left edge equal to the radius of the stylized corner. P2 is recorded as the new left end of the top edge. Next, a line is followed from P1 to P2. The shape formed by traversing a path including P1 and P2 forms the new top-left corner. Analogous processes are executed to position top-right, bottom-right, and bottom-left corners where the type of the corner is bevel. Where, for example, the radius of a bevel corner is 21 and the x, y coordinates illustrated in FIG. 21B begin at (0,0) with the x-axis extending positively toward the right edge and the y-axis extending positively toward the bottom edge, P1 and P2 may be calculated as follows.

$P1=(x0,y1)$i.e. (left,top+$r$)=(0,21).

$P2=(x1,y0)$i.e. (left+$r$,top)=(21,0).

The bevel corner type provides digital publishers with a greater degree of control over how a border is applied to identified text. Positioning the corners of the border in this way can be achieved by selecting "Bevel" in corner control 1584 of user interface 1580, as illustrated in FIG. 15C.

d. Inset: For each corner type specified by the user as "Inset," a stylized corner of the Inset type is positioned. See reference numeral 4355 in FIG. 26. FIG. 21C illustrates a top-left inset corner, and the process executed to position it. As shown in FIG. 21C, to position the top-left inset corner, a point, P1, along the left edge is selected. As shown, P1 is positioned a distance away from the intersection of the top edge and the left edge equal to the radius of the stylized corner. P1 is recorded as the new top of the left edge. Next, a line having a length equal to the radius is followed from P1 toward the right edge. The point at the end of this line is P2. From P2, a line having a length equal to the radius is followed toward the top edge. The point at the end of this line is P3. The shape formed by traversing a path including P1, P2, and P3 forms the new top-left corner. Analogous processes are executed to position top-right, bottom-right, and bottom-left corner boundaries where the type of the corner is inset. Where, for example, the radius of an inset corner is 21 and the x, y coordinates illustrated in FIG. 21C begin at (0,0) with the x-axis extending positively toward the right edge and the y-axis extending positively toward the bottom edge, P1-P3 may be calculated as follows.

$P1=(x0,y1)$i.e. (left,top+$r$)=(0,21).

$P2=(x1,y1)$i.e. (left+$r$,top+$r$)=(21,21).

$P3=(x1,y0)$i.e. (left+$r$,top)=(21,0).

The inset corner type provides digital publishers with a greater degree of control over how a border is applied to identified text. Positioning the corners of the border in this way can be achieved by selecting "Inset" in corner control 1584 of user interface 1580, as illustrated in FIG. 15C.

e. Inverse Rounded: For each corner type specified by the user as "Inverse Rounded," a stylized corner of the inverse rounded type is positioned. See reference numeral 4356 in FIG. 26. FIG. 21D illustrates a top-left inverse rounded corner, and the process executed to position it. As shown in FIG. 21D, to position the top-left inverse rounded corner, a point, P1, along the left edge is selected. As shown, P1 is positioned a distance away from the intersection of the top edge and the left edge equal to the radius of the stylized corner. P1 is recorded as the new top of the left edge. Next, a line having a length equal to ½ the radius is followed from P1 toward the right edge. The point at the end of this line is P2. From P2, a line having a length equal to ½ the radius is followed toward the right edge. Next, a line having a length equal to ½ the radius is followed toward the top edge. The point at the end of this line is P3. Next, a line having a length equal to ½ the radius is followed toward the top edge. The point at the end of this line is P4. P4 is recorded as the new left end of the top edge. The shape formed by traversing a cubic Bezier curve from P1 to P4 using P2 and P3 as control points forms the new top-left corner. Analogous processes are executed to position top-right, bottom-right, and bottom-left corner boundaries where the type of the corner is inverse rounded. Where, for example, the radius of an inverse rounded corner is 21 and the x, y coordinates illustrated in FIG. 21D begin at (0,0) with the x-axis extending positively toward the right edge and the y-axis extending positively toward the bottom edge, P1-P4 may be calculated as follows.

$P1=(x0,y1)$i.e. (left,top+$r$)=(0,21).

$P2=(x1,y2)$i.e. (left+$r$/2,top+$r$)=(10.5,21).

$P3=(x2,y1)$i.e. (left+$r$,top+$r$/2)=(21,10.5).

$P4=(x1,y0)$i.e. (left+$r$,top)=(21,0).

The inverse rounded corner type provides digital publishers with a greater degree of control over how a border is applied to identified text. Positioning the corners of the border in this way can be achieved by selecting "Inverse Rounded" in corner control 1584 of user interface 1580, as illustrated in FIG. 15C.

f. Rounded: For each corner type specified by the user as "Rounded," a stylized corner of the rounded type is positioned. See reference numeral 4357 in FIG. 26. FIG. 21E illustrates a top-left rounded corner, and the process executed to position it. As shown in FIG. 21E, to position the top-left rounded corner, a point, P1, along the left edge is selected. As shown, P1 is positioned a distance away from the intersection of the top edge and the left edge equal to the radius of the stylized corner. P1 is recorded as the new top of the left edge. Next, a line having a length equal to ½ the radius is followed from P1 toward the top edge. The point at the end of this line is P2. From P2, a line having a length equal to ½ the radius is followed toward the top edge. Next, a line having a length equal to ½ the radius is followed toward the right edge. The point at the end of this line is P3. Next, a line having a length equal to ½ the radius is followed toward the right edge. The point at the end of this line is P4. P4 is recorded as the new left end of the top edge. The shape formed by traversing a cubic Bezier curve from P1 to P4 using P2 and P3 as control points forms the new top-left corner. Analogous processes are executed to position top-right, bottom-right, and bottom-left corner boundaries where the type of the corner is rounded. Where, for example, the radius of a rounded corner is 21 and the x, y coordinates illustrated in FIG. 21E begin at (0,0) with the x-axis extending positively toward the right edge and the y-axis extending positively toward the bottom edge, P1-P4 may be calculated as follows.

$P1=(x0,y1)$i.e. (left,top+$r$)=(0,21).

$P2=(x0,y1)$i.e. (left,top+$r$/2)=(0,10.5).

$P3=(x1,y0)$i.e. (left+$r$/2,top)=(10.5,0).

$P4=(x1,y0)$i.e. (left+$r$,top)=(21,0).

The rounded corner type provides digital publishers with a greater degree of control over how a border is applied to identified text. Positioning the corners of the border in this way can be achieved by selecting "Rounded" in corner control 1584 of user interface 1580, as illustrated in FIG. 15C.

The example methods disclosed herein for positioning the corners of a border can be applied in automated workflows. For example, corner control settings or fixed position settings can be scripted and applied as fixed offsets based on user preference. Fixed position settings can be defined as a numerically-provided offset relative to a page edge, a margin, a column, a baseline, or some other layout feature. In embodiments wherein corner control settings or fixed position settings are scripted, user interface 1580 and user interface sub-module 1462 are optionally omitted.

Methodology: Border Rendering

Figure 27:
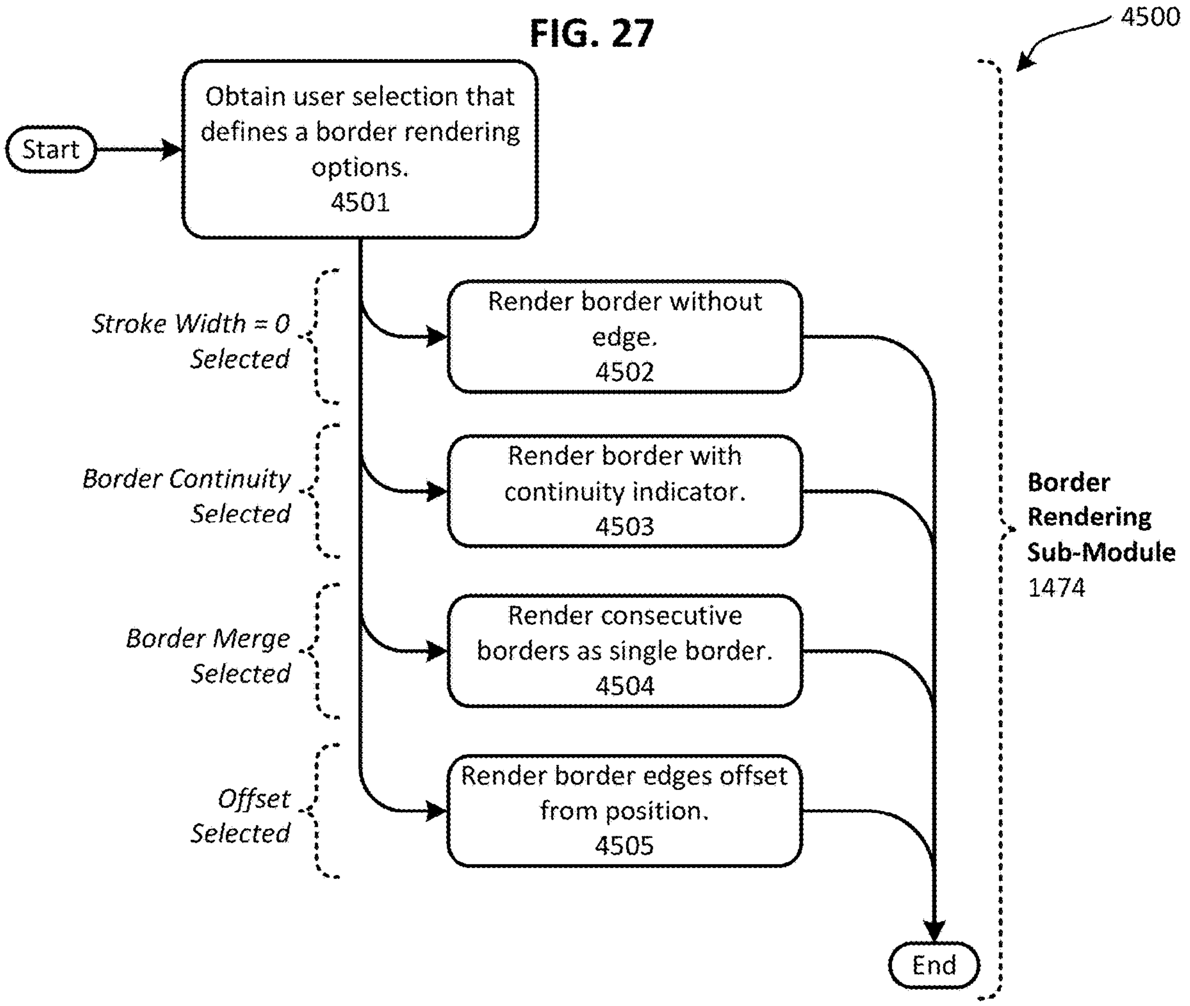
FIG. 27 is a flowchart illustrating an example method for processing border rendering options for a border that is to be applied to digitally published textual content.

FIG. 27 is a flowchart illustrating an example method 4500 for processing particular rendering options as part of the border rendering process executed by the border rendering sub-module 1474 described above. Method 4500 commences with obtaining a user selection that defines the border rendering options selected by the user. See reference numeral 4501 in FIG. 27. In certain embodiments the user selection is provided via stroke control 1582, offset control 1586, and continuity control 1588 of example user interface 1580. A number of rules exist for rendering of the border. In some cases the rendering options can be set manually, for example by the user specifying a rendering option numerically or graphically. Examples of rules for rendering the border include, but are not limited to:

a. Stroke Width=0: Each border edge with a stroke width of 0, as specified by the user, is not rendered. See reference numeral 4502 in FIG. 27. This option allows a user to create mixed edge borders, such as the mixed edge border 30 illustrated in FIG. 3. Setting a stroke width of 0 in this way can be achieved by selecting 0 in stroke control 1582 of user interface 1580, as illustrated in FIG. 15C.

b. Border Continuity: Each border specified by the user as to be displayable while spanning frames and/or columns is rendered with an indicator of border continuity where the border spans frames and/or columns. See reference numeral 4503 in FIG. 27. This option allows a user to create borders that maintain relevance even for textual content that spans frames and/or columns. In certain embodiments, the continuity indicator is a dashed line border edge that is positioned based on language of the textual content. For Roman based languages and Middle Eastern languages, the dashed line edge is rendered as a horizontal (e.g., top or bottom) edge. One example of this feature is illustrated by the borders 52 and 54 illustrated in FIG. 5C. For CJK languages, the dashed line edge is rendered as a vertical (e.g., left or right) edge or the vertical edge is removed. One example of this feature is illustrated by the borders 58 illustrated in FIG. 5D. Setting a border continuity option in this way can be achieved by selecting the border continuity control 1588 of user interface 1580, as illustrated in FIG. 15C.

c. Border Merge: Each border specified by the user as to be available for merger is merged with any adjacent, consecutive borders having common characteristics with the border. See reference numeral 4504 in FIG. 27. One example of this feature is illustrated by the borders 68 and 69 illustrated in FIGS. 6C and 6D.

d. Border Offset: Each border edge with an offset, as specified by the user, is rendered offset (or inset) from its predetermined position. See reference numeral 4505 in FIG. 27. This option allows a user to have fine grained control of the positioning of border edges. For example, where an offset is specified, the border edge is rendered closer to the textual content and the border covers less area. Conversely, where an inset is specified, the border edge is rendered farther from the textual content and border covers more area. Setting an offset in this way can be achieved by selecting an offset value in offset control 1586 of user interface 1580, as illustrated in FIG. 15C.

The example methods disclosed herein for rendering a border can be applied in automated workflows. For example, rendering options can be scripted and applied based on user preference. Rendering options can be defined as numerically-provided values. In embodiments wherein rendering options are scripted, user interface 1580 and user interface sub-module 1462 are optionally omitted.

Further Example Border Embodiments

Numerous variations and configurations will be apparent in light of this disclosure. For instance, as illustrated in FIG. 25, one example embodiment provides a computer-implemented method 5000 for applying a border to textual content. The method includes receiving user input that defines a textual content segment that is to be located within a border. The textual content segment includes a first plurality of glyphs arranged in one or more lines. See reference numeral 5100 in FIG. 25. See also reference numeral 4100 in FIG. 22, which indicates that method 4000 for positioning edges that define a border includes identifying a first plurality of glyphs to which the border should be applied.

Method 5000 further includes identifying a font associated with the first plurality of glyphs. The identified font includes a second plurality of glyphs. See reference numeral 5200 in FIG. 25. See also reference numerals 2216*a* in FIG. 23A and 2226*a* in FIG. 23B, which indicate that method 4200 for positioning top and bottom edges of a border includes identifying fonts present in the identified text. Thus, in such embodiments the first plurality of glyphs includes the text selected to which border is to be applied, and the second plurality of glyphs includes the glyphs that collectively include one of the identified fonts.

Method 5000 further includes determining a maximum dimension associated with the second plurality of glyphs. See reference numeral 5300 in FIG. 25. See also reference numeral 4216*b* in FIG. 23A, which indicates that method 4200 for positioning top and bottom edges of a border includes determining a maximum ascent of the plurality of glyphs comprising the identified fonts, that is, the second plurality of glyphs. Likewise, reference numeral 4226*b* in FIG. 23B indicates that method 4200 includes determining a maximum descent of the second plurality of glyphs.

Method 5000 further includes positioning an edge of the border at a distance from a baseline of a particular one of the lines. The distance is based on the determined maximum dimension. See reference numeral 5400 in FIG. 25. See also reference numeral 4216*c* in FIG. 23A, which indicates that method 4200 for positioning top and bottom edges of a border includes positioning a top edge at a determined maximum ascent. Ascent-based border edge 14*a* illustrated in FIG. 1B is an example of a top edge positioned in this way. See also reference numeral 4226*c* in FIG. 23B, which indicates that method 4200 includes positioning a bottom edge at a determined maximum descent. Descent-based border edge 14*d* illustrated in FIG. 1B is an example of a bottom edge positioned in this way.

Method 5000 further includes displaying the border. See reference numeral 5500 in FIG. 25. See also reference numerals 4500 and 4600 in FIG. 22, which indicate that method 4000 for positioning the edges that define a border includes rendering the edges of the border, and displaying the plurality of glyphs relative to the border. Text columns 10ℓ, 10*c*, and 10*r* illustrated in FIG. 1B are examples of a textual content wherein a plurality of glyphs displayed relative to a border, and wherein one of the top border edges is defined by an ascent-based shading boundary.

In another example embodiment, a border generation system is provided. The border generation system includes a memory and at least one processor coupled to the memory. The at least one processor is configured to identify textual content targeted for a border including a plurality of edges, the textual content including a first plurality of glyphs within a region disposed at a location; identify a font including a second plurality of glyphs of which the first plurality of glyphs is a subset; determine a maximum dimension of at least one glyph of the second plurality of glyphs; determine a first position for a first edge of the plurality of edges based the maximum dimension and the location; determine a second position for a second edge of the plurality of edges based on the location; display the first edge at the first position; and display the second edge at the second position.

In the border generation system, the first edge and the second edge may meet at a corner and the at least one processor may be further configured to identify a type of a new corner selected for the corner; determine, based on the first position and the second position, a third position for the new corner; adjust the first edge based on the third position; adjust the second edge based on the third position; and display the new corner at the third position. The type may include one or more of fancy, bevel, inset, inverse rounded, and rounded. The at least one processor may be further configured to identify a radius of the new corner; adjust the first edge at least in part by removing a length of the first edge equal to the radius; and adjust the second edge at least in part by removing a length of the second edge equal to the radius.

In the border generation system, the first edge is a top edge and the at least one processor is further configured to identify a top edge position selected for the top edge; and determine the first position at least in part by referencing to the top edge position. The textual content may include a first line having a baseline location, the top edge position is ascent, and the at least one processor is configured to determine the first position at least in part by determining a new position based on the baseline location and the maximum dimension.

In the border generation system, the first edge may be a bottom edge and the at least one processor may be further configured to: identify a bottom edge position selected for the bottom edge; and determine the first position at least in part by referencing to the bottom edge position. The textual content may include a last line having a baseline location, the bottom edge position is descent, and the at least one processor may be configured to determine the first position at least in part by determining a new position based on the baseline location and the maximum dimension.

In the border generation system, the at least one processor may be further configured to identify a frame including the textual content, the frame having a plurality of boundaries; and determine the second position based on a boundary of the plurality of boundaries. The at least one processor may be further configured to identify a width the textual content; and determine the second position based on the width.

In the border generation system, the textual content may span a plurality of frames, the second edge may include a bottom edge, and the at least one processor may be further configured to render the bottom edge using a continuity indicator. The continuity indicator may be a dashed line. The at least one processor may be further configured to identify additional textual content targeted for an additional border; identify one or more common characteristics shared by the border and the additional border; merge the border and the addition border to form a new border in response to identifying the one or more common characteristics; and display the textual content, the additional textual content, and the new border.

In another example embodiment, a method of generating a border including a plurality of edges using a computer system is provided. The method includes acts of identifying textual content targeted for the border, the textual content including a first plurality of glyphs within a region disposed at a location; identifying a font including a second plurality of glyphs of which the first plurality of glyphs is a subset; determining a maximum dimension of at least one glyph of the second plurality of glyphs; determining a first position for a first edge of the plurality of edges based the maximum dimension and the location; determining a second position for a second edge of the plurality of edges based on the location; displaying the first edge at the first position; and displaying the second edge at the second position.

The first edge and the second edge may meet at a corner and the method may further include acts of identifying a type of a new corner selected for the corner, the type being one or more of fancy, bevel, inset, inverse rounded, and rounded; determining, based on the first position and the second position, a third position for the new corner; adjusting the first edge based on the third position; adjusting the second edge based on the third position; and displaying the new corner at the third position. The textual content may span a plurality of frames, the second edge may be a bottom edge, and the act of displaying the second edge may include an act of displaying a continuity indicator.

The method may further include acts of identifying additional textual content targeted for an additional border; identifying one or more common characteristics shared by the border and the additional border; merging the border and the addition border to form a new border in response to identifying the one or more common characteristics; and displaying the textual content, the additional textual content, and the new border.

In another example embodiment, a computer program product is provided. The computer program product is encoded with instructions executable by at least one processor to implement a border generation process. The border generation process includes acts of identifying textual content targeted for a border including a plurality of edges, the textual content including a first plurality of glyphs within a region disposed at a location; identifying a font including a second plurality of glyphs of which the first plurality of glyphs is a subset; determining a maximum dimension of at least one glyph of the second plurality of glyphs; determining a first position for a first edge of the plurality of edges based the maximum dimension and the location;

determining a second position for a second edge of the plurality of edges based on the location; displaying the first edge at the first position; and displaying the second edge at the second position.

The first edge and the second edge may meet at a corner and the process may further include acts of identifying a type of a new corner selected for the corner, the type being one or more of fancy, bevel, inset, inverse rounded, and rounded; determining, based on the first position and the second position, a third position for the new corner; adjusting the first edge based on the third position; adjusting the second edge based on the third position; and displaying the new corner at the third position.

The textual content may span a plurality of frames. The second edge may be a bottom edge. The act of displaying the second edge may include an act of displaying a continuity indicator. The process may further include acts of identifying additional textual content targeted for an additional border; identifying one or more common characteristics shared by the border and the additional border; merging the border and the addition border to form a new border in response to identifying the one or more common characteristics; and displaying the textual content, the additional textual content, and the new border. The one or more common characteristics may include all characteristics shared by the border and the additional border.

The foregoing description has been presented for the purposes of illustration and description. It is not intended to be exhaustive or to limit the disclosure to the particular described embodiments. Therefore many modifications and variations are possible in light of this disclosure. Thus it is intended that the scope of the invention be limited not by this detailed description, but rather by the claims appended hereto.

What is claimed is:

1. A method comprising:

identifying, by at least one processor-based system, first textual content that is positioned within a first border comprising a first plurality of border edges, the first textual content being positioned in a first text frame, and the first textual content having a reading orientation that is either a vertical orientation or a horizontal orientation;

identifying, by the at least one processor-based system, second textual content that is positioned within a second border comprising a second plurality of border edges, the second textual content being positioned in a second text frame that is adjacent to the first text frame, wherein the second textual content has a same reading orientation as the first textual content;

in response to identifying the first and second textual content, modifying, by the at least one processor-based system, a particular edge of the first border such that the particular edge of the first border has a modified formatting characteristic, wherein at least one of the first plurality of border edges is left unmodified and does not have the modified formatting characteristic;

in response to identifying the first and second textual content, modifying, by the at least one processor-based system, a particular edge of the second border such that the particular edge of the second border also has the modified formatting characteristic, wherein at least one of the second plurality of border edges is left unmodified and does not have the modified formatting characteristic;

displaying, by the at least one processor-based system, the first textual content, the second textual content, the first border including the particular edge of the first border, and the second border including the particular edge of the second border, wherein the particular edge of the first border and the particular edge of the second border each have an edge orientation that is equivalent to the reading orientation.

2. The method of claim 1, further comprising:

receiving user input that identifies the first textual content and the second textual content.

3. The method of claim 1, wherein a first edge of the first border and a second edge of the first border meet at a corner, the method further comprising:

receiving input specifying a modified radius of the corner;

adjusting the first edge at least in part by removing a length of the first edge equal to the modified radius; and adjusting the second edge at least in part by removing a length of the second edge equal to the modified radius.

4. The method of claim 1, further comprising receiving user input that identifies the first textual content, wherein the first textual content comprises a first plurality of glyphs.

5. The method of claim 1, wherein the first textual content comprises a first plurality of glyphs, the method further comprising identifying a font used to render the first textual content, the font comprising a second plurality of glyphs that includes at least one of the glyphs included in the first plurality of glyphs.

6. The method of claim 1, wherein the first textual content comprises a first plurality of glyphs, the method further comprising:

identifying a font used to render the first textual content, the font comprising a second plurality of glyphs that includes at least one of the glyphs included in the first plurality of glyphs; and identifying a tallest glyph amongst the second plurality of glyphs, wherein the tallest glyph has a maximum height, but is not included in the first plurality of glyphs.

7. The method of claim 1, wherein a first edge of the first border is a top edge of the first border, and wherein the first textual content comprises a first plurality of glyphs, the method further comprising:

receiving user input that defines a border offset/inset that specifies a distance between a feature of the first textual content and the first particular edge of the first border; and identifying a font used to render the first textual content, the font comprising a second plurality of glyphs that includes at least one of the glyphs included in the first plurality of glyphs.

8. The method of claim 7, wherein the feature of the first textual content is a position of an embox containing one of the first plurality of glyphs.

9. The method of claim 7, wherein the feature of the first textual content is a maximum ascent of one of the first plurality of glyphs.

10. The method of claim 7, wherein the feature of the first textual content is a baseline of the first textual content.

11. The method of claim 1, wherein a first edge of the first border and a second edge of the first border meet at a corner, the method further comprising:

identifying a type for the corner, the type being one or more of fancy, bevel, inset, inverse rounded, or rounded;

determining, based on positions of the first and second edges of the first border, a corner position;

adjusting the first edge of the first border based on the corner position;

adjusting the second edge of the first border based on the corner position; and displaying the corner at the corner position.

12. The method of claim 7, wherein the first edge is a side edge of the first border, the method further comprising:

identifying a margin associated with the first textual content, the margin having a margin location;

wherein the feature of the first textual content is the margin location.

13. The method of claim 7, wherein the first edge is a side edge of the first border, the method further comprising:

identifying a width associated with the first textual content;

wherein the feature of the first textual content is the width.

14. The method of claim 1, wherein:

the first textual content is positioned in a first column; and the second textual content is positioned in a second column that is adjacent to the first column.

15. A method comprising:

identifying, by at least one processor-based system, first textual content that is positioned within a first border comprising a first plurality of border edges, the first textual content being positioned in a first text frame, and the first textual content including glyphs associated with a particular language;

identifying, by the at least one processor-based system, second textual content that is positioned within a second border comprising a second plurality of border edges, the second textual content being positioned in a second text frame that is adjacent to the first text frame, wherein the second textual content includes glyphs associated with the particular language;

in response to identifying the first and second textual content, modifying, by the at least one processor-based system, a particular edge of the first border such that the particular edge of the first border has a modified formatting characteristic;

in response to identifying the first and second textual content, modifying, by the at least one processor-based system, a particular edge of the second border such that the particular edge of the second border also has the modified formatting characteristic; and displaying, by the at least one processor-based system, the first textual content, the second textual content, the first border including the particular edge of the first border, and the second border including the particular edge of the second border;

wherein the particular edge of the first border and the particular edge of the second border each have an orientation that is selected based on the particular language.

16. The method of claim 15, further comprising:

receiving user input that identifies the first textual content and the second textual content.

17. The method of claim 15, wherein a first edge of the first border and a second edge of the first border meet at a corner, the method further comprising:

receiving user input specifying a modified radius of the corner;

adjusting the first edge of the first border at least in part by removing a length of the first edge of the first border equal to the modified radius; and adjusting the second edge of the first border at least in part by removing a length of the second edge of the first border equal to the modified radius.

18. The method of claim 15, wherein a first edge of the first border and a second edge of the first border meet at a corner, the method further comprising:

identifying a type for the corner, the type being one or more of fancy, bevel, inset, inverse rounded, or rounded;

determining, based on positions of the first and second edges of the first border, a corner position;

adjusting the first edge of the first border based on the corner position;

adjusting the second edge of the first border based on the corner position; and displaying the corner at the corner position.

19. The method of claim 15, wherein:

the first textual content is positioned in a first column; and the second textual content is positioned in a second column that is adjacent to the first column.

20. The method of claim 15, wherein:

the modified formatting characteristic is transparency.

* * * * *